US012701409B2

(12) United States Patent
Lee et al.

(10) Patent No.: US 12,701,409 B2
(45) Date of Patent: Aug. 4, 2026

(54) SECURE COMMUNICATION OF BROADCAST INFORMATION RELATED TO CELL ACCESS

(71) Applicant: QUALCOMM Incorporated, San Diego, CA (US)

(72) Inventors: Soo Bum Lee, San Diego, CA (US); Ravi Agarwal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 17/199,283

(22) Filed: Mar. 11, 2021

(65) Prior Publication Data

US 2021/0297853 A1    Sep. 23, 2021

Related U.S. Application Data

(60) Provisional application No. 62/990,980, filed on Mar. 17, 2020.

(51) Int. Cl.
H04L 29/06 (2006.01)
H04W 12/037 (2021.01)
(Continued)

(52) U.S. Cl.
CPC ....... H04W 12/037 (2021.01); H04W 12/041 (2021.01); H04W 12/0433 (2021.01);
(Continued)

(58) Field of Classification Search
CPC . H04W 12/037; H04W 76/27; H04W 12/106; H04W 12/0433; H04W 12/041; H04W 72/30; H04W 56/001; H04W 60/40
(Continued)

(56) References Cited

U.S. PATENT DOCUMENTS 9,119,064 B2    8/2015  Jover
10,728,756 B2   7/2020  Lee et al.
(Continued)

FOREIGN PATENT DOCUMENTS

CN        110832822 A     2/2020
EP          2247131 A1   11/2010
(Continued)

OTHER PUBLICATIONS

Doppler,"Device-to-Device Communication as an Underlay to LTE-Advanced Networks", Dec. 2009, IEEE, pp. 42-49 (Year: 2009).*
(Continued)

*Primary Examiner* — Taghi T Arani
*Assistant Examiner* — Gregory A Lane
(74) *Attorney, Agent, or Firm* — Loza & Loza LLP

(57)    ABSTRACT

Aspects of the disclosure relate to mechanisms for securely communicating broadcast information related to cell access within a secure cell. The broadcast information may be encrypted using a cell-specific broadcast key that may be derived from a broadcast root key that is refreshed periodically. A wireless communication device may obtain the broadcast root key via a secure connection with a provisioning server or core network node within a core network maintaining the broadcast root key or a long term key from which the broadcast root key may be derived. The cell-specific broadcast key may be derived using a key derivation function of the broadcast root key and at least cell identifying information associated with the secure cell.

28 Claims, 30 Drawing Sheets

(51) Int. Cl.

| | |
|---|---|
| *H04W 12/041* | (2021.01) |
| *H04W 12/0433* | (2021.01) |
| *H04W 12/106* | (2021.01) |
| *H04W 56/00* | (2009.01) |
| *H04W 60/04* | (2009.01) |
| *H04W 72/30* | (2023.01) |
| *H04W 76/27* | (2018.01) |

(52) U.S. Cl.
 CPC ....... *H04W 12/106* (2021.01); *H04W 56/001* (2013.01); *H04W 60/04* (2013.01); *H04W 72/30* (2023.01); *H04W 76/27* (2018.02)

(58) Field of Classification Search
 USPC ........................................................... 726/2
 See application file for complete search history.

(56) References Cited

U.S. PATENT DOCUMENTS

| | | | | |
|---|---|---|---|---|
| 11,464,068 | B1 * | 10/2022 | Marupaduga | ......... H04W 76/19 |
| 2008/0141031 | A1 * | 6/2008 | Oba | ...................... H04L 63/162 |
| | | | | 713/170 |
| 2012/0265983 | A1 * | 10/2012 | Yegin | ..................... G06F 21/57 |
| | | | | 713/155 |
| 2013/0003672 | A1 * | 1/2013 | Dinan | ....................... H04L 1/00 |
| | | | | 370/329 |
| 2013/0046968 | A1 * | 2/2013 | Dinan | ................ H04W 12/037 |
| | | | | 713/150 |
| 2013/0267202 | A1 * | 10/2013 | Palanigounder | ........ H04W 4/06 |
| | | | | 455/411 |
| 2014/0308921 | A1 * | 10/2014 | Zhang | ................... H04W 76/15 |
| | | | | 455/410 |
| 2015/0119023 | A1 * | 4/2015 | Wang | ................... H04L 12/189 |
| | | | | 455/432.1 |
| 2015/0200806 | A1 * | 7/2015 | Donley | ............... H04L 61/5014 |
| | | | | 370/392 |
| 2016/0135042 | A1 | 5/2016 | Netto et al. | |
| 2016/0364553 | A1 * | 12/2016 | Smith | ...................... H04L 63/10 |
| 2017/0171748 | A1 * | 6/2017 | Deng | .................... H04W 76/30 |
| 2017/0202033 | A1 * | 7/2017 | Lee | .......................... H04W 8/22 |
| 2018/0213403 | A1 * | 7/2018 | Shi | ...................... H04W 12/033 |
| 2018/0249331 | A1 * | 8/2018 | Chen | ..................... H04W 76/10 |
| 2018/0367303 | A1 * | 12/2018 | Velev | .................... H04L 9/3297 |
| 2019/0058690 | A1 * | 2/2019 | Huang | ............... H04L 61/2517 |
| 2019/0082367 | A1 * | 3/2019 | Lin | ..................... H04W 36/087 |
| 2019/0149365 | A1 | 5/2019 | Chatterjee et al. | |
| 2019/0253895 | A1 * | 8/2019 | Xu | ..................... H04W 36/0038 |
| 2019/0327135 | A1 * | 10/2019 | Johnson | .................. H04L 67/34 |
| 2020/0021993 | A1 * | 1/2020 | Yang | ..................... H04L 63/123 |
| 2020/0059851 | A1 * | 2/2020 | Kim | ...................... H04W 76/27 |
| 2020/0214070 | A1 * | 7/2020 | Ingale | ............... H04W 74/0833 |
| 2020/0236544 | A1 * | 7/2020 | Kunz | ...................... H04W 4/70 |
| 2021/0144727 | A1 * | 5/2021 | Pan | ..................... H04W 72/543 |
| 2021/0337508 | A1 * | 10/2021 | Gunnarsson | .......... H04W 72/30 |
| 2022/0116821 | A1 * | 4/2022 | Wei | ...................... H04L 27/2636 |
| 2022/0174624 | A1 * | 6/2022 | Wu | ...................... H04L 5/0092 |
| 2022/0264407 | A1 * | 8/2022 | Sharma | ............. H04W 36/0061 |

FOREIGN PATENT DOCUMENTS

| | | |
|---|---|---|
| WO | 2018057908 A1 | 3/2018 |
| WO | 2018230980 A1 | 12/2018 |

OTHER PUBLICATIONS

Agiwal, "Next Generation 5G Wireless Networks: A Comprehensive Survey", 2016, IEEE, vol. 18, pp. 1617-1655 (Year: 2016).*
International Search Report and Written Opinion—PCT/US2021/ 022120—ISA/EPO—Jun. 22, 2021.

* cited by examiner

2100

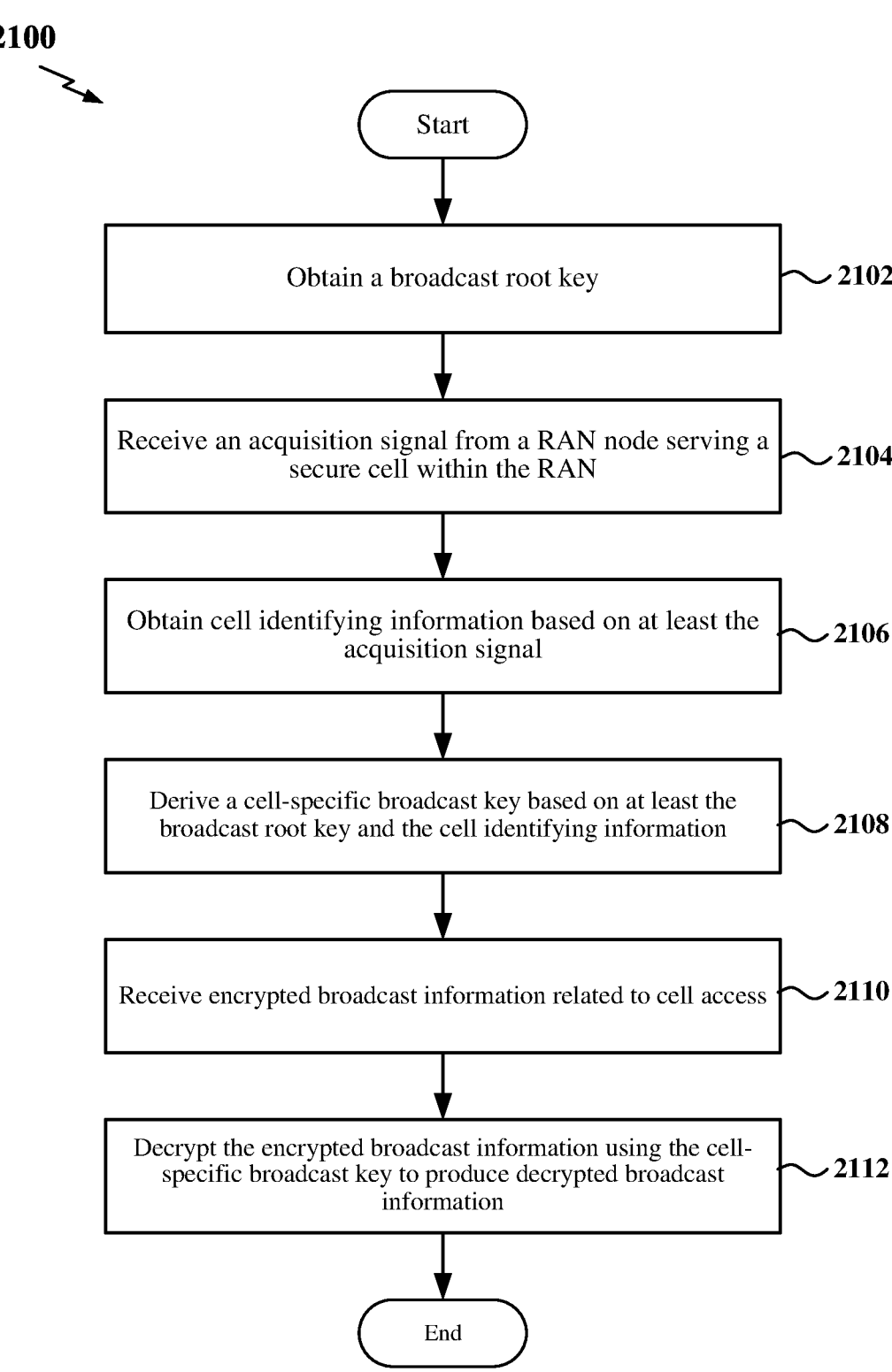

Start

Obtain a broadcast root key — 2102

Receive an acquisition signal from a RAN node serving a secure cell within the RAN — 2104

Obtain cell identifying information based on at least the acquisition signal — 2106

Derive a cell-specific broadcast key based on at least the broadcast root key and the cell identifying information — 2108

Receive encrypted broadcast information related to cell access — 2110

Decrypt the encrypted broadcast information using the cell-specific broadcast key to produce decrypted broadcast information — 2112

End

FIG. 21

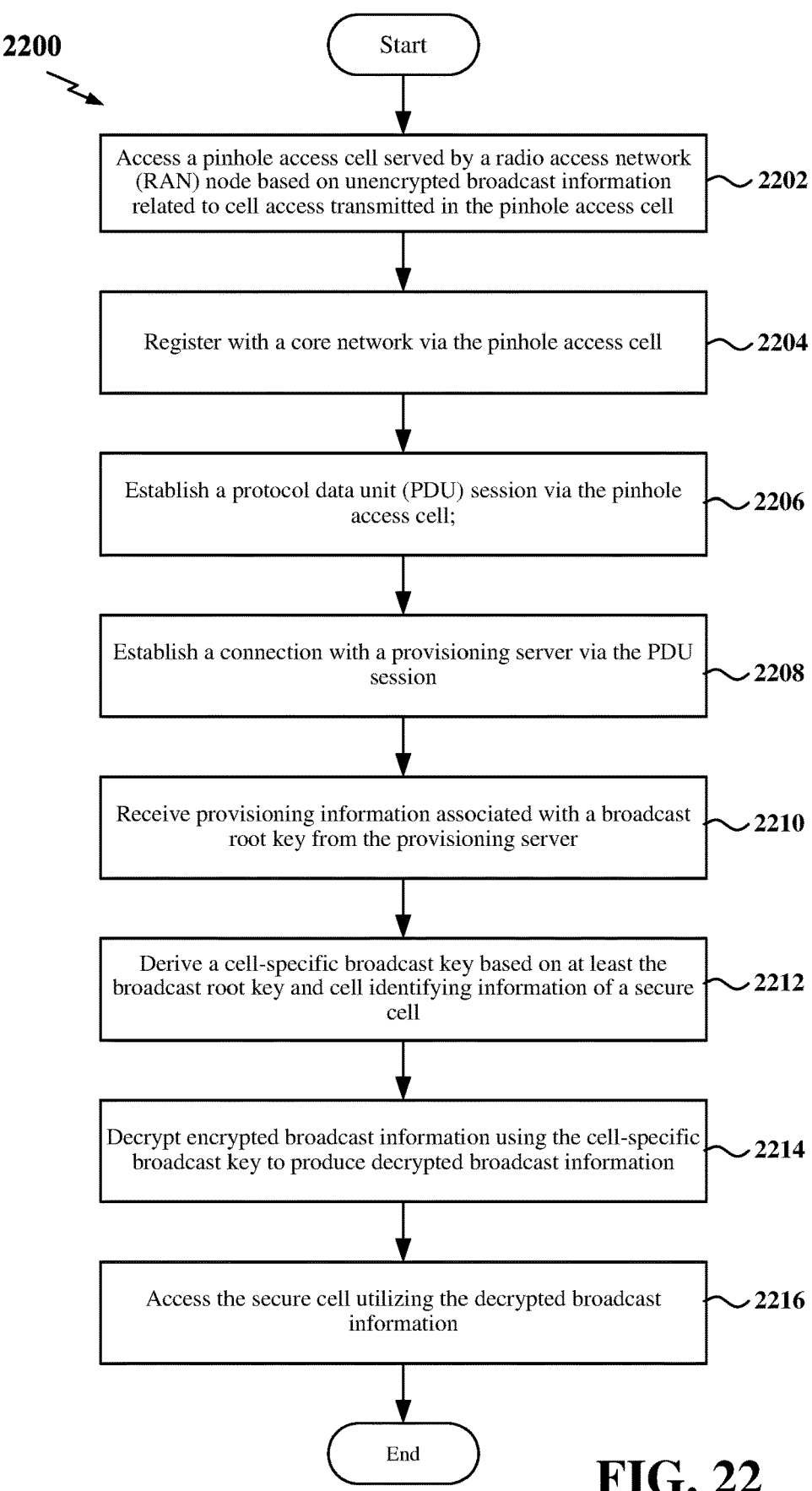

2200

Start

Access a pinhole access cell served by a radio access network (RAN) node based on unencrypted broadcast information related to cell access transmitted in the pinhole access cell — 2202

Register with a core network via the pinhole access cell — 2204

Establish a protocol data unit (PDU) session via the pinhole access cell; — 2206

Establish a connection with a provisioning server via the PDU session — 2208

Receive provisioning information associated with a broadcast root key from the provisioning server — 2210

Derive a cell-specific broadcast key based on at least the broadcast root key and cell identifying information of a secure cell — 2212

Decrypt encrypted broadcast information using the cell-specific broadcast key to produce decrypted broadcast information — 2214

Access the secure cell utilizing the decrypted broadcast information — 2216

End

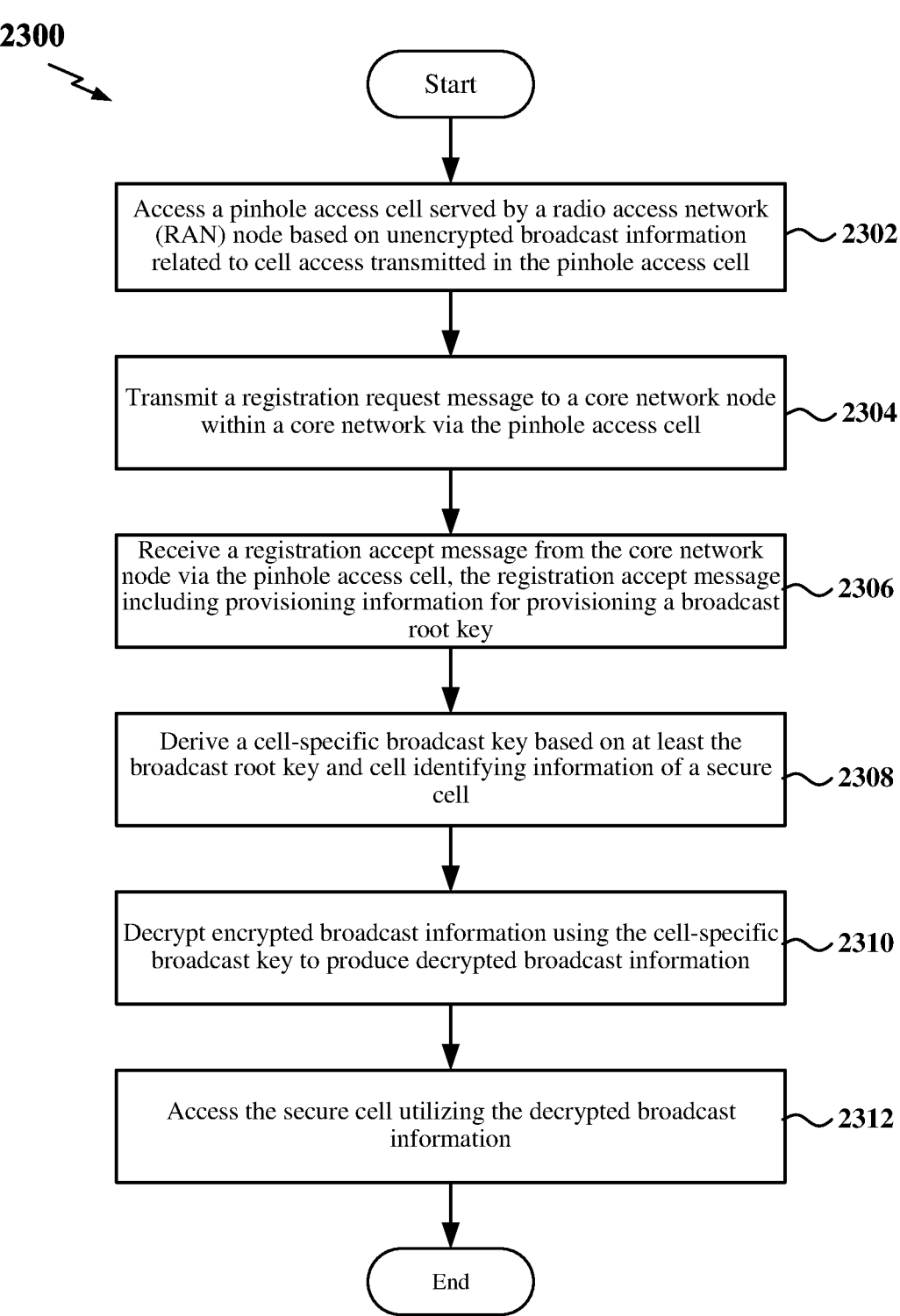

Start

Access a pinhole access cell served by a radio access network (RAN) node based on unencrypted broadcast information related to cell access transmitted in the pinhole access cell — 2302

Transmit a registration request message to a core network node within a core network via the pinhole access cell — 2304

Receive a registration accept message from the core network node via the pinhole access cell, the registration accept message including provisioning information for provisioning a broadcast root key — 2306

Derive a cell-specific broadcast key based on at least the broadcast root key and cell identifying information of a secure cell — 2308

Decrypt encrypted broadcast information using the cell-specific broadcast key to produce decrypted broadcast information — 2310

Access the secure cell utilizing the decrypted broadcast information — 2312

End

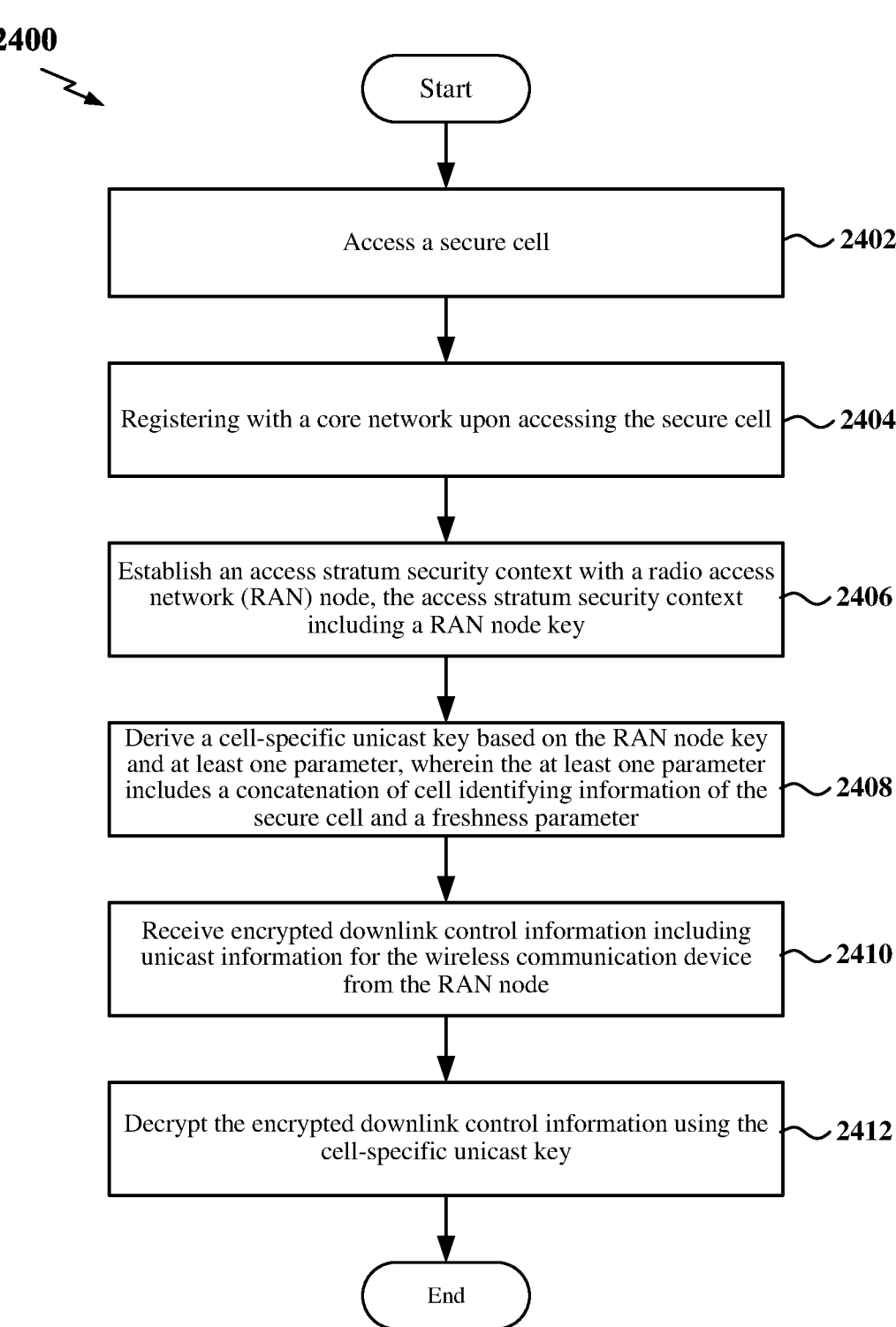

Start

Access a secure cell — 2402

Registering with a core network upon accessing the secure cell — 2404

Establish an access stratum security context with a radio access network (RAN) node, the access stratum security context including a RAN node key — 2406

Derive a cell-specific unicast key based on the RAN node key and at least one parameter, wherein the at least one parameter includes a concatenation of cell identifying information of the secure cell and a freshness parameter — 2408

Receive encrypted downlink control information including unicast information for the wireless communication device from the RAN node — 2410

Decrypt the encrypted downlink control information using the cell-specific unicast key — 2412

End

Start

Obtain a cell-specific broadcast key for a secure cell served by the RAN node — 2502

Encrypt broadcast information related to cell access using at least the cell-specific broadcast key to produce encrypted broadcast information — 2504

Transmit the encrypted broadcast information in the secure cell — 2506

End

2600

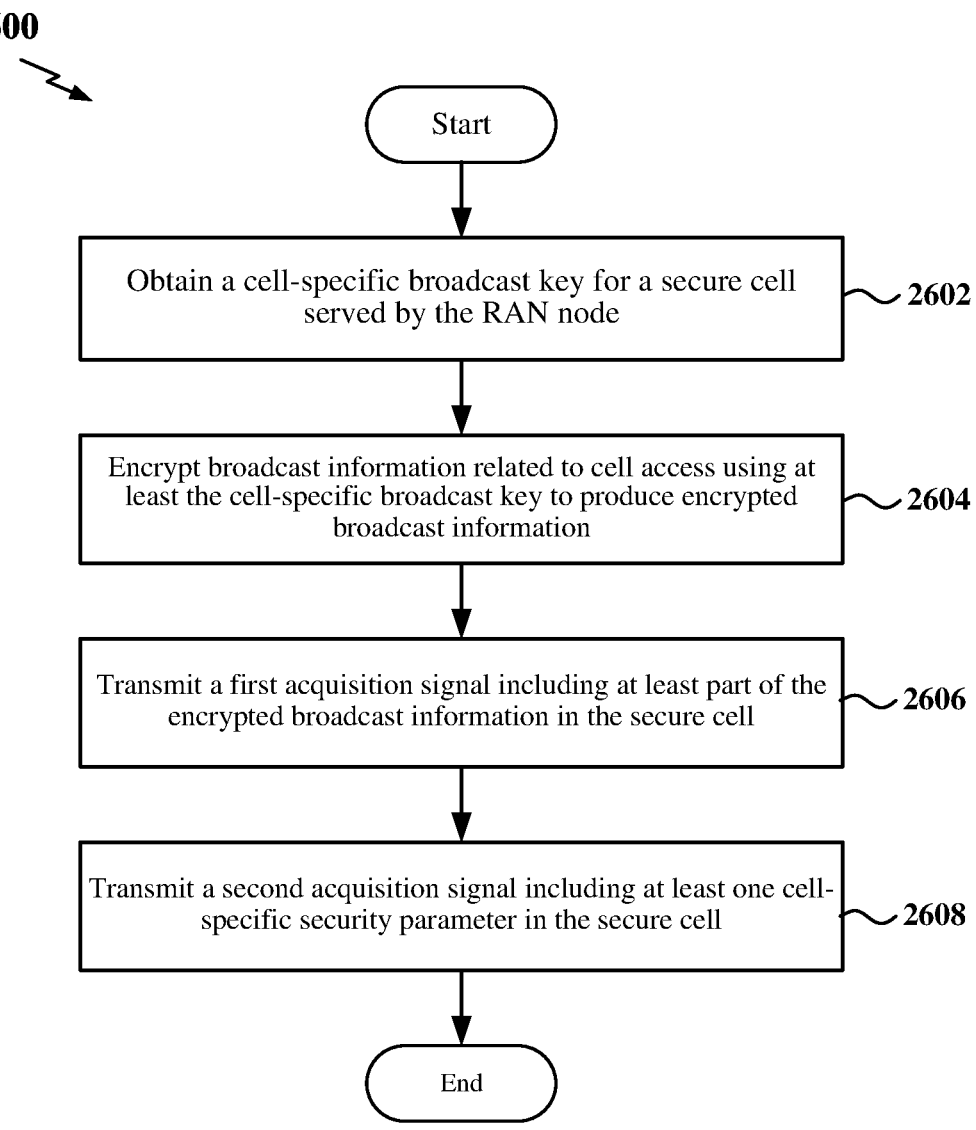

Start

Obtain a cell-specific broadcast key for a secure cell served by the RAN node — 2602

Encrypt broadcast information related to cell access using at least the cell-specific broadcast key to produce encrypted broadcast information — 2604

Transmit a first acquisition signal including at least part of the encrypted broadcast information in the secure cell — 2606

Transmit a second acquisition signal including at least one cell-specific security parameter in the secure cell — 2608

End

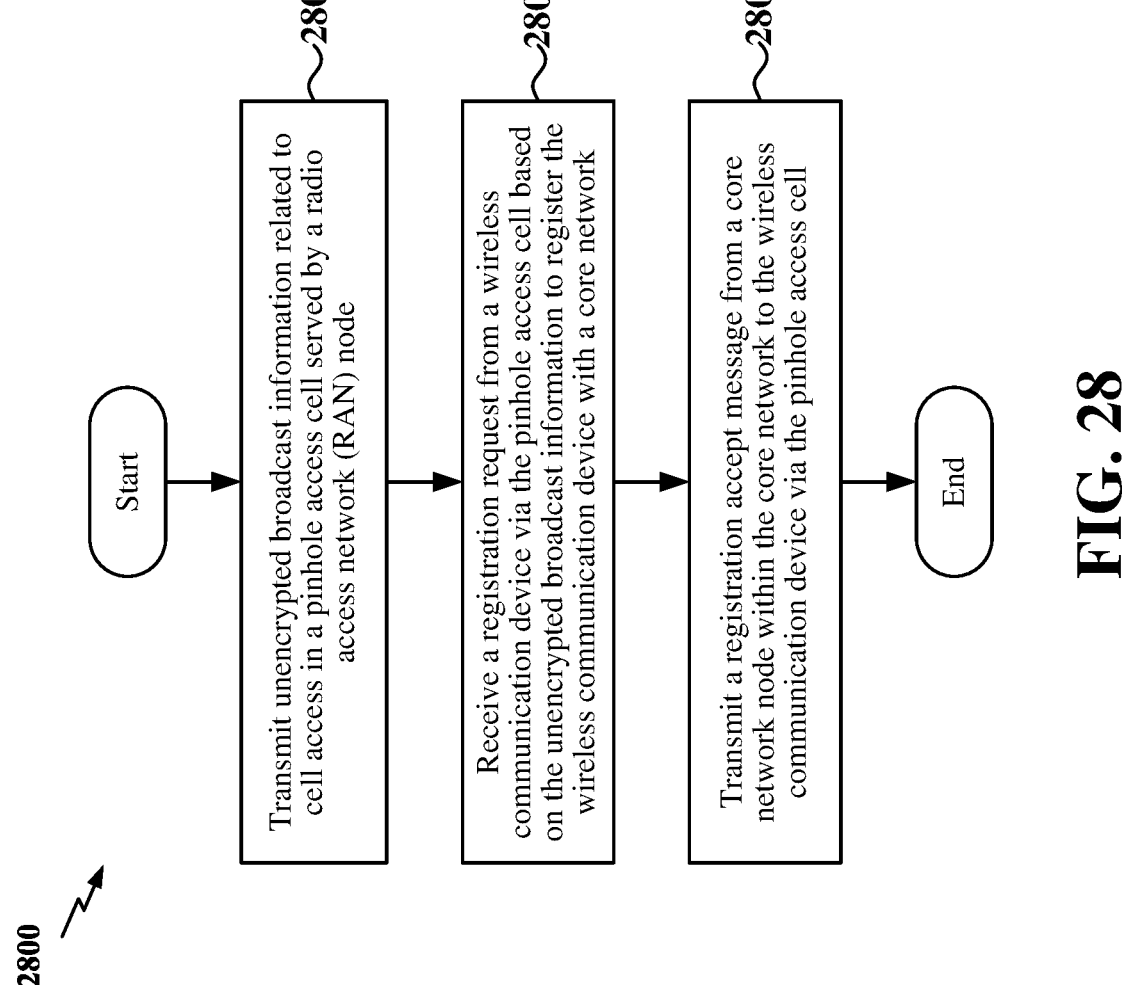

2800

Start

Transmit unencrypted broadcast information related to cell access in a pinhole access cell served by a radio access network (RAN) node   2802

Receive a registration request from a wireless communication device via the pinhole access cell based on the unencrypted broadcast information to register the wireless communication device with a core network   2804

Transmit a registration accept message from a core network node within the core network to the wireless communication device via the pinhole access cell   2806

End

FIG. 28

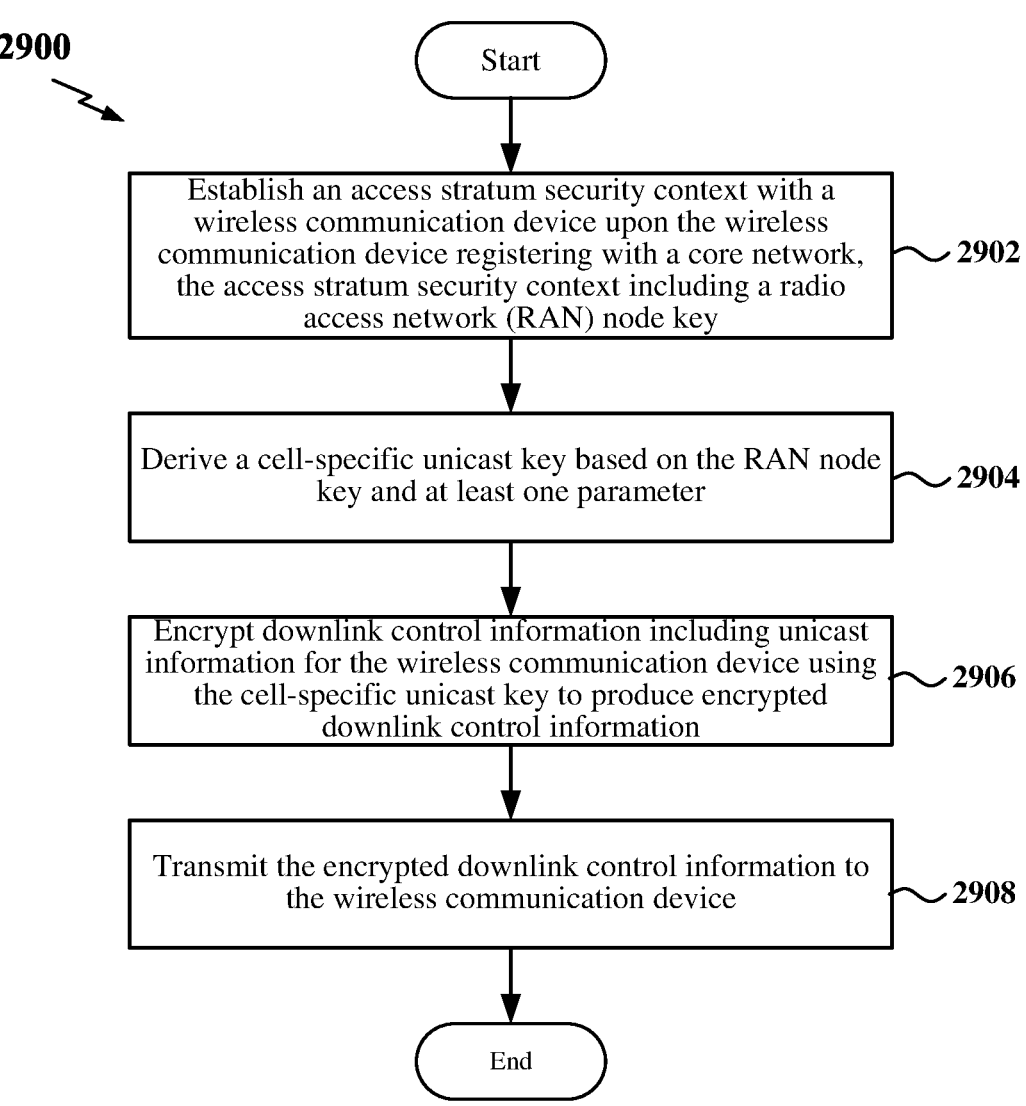

2900

Start

Establish an access stratum security context with a wireless communication device upon the wireless communication device registering with a core network, the access stratum security context including a radio access network (RAN) node key — 2902

Derive a cell-specific unicast key based on the RAN node key and at least one parameter — 2904

Encrypt downlink control information including unicast information for the wireless communication device using the cell-specific unicast key to produce encrypted downlink control information — 2906

Transmit the encrypted downlink control information to the wireless communication device — 2908

End

FIG. 29

SECURE COMMUNICATION OF BROADCAST INFORMATION RELATED TO CELL ACCESS

CROSS-REFERENCE TO RELATED APPLICATIONS

The present Application for Patent claims priority to and the benefit of U.S. Provisional Application No. 62/990,980, filed Mar. 17, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to secure communication of broadcast information related to cell access in wireless communication networks.

INTRODUCTION

In fifth generation (5G) wireless communication networks, such as the New Radio (NR) wireless communication network, a user equipment (UE) may perform a cell search to acquire time and frequency synchronization with the cell and to identify the physical cell identity (PCI) of the cell. The PCI may be carried in a primary synchronization signal (PSS) and secondary synchronization signal (SSS) of a synchronization signal block (SSB). The SSB, which includes the PSS, the SSS, and a physical broadcast control channel (PBCH) may be transmitted, for example, over four symbols in the time domain and 240 subcarriers in the frequency domain.

The PBCH may include a master information block (MIB) that includes various system information, along with parameters for decoding a system information block (SIB). The SIB may be, for example, a SystemInformationType1 (SIB1) that may include various additional system information. Collectively, the MIB and SIB1 include the minimum system information (SI) for initial system (cell) access.

Unprotected broadcast messages, such as the MIB and SIB1, may be vulnerable to various types of denial of service (DoS) attacks. For example, an attacker may modify the MIB and/or SIB1 to include the wrong public land mobile network (PLMN) identity (ID) or the wrong cell/access class barring information. As another example, an attacker may capture a broadcast message, such as the SIB1, in one cell and relay that captured broadcast message in another cell. This may result in location record poisoning of UEs due to receipt of a false tracking area code (TAC).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a wireless communication device in a radio access network (RAN) of a wireless communication system is disclosed.

The method includes obtaining a broadcast root key, receiving an acquisition signal from a RAN node serving a secure cell within the RAN, and obtaining cell identifying information based on at least the acquisition signal. The method further includes deriving a cell-specific broadcast key based on at least the broadcast root key and the cell identifying information, receiving encrypted broadcast information related to cell access, and decrypting the encrypted broadcast information using the cell-specific broadcast key to produce decrypted broadcast information.

Another example provides a wireless communication device in a radio access network (RAN) of a wireless communication network. The wireless communication device includes a transceiver, a memory, and a processor coupled to the transceiver and the memory. The processor and the memory are configured to obtain a broadcast root key, receive an acquisition signal from a RAN node serving a secure cell within the RAN via the transceiver, and obtain cell identifying information based on at least the acquisition signal. The processor and the memory are further configured to derive a cell-specific broadcast key based on at least the broadcast root key and the cell identifying information, receive encrypted broadcast information related to cell access via the transceiver, and decrypt the encrypted broadcast information using the cell-specific broadcast key to produce decrypted broadcast information.

Another example provides a method of wireless communication at a radio access network (RAN) node in a wireless communication system. The method includes obtaining a cell-specific broadcast key for a secure cell served by the RAN node, encrypting broadcast information related to cell access using at least the cell-specific broadcast key to produce encrypted broadcast information, and transmitting the encrypted broadcast information in the secure cell.

Another example provides a radio access network (RAN) node in a RAN of a wireless communication system. The RAN node includes a transceiver, a memory, and a processor coupled to the transceiver and the memory. The processor and the memory are configured to obtain a cell-specific broadcast key for a secure cell served by the RAN node, encrypt broadcast information related to cell access using at least the cell-specific broadcast key to produce encrypted broadcast information, and transmit the encrypted broadcast information in the secure cell via the transceiver.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 21 is a flow chart of an exemplary method for securely receiving broadcast information related to cell access on a wireless communication device according to some aspects.

FIG. 22 is a flow chart of another exemplary method for securely receiving broadcast information related to cell access on a wireless communication device according to some aspects.

FIG. 23 is a flow chart of another exemplary method for securely receiving broadcast information related to cell access on a wireless communication device according to some aspects.

FIG. 24 is a flow chart of another exemplary method for securely receiving broadcast information related to cell access on a wireless communication device according to some aspects.

FIG. 26 is a flow chart of another exemplary method for securely transmitting broadcast information related to cell access by a RAN node according to some aspects.

FIG. 28 is a flow chart of another exemplary method for securely transmitting broadcast information related to cell access by a RAN node according to some aspects.

FIG. 29 is a flow chart of another exemplary method for securely transmitting broadcast information related to cell access by a RAN node according to some aspects.

DETAILED DESCRIPTION

Figure 1:
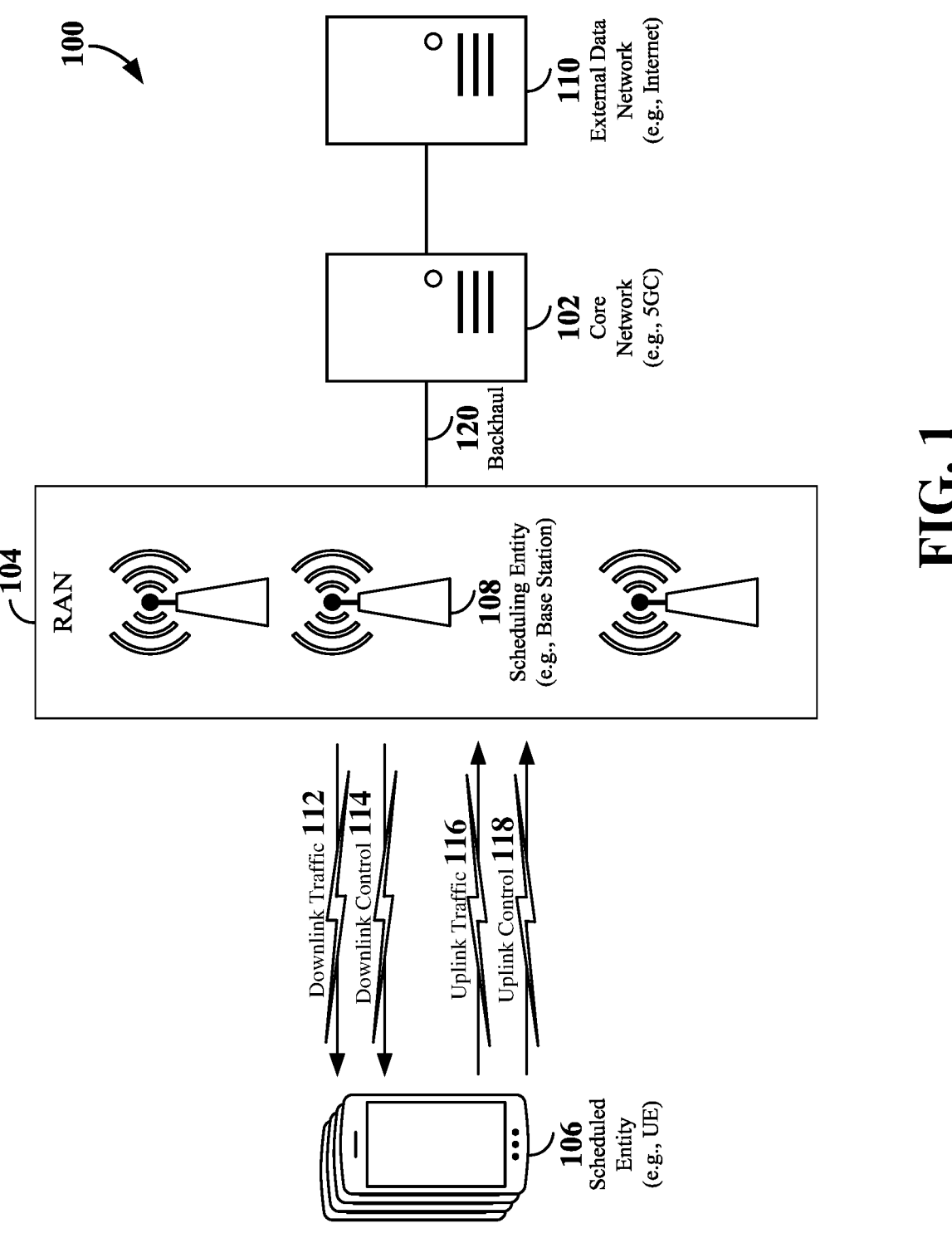
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for securely communicating broadcast information related to cell access within a cell. The broadcast information may be encrypted using a cell-specific broadcast key that may be derived from a broadcast root key that is refreshed periodically in a wireless communication network. For example, the cell-specific broadcast key may be derived using a key derivation function of the broadcast root key and at least cell identifying information associated with the secure cell. Here, the term secure cell refers to a cell communicating encrypted and/or integrity protected broadcast information related to cell access.

In some examples, a wireless communication device may obtain the broadcast root key via a secure connection with a provisioning server or core network node within a core network maintaining the broadcast root key or a long term key from which the broadcast root key may be derived. For example, the wireless communication device may be provisioned with the broadcast root key (or long term key) directly by the provisioning server via an out-of-band delivery path (e.g., Wi-Fi, near field communication (NFC), USB port, etc.) or an in-band delivery path (e.g., via a secure connection with the provisioning server during a protocol data unit (PDU) session of the wireless communication device). In some examples, the wireless communication device may connect to the provisioning server through a normal cell (e.g., a cell communicating unencrypted broadcast information related to cell access) to receive the broadcast root key (or long term key) and may then use the broadcast root key to access the secure cell. In some examples, the wireless communication device may perform device authentication and device attestation with the provisioning server to receive the broadcast root key (or long term key). As another example, the wireless communication device may be provisioned with the broadcast root key (or long term key) indirectly by the provisioning server. For example, the provisioning server may provide the broadcast root key (or long term key) to a core network node in the core network, and the core network node may transmit the broadcast root key (or long term key) to the wireless communication device during registration by the wireless communication device with the core network (e.g., via the normal cell).

In some examples, the encrypted broadcast information includes at least a part of an acquisition signal, such as a synchronization signal block (SSB). For example, the SSB may include unencrypted broadcast information enabling the wireless communication device to obtain the cell identifying information and encrypted broadcast information. In an example, the unencrypted broadcast information may include the Primary Synchronization Signal (PSS), Secondary Synchronization Signal (SSS), and the System Frame Number (SFN) in the Physical Broadcast Channel (PBCH), while the encrypted broadcast information may include the remainder of the PBCH. In some examples, the encrypted broadcast information may include the entire SSB. In this example, a radio access network (RAN) node (e.g., a base station) may transmit an unencrypted SSB that includes a modified PBCH containing cell-specific security parameters that may be used to derive the cell-specific broadcast key. The encrypted broadcast information may further include other broadcast information related to cell access, such as the SIB1 and control information including scheduling information for scheduling the SIB1.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G-NR. As another example, the RAN 104 may operate under a hybrid of 5G-NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
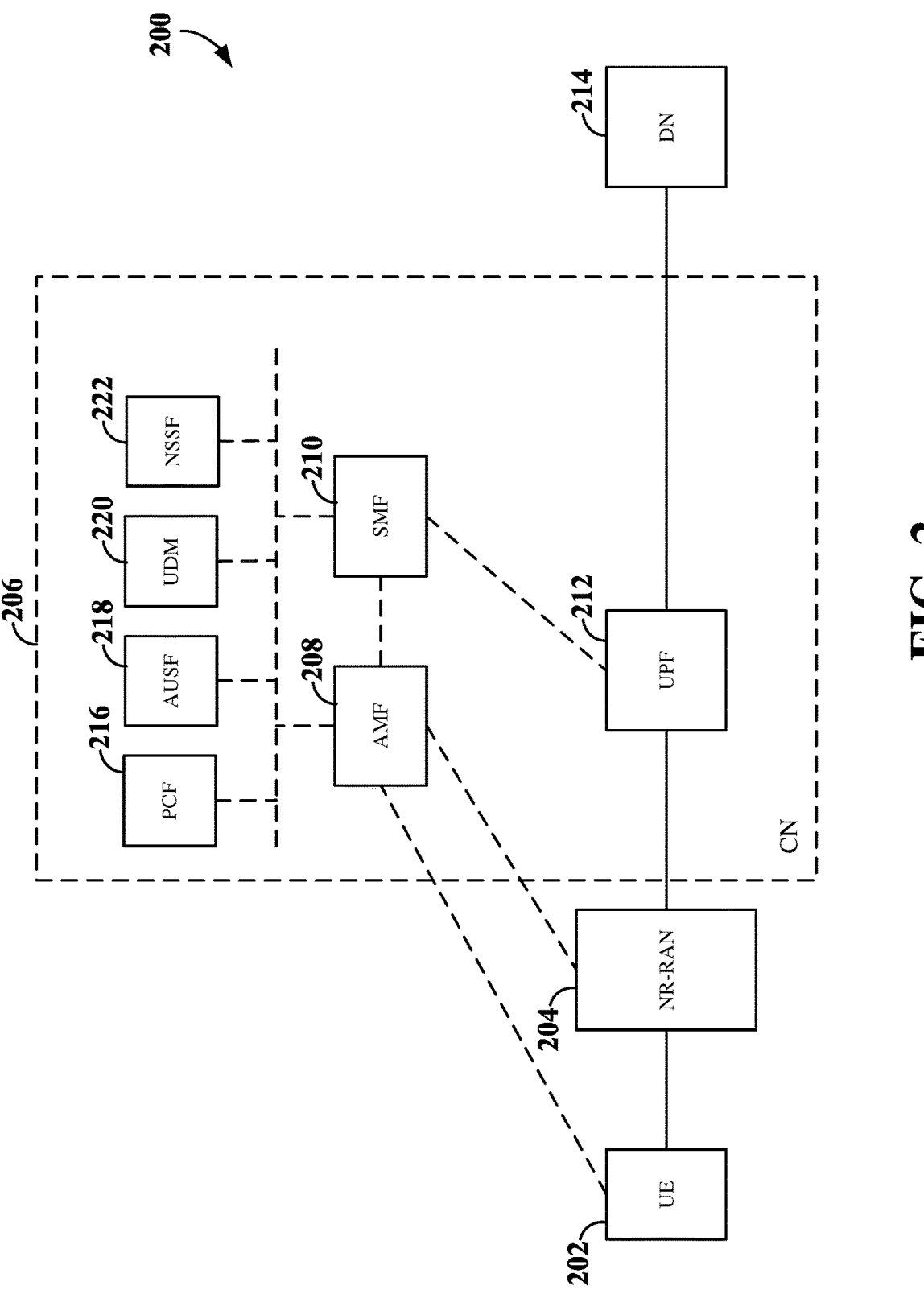
FIG. 2 is a block diagram illustrating an example of a 5G wireless communication system (5GS).

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR-RAN 204, and a core network 206. By virtue of the wireless communication system 200, the UE 202 may be enabled to carry out data communication with an external data network 214, such as (but not limited to) the Internet, Ethernet network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR-RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QOS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NR-RANs 204 without having to perform a complete authentication process with the AUSF 218. The NSSF 222 redirects traffic to a network slice. Network slices may be defined, for example, for different classes of subscribers or use cases, such as smart home, Internet of Things (IOT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR-RAN 204, the UE 202 may transmit a registration request and PDU session establishment request to the 5G core network 206 via the NR-RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
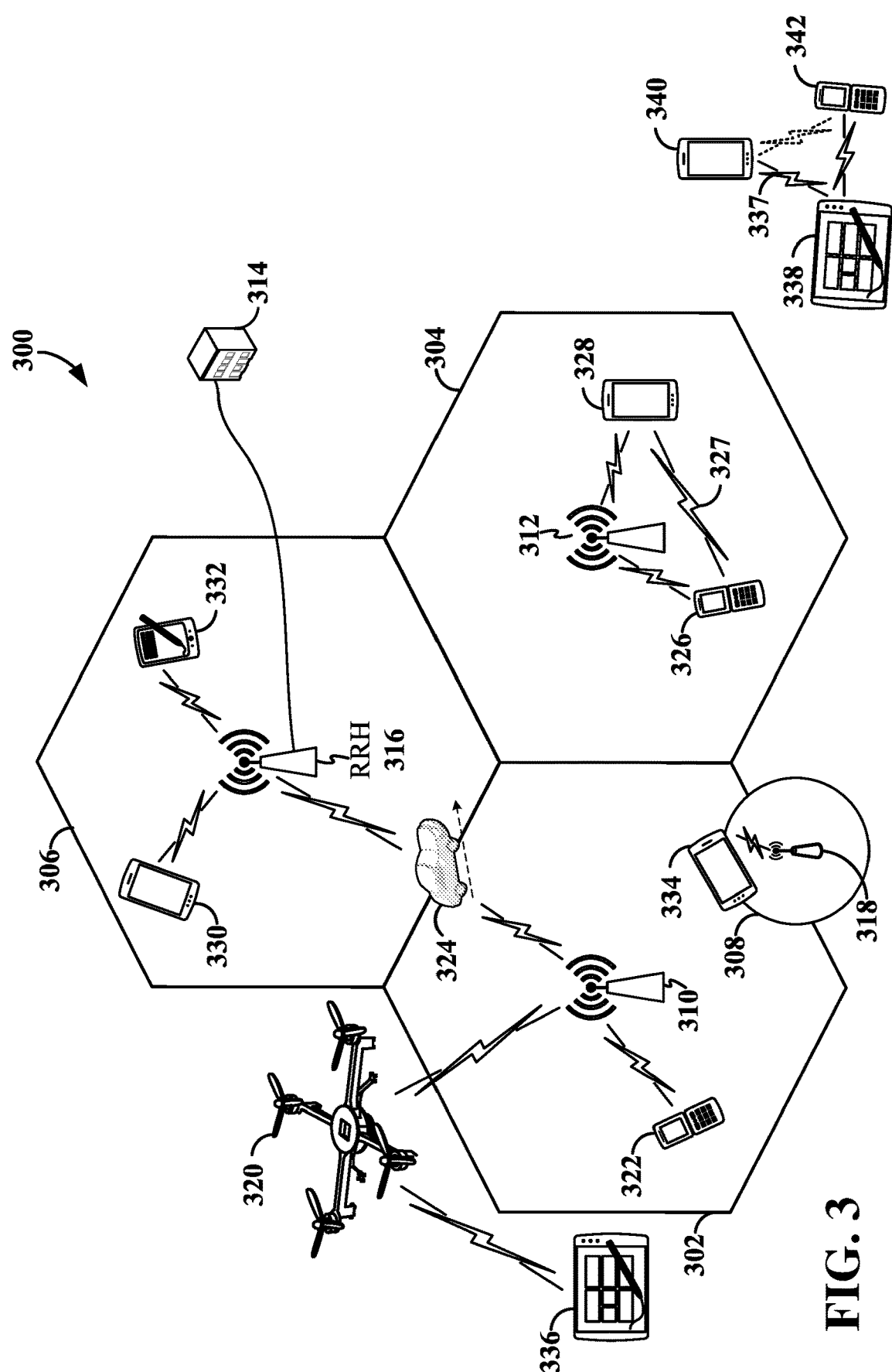
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR-RAN 204 described above and illustrated in FIG. 2.

The geographic area covered by the RAN 300 may be divided into cellular regions (cells) that can be uniquely identified by a user equipment (UE) based on an identification broadcasted from one access point or base station. FIG. 3 illustrates cells 302, 304, 306, and 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 3, two base stations 310 and 312 are shown in cells 302 and 304. A third base station 314 is shown controlling a remote radio head (RRH) 316 in cell 306. That is, a base station can have an integrated antenna or can be connected to an antenna or RRH by feeder cables. In the illustrated example, the cells 302, 304, and 306 may be referred to as macrocells, as the base stations 310, 312, and 314 support cells having a large size. Further, a base station 318 is shown in the cell 308 which may overlap with one or more macrocells. In this example, the cell 308 may be referred to as a small cell (e.g., a microcell, picocell, femtocell, home base station, home Node B, home eNode B, etc.), as the base station 318 supports a cell having a relatively small size. Cell sizing can be done according to system design as well as component constraints.

It is to be understood that the RAN 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes an unmanned aerial vehicle (UAV) 320, which may be a drone or quadcopter. The UAV 320 may be configured to function as a base station, or more specifically as a mobile base station. That is, in some examples, a cell may not necessarily be stationary, and the geographic area of the cell may move according to the location of a mobile base station, such as the UAV 320.

Within the RAN 300, the cells may include UEs that may be in communication with one or more sectors of each cell. Further, each base station 310, 312, 314, and 318 may be configured to provide an access point to a core network (e.g., as illustrated in FIGS. 1 and/or 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; and UE 334 may be in communication with base station 318. In some examples, the UEs 322, 324, 326, 328, 330, 332, 334, 338, 340, and/or 342 may be the same as the UE/scheduled entity 106 described above and illustrated in FIG. 1 and/or the UE 202 described above and illustrated in FIG. 2. In some examples, the UAV 320 (e.g., the quadcopter) can be a mobile network node and may be configured to function as a UE. For example, the UAV 320 may operate within cell 302 by communicating with base station 310.

In a further aspect of the RAN 300, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 338, 340, and 342) may communicate with each other using sidelink signals 337 without relaying that communication through a base station. In some examples, the UEs 338, 340, and 342 may each function as a scheduling entity or transmitting sidelink device and/or a scheduled entity or a receiving sidelink device to schedule resources and communicate sidelink signals 337 therebetween without relying on scheduling or control information from a base station. In other examples, two or more UEs (e.g., UEs 326 and 328) within the coverage area of a base station (e.g., base station 312) may also communicate sidelink signals 327 over a direct link (sidelink) without conveying that communication through the base station 312. In this example, the base station 312 may allocate resources to the UEs 326 and 328 for the sidelink communication.

In the RAN 300, the ability for a UE to communicate while moving, independent of its location, is referred to as mobility. The various physical channels between the UE and the radio access network are generally set up, maintained, and released under the control of the AMF 208, illustrated in FIG. 2.

A RAN 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the radio access network 300. Each of the cells may measure a strength of the pilot signal, and the radio access network (e.g., one or more of the base stations 310 and 314/316 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 300 may utilize one or more multiplexing and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 300 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., serveral times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 4. It should be understood by those of ordinary skill in the art that the various aspects of the present disclosure may be applied to an SC-FDM waveform (e.g., a DFT-s-OFDM waveform) in substantially the same way as described herein below. That is, while some examples of the present disclosure may focus on an OFDM link for clarity, it should be understood that the same principles may be applied as well to SC-FDM waveforms.

Figure 4:
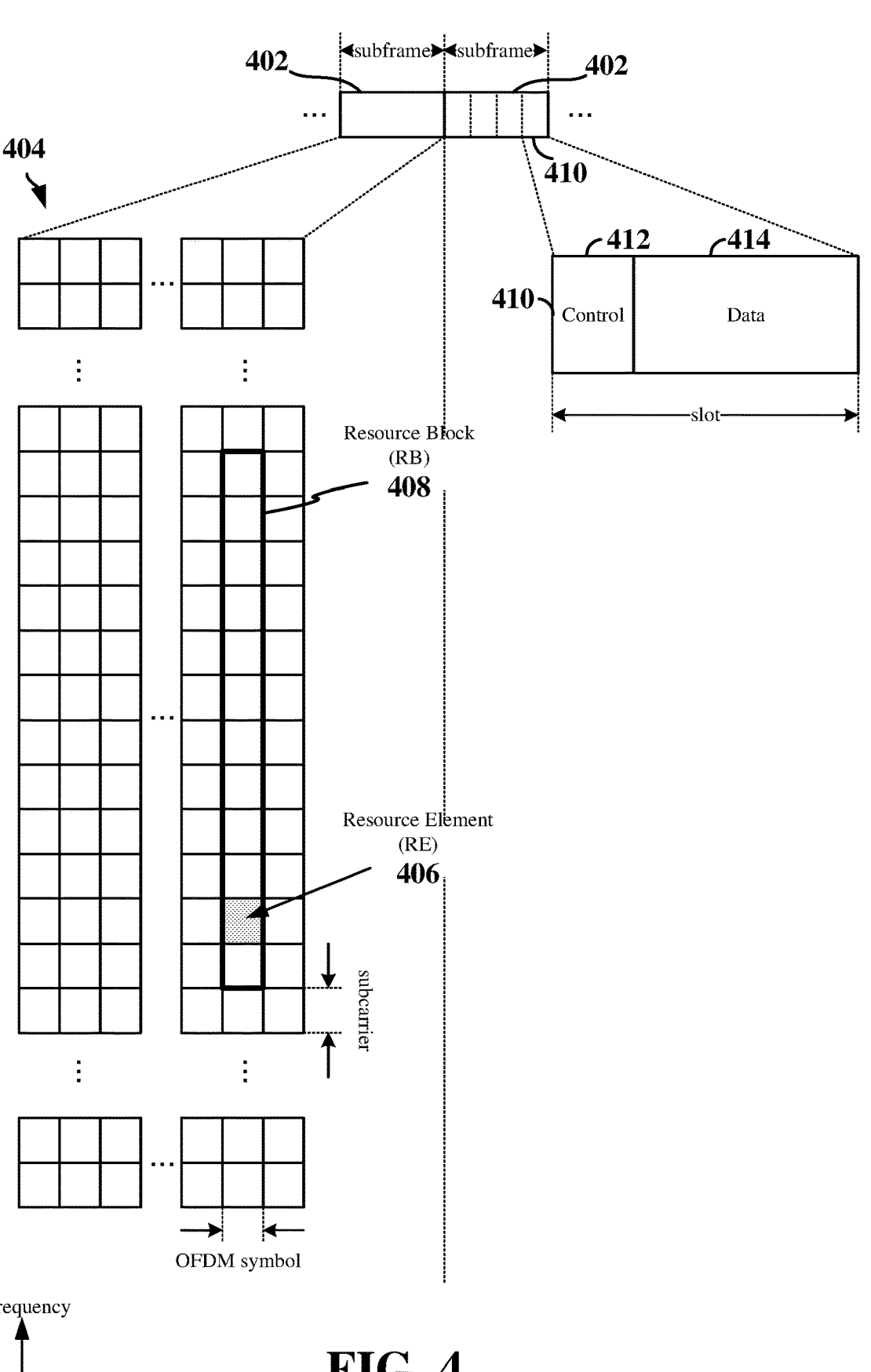
FIG. 4 is a diagram illustrating an example of a frame structure for use in a radio access network according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier× 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB 1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
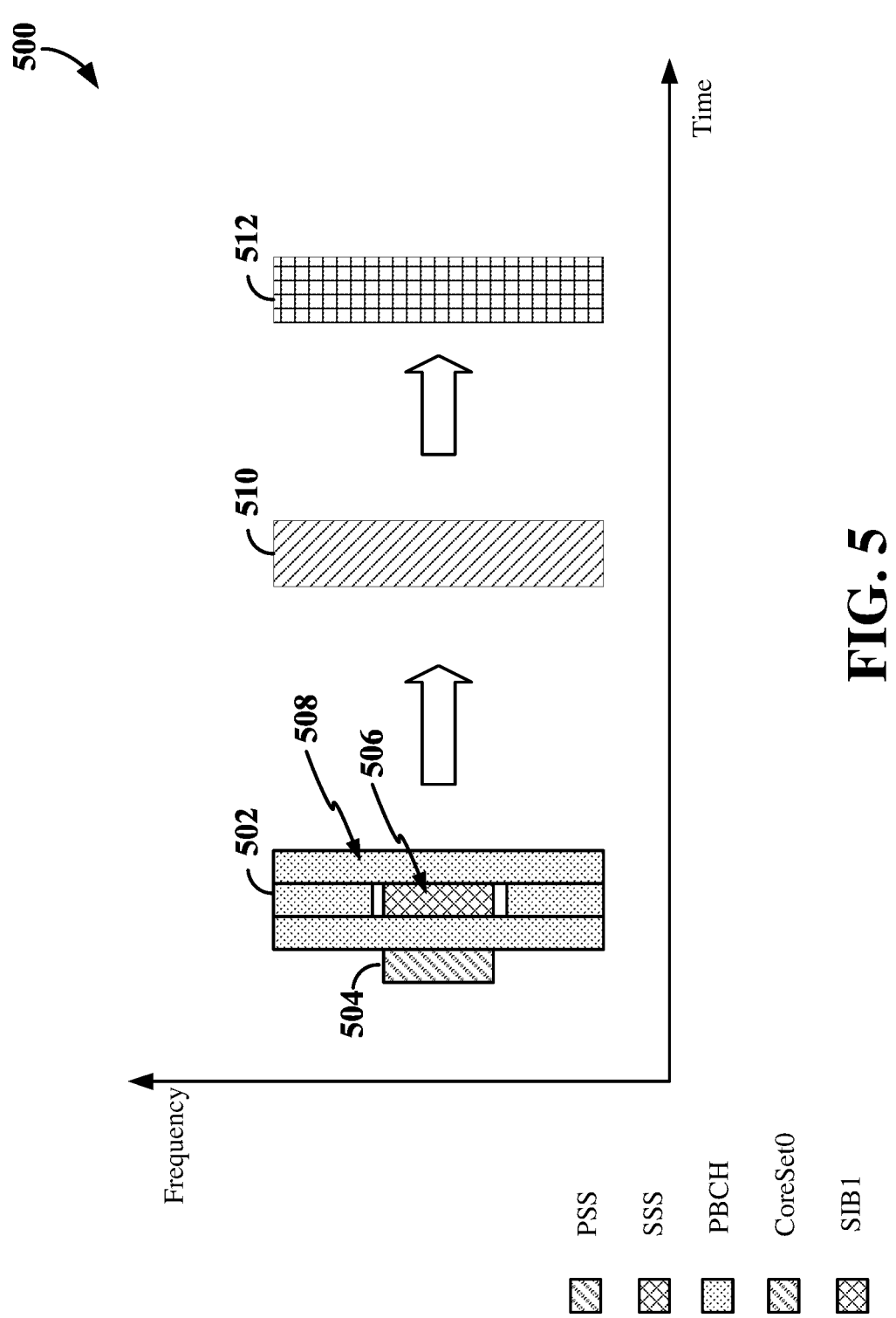
FIG. 5 is a diagram illustrating various broadcast information related to cell access according to some aspects.

FIG. 5 is a diagram illustrating various broadcast information 500 related to cell access according to some aspects. The broadcast information 500 may be transmitted by a RAN node (e.g., a base station, such as an eNB or gNB) on resources (e.g., time-frequency resources) allocated for the transmission of the broadcast information 500 in a cell. The broadcast information 500 includes an acquisition signal 502 that includes cell identifying information. In some examples, the acquisition signal 502 may include a synchronization signal block (SSB). The SSB 502 may be transmitted within, for example, the first four OFDM symbols (e.g., within a control region) of a slot in the time domain and over 20 PRBs in the frequency domain. In addition, the SSB 502 may have a periodicity of, for example, 20 ms or other suitable periodicity. In the example shown in FIG. 5, the broadcast information 500 may further include a CORESET0 510 and a SIB1 512.

The SSB 502 may include a PSS 504, a SSS 506, and a PBCH 508. The PSS 504 may include a PSS sequence selected from a set of PSS sequences. In addition, the SSS 506 may include a SSS sequence selected from a set of SSS sequences. In some examples, the PSS/SSS sequences identify the PCI (e.g., the PCI of the cell within which the SSB 502 is transmitted). In some examples, the cell identifying information may include the PCI.

The PBCH 508 includes the MIB carrying various system information (SI) including, for example, a cell barred indication, the subcarrier spacing, the system frame number, and scheduling information for the CORESET0 510. For example, the PBCH 508 may include scheduling information indicating time-frequency resources allocated for the COERSET0 510. In some examples, the CORESET0 510 may be transmitted within the first four symbols (e.g., within a control region) of a slot. In addition, the CORESET0 510 carries a PDCCH with DCI that contains scheduling information for scheduling the SIB1 512. The SIB1 512 is carried within a physical downlink shared channel (PDSCH) within a data region of a slot. In addition, the SIB1 512 contains remaining minimum system information (SI), including, for example, a set of radio resource parameters providing network identification and configuration. For example, the set of radio resource parameters may include a bandwidth (e.g., number of BWPs) on which a UE may communicate with a base station.

In public network deployments, a UE should be able to receive the broadcast information 500 related to cell access to select and camp on a cell. However, in private network deployments, the network operator may restrict access to authorized UEs and may implement procedures to address vulnerability to DoS attacks. In various aspects of the disclosure, to protect against various types of DoS attacks, at least a portion of the broadcast information 500 related to cell access may be encrypted (ciphered). The encrypted broadcast information 500 may be decrypted by authorized UEs for cell access and other purposes (e.g., cell re-selection or other suitable purpose). In some examples, a minimum portion (e.g., one or more information elements (IEs)) of the broadcast information 500 may be unencrypted for cell identification and cell-specific encryption/decryption. For example, the PSS 504 and SSS 506 may be decrypted, along with a portion of the PBCH 508 (e.g., the portion of the PBCH containing the system frame number). The remaining IEs of the PBCH 508, the CORESET0 510 and the SIB1 512 may be encrypted. In addition, the encrypted portions of the SSB 502, the CORESET0 510 and the SIB1 512 may be integrity protected to verify the integrity of the broadcast messages (e.g., verify that the broadcast messages have not been modified by or relayed by an attacker).

In various aspects of the disclosure, the broadcast messages may be encrypted and integrity protected using a broadcast key. To enable an authorized UE to decrypt the encrypted broadcast information, the broadcast key may be provisioned on the UE. Here, an authorized UE is a UE that has obtained the broadcast key from the network using various mechanisms, such as in-band (e.g., via a cellular network) or out-of-band (e.g., via an external network) mechanisms. In some examples, the broadcast key may be a cell-specific broadcast key that is unique to each cell within the wireless communication network (or unique to a group of cells within an area or region of the network). Therefore, as the UE moves throughout the wireless communication network, the UE is provisioned with a different cell-specific broadcast key for each cell. However, separately provisioning the UE with a new cell-specific broadcast key each time the UE moves into a new cell may undesirably increase the signaling overhead. As such, to reduce signaling in the network, the UE may be provisioned with a broadcast root key that may be used by the UE to derive the cell-specific broadcast key. The broadcast root key (and therefore, the cell-specific broadcast keys) may be periodically updated (refreshed) in the network to improve security in the network. In addition, multiple broadcast root keys may be generated, each allocated to a different set of cells or different set of UEs to reduce key updates or key revocations in case of key compromise.

Figure 6:
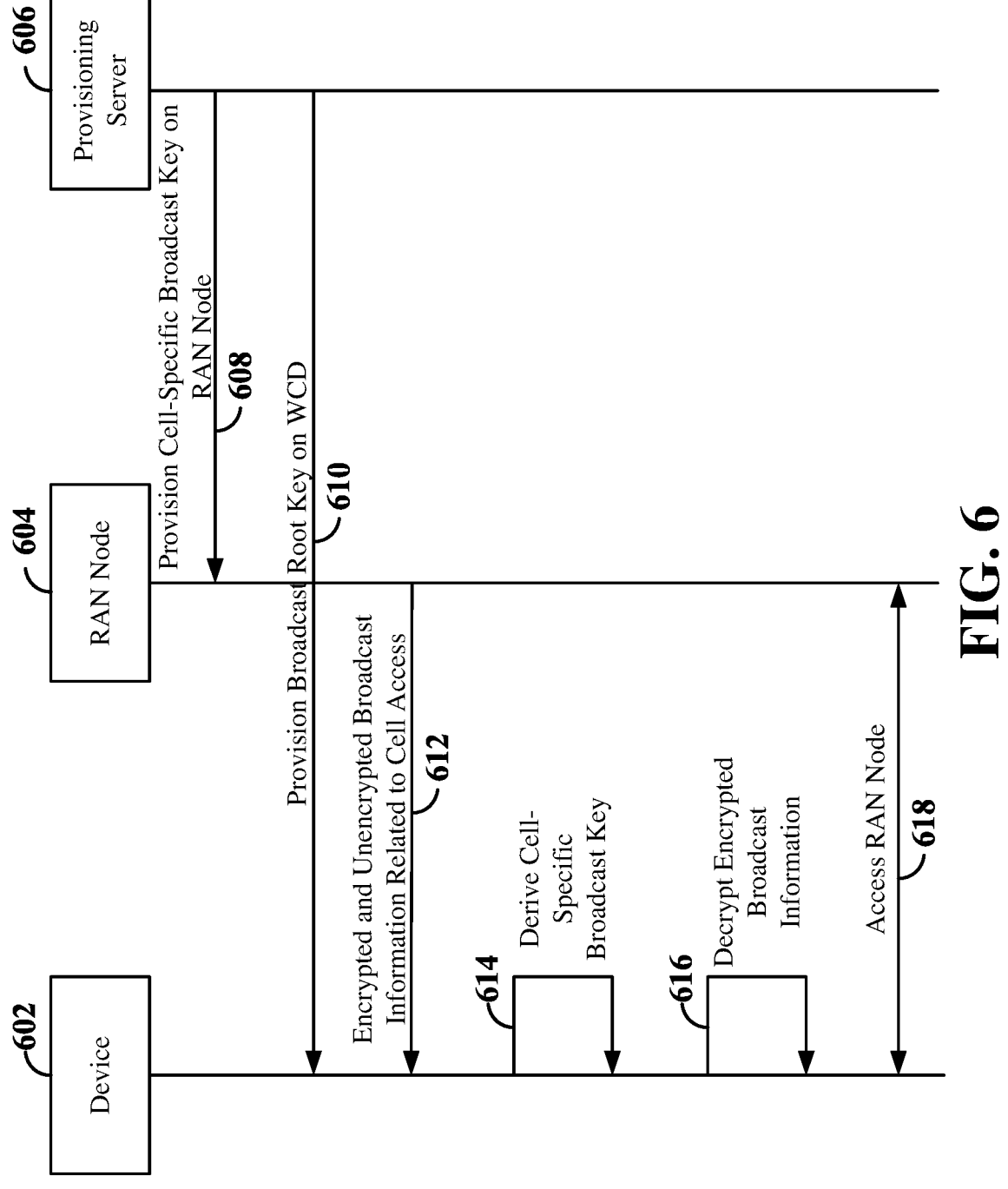
FIG. 6 is a signaling diagram illustrating exemplary signaling to provide secure communication of broadcast information related to cell access according to some aspects.

FIG. 6 is a signaling diagram illustrating exemplary signaling to provide secure communication of broadcast information related to cell access according to some aspects. In the example shown in FIG. 6, a wireless communication device 602 is attempting to access a secure cell served by a RAN node 604. The RAN node 604 may correspond to any of the base stations (e.g., gNB, eNB, etc.) or scheduling entities as shown in FIGS. 1-3. In addition, the wireless communication device 602, which may hereinafter be referred to generally as a device, may correspond to any of the UEs or scheduled entities as shown in FIGS. 1-3. The device 602 may attempt cell access, for example, upon entering the wireless communication network (e.g., a private network), powering on, or transitioning from a radio resource control (RRC) idle state to an RRC connected state.

A provisioning server 606 is configured to generate one or more broadcast keys for use in encrypting and integrity protecting broadcast information related to cell access. In some examples, the broadcast key(s) are broadcast root key(s) from which cell-specific broadcast keys may be derived. The broadcast root key(s) may expire after a certain, predetermined duration of time, and therefore, the provisioning server 606 may generate new broadcast root key(s) prior to expiration of the current broadcast root key(s). In some examples, the provisioning server 606 may generate one or more long term keys from which the broadcast root key(s) may be derived. Multiple broadcast root keys and/or multiple long term keys may be generated and provided to different groups of devices or different groups of RAN nodes to avoid updating each of the devices and RAN nodes with new keys in the instance of key compromise of one of the keys. In some examples, the provisioning server 606 may be external to the wireless communication system (e.g., the wireless communication system including the RAN and the core network). For example, the provisioning server 606 may be within an external data network, such as (but not limited to) a private data network (e.g., via the Internet or a local area network (LAN)).

At 608, the provisioning server 606 may provision a cell-specific broadcast key on the RAN node 604. The cell-specific broadcast key may be unique to the secure cell served by the RAN node 604 (e.g., unique within the wireless communication network including the RAN node 604 or unique to a group of cells within the wireless communication network). In some examples, the provisioning server 606 may generate one or more broadcast root keys and provide the generated broadcast root key(s) to a core network node within a core network (e.g., the core network 206 shown in FIG. 2). The core network node may then derive the cell-specific broadcast keys for each secure cell in the wireless communication network from the broadcast root key(s) and provision the cell-specific broadcast key for each secure cell on the corresponding serving RAN node. In some examples, the core network node that derives and provisions the cell-specific broadcast key on the RAN node 604 may include one or more of the AMF, UDM, or a new key management function (KMF) within the core network. In some examples, a network operator of the wireless communication system may configure an Operations, Administration, and Maintenance (OAM) node coupled to or included within the core network to provision the cell-specific broadcast key on the RAN node 604. The OAM node may be responsible, for example, for provisioning and/or managing the wireless communication system or one or more elements (e.g., one or more nodes) within the wireless communication system.

In some examples, a RAN node (e.g., RAN node 604) may serve two or more secure cells. Therefore, the RAN node 604 may be provisioned with a separate, different cell-specific broadcast key for each of the secure cells served by the RAN node 604. In some examples, the RAN node 604 may be provisioned with a RAN node specific key (e.g., a broadcast RAN key) and may derive the respective cell-specific broadcast keys for each secure cell served by the RAN node 604 from the broadcast RAN key.

At 610, the provisioning server 606 may provision a broadcast root key on the device 602. In some examples, the provisioning server 606 may directly provision the broadcast root key and an expiration time of the broadcast root key on the device 602. For example, the provisioning server 606 may directly provision the broadcast root key on the device 602 via an in-band delivery path (e.g., through the private wireless communication network) or an out-of-band delivery path (e.g., through a Wi-Fi connection to the private network, through a near field communication (NFC) connection to the private network, or through a USB port connection to the private network). In some examples, the provisioning server 606 may perform device authentication, device attestation, or both with the device 602 prior to provisioning the broadcast root key on the device 602. In other examples, the provisioning server 606 may transmit the broadcast root key to a core network node (e.g., an AMF) within the core network, which may then transmit the broadcast root key to the device 602 upon successfully registering with the core network.

In some examples, the device 602 may be provisioned with a long term key from which the broadcast root key may be derived using a key derivation function (KDF). Using a long term key may reduce or eliminate the signaling overhead in the network that may result from the device 602 obtaining a new broadcast root key from the provisioning server 606 periodically. For example, the broadcast root key may expire after a predetermined duration of time (e.g., after a key refresh interval) and the device 602 may need to obtain or derive a new broadcast root key before expiration of the old broadcast root key. The device 602 may directly derive the new broadcast root key from the long term key without needing to obtain the new broadcast root key from the provisioning server 606.

In some examples, the broadcast root key (or long term key) may be included within provisioning information transmitted from the provisioning server 606 or core network node to the device 602. The provisioning information may include additional information, such as the key refresh interval, the current time, and/or a key identifier (ID) of the long term key or broadcast root key. Other provisioning information may further include a hyper frame number (HFN) and the SFN, as described below. In some examples, the long term key may be used for other purposes (e.g., other than deriving broadcast root keys), and therefore, the provisioning information may further include a code for broadcast root key derivation. The device 602 may set a system clock on the device to the current time for use in updating the broadcast root key based on the key refresh interval.

At 612, the RAN node 604 may broadcast encrypted and unencrypted information related to cell access in the secure cell. In some examples, the unencrypted information includes cell-identifying information that uniquely identifies the secure cell. For example, the unencrypted information may include the PSS and SSS of an SSB. The PSS and SSS may be used to determine the PCI of the secure cell and the absolute radio frequency channel number (ARFCN) specifying a carrier frequency (or pair of carrier frequencies corresponding to uplink and downlink frequencies in FDD systems) utilized in the cell. In some examples, the cell-identifying information may include the PCI by itself or a concatenation of the PCI and ARFCN (PCI∥ARFCN). The latter may be used, for example, in wireless communication networks that re-use PCIs between distant cells (e.g., cells within different tracking areas or registration areas). In addition, the unencrypted information may further include the system frame number (SFN) within the MIB of the PBCH.

The encrypted information may include, for example, the remainder of the MIB (e.g., the MIB except for the SFN), a CORESET0, and a SIB1. The encrypted information may be encrypted utilizing, for example, the cell-specific broadcast key. In some examples, the encrypted information may be encrypted using the cell-specific broadcast key and a freshness parameter (e.g., a counter). In one example, the freshness parameter may include the current time. In another example, the freshness parameter may include the SFN. In still another example, the freshness parameter includes a combination (e.g., concatenation) of the HFN and the SFN of the wireless communication network. A hyper frame may include, for example, 1,024 frames, and there may be 1,024 hyper frames in one hyper frame cycle. Thus, the SFN may range between 0 and 1,023 and the HFN may range between 0 and 1,023. The SFN and HFN may each include 10 bits. As such, combining the HFN with the SFN results in unique combinations of the cell-specific broadcast key and freshness parameter for approximately three hours, at which time, the broadcast root key (and corresponding cell-specific broadcast key for the secure cell) may be changed. Therefore, in this example, the key refresh interval may correspond to the wrap-around time of the freshness parameter. The SFN and/or combination of HFN and SFN is merely one example of a freshness parameter, and other suitable freshness parameters may be utilized in other examples.

In examples in which a combination of the HFN and SFN are used as a freshness parameter, the provisioning information provided to the device 602 by the core network node or provisioning server 606 may include the HFN and the SFN. Here, the SFN is included in the provisioning information (along with the SFN being transmitted within the MIB by the RAN node 604) to minimize error when correlating the SFN received by the RAN node 603 with the HFN.

The encrypted broadcast information may further be integrity protected using a message authentication code derived from the cell-specific broadcast key and the encrypted broadcast information. In some examples, the key used for the message authentication code may be an integrity protection key derived from the cell-specific broadcast key. The device 602 may check the message authentication code to verify the integrity of the broadcast information before or after decrypting the encrypted broadcast information. The order of decryption and integrity verification depends on the order of encryption and integrity protection. For example, when the broadcast information is first encrypted and then integrity protected by the RAN node 604, the device 602 may first check the integrity and then decrypt the broadcast information. As another example, when the broadcast information is first integrity protected and then encrypted by the RAN node, the device 602 may first decrypt the broadcast information and then check the integrity.

At 614, the device 602 may derive the cell-specific broadcast key based on the broadcast root key and the cell identifying information (e.g., the PCI or PCI||ARFCN). For example, the PCI includes 10 bits, and therefore, in private network deployments that include more than 1,000 cells, the PCI alone may not uniquely identify a cell. Therefore, the combination (or concatenation) of the PCI and ARFCN may be used to uniquely identify the cell, and as such, to derive a unique cell-specific broadcast key. For example, the device 602 may derive the cell-specific broadcast key using a key derivation function (KDF) of the broadcast root key and the cell identifying information. In some examples, the device 602 may further utilize other cell-specific security parameters in deriving the cell-specific broadcast key. The additional cell-specific security parameters may be used, for example, in large scale private network cell deployments including numerous cells, such that the combination of the PCI and ARFCN does not uniquely identify a cell in the network. Examples of cell-specific security parameters may include, but are not limited to, the key ID of the broadcast root key, other cell identifying information (e.g., a random number assigned to the cell), an identifier of the RAN node 604, a security algorithm, or an additional freshness parameter (e.g., an additional counter, which may include the current time, the SFN, the HFN, or a combination of the SFN and the HFN).

In some examples, the device 602 may derive the broadcast RAN key from the broadcast root key and then further derive the cell-specific broadcast key from the broadcast RAN key. For example, the device 602 may derive the broadcast RAN key using a KDF of the broadcast root key and the identifier of the RAN node 604. The device 602 may then derive the cell-specific broadcast key using a KDF of the broadcast RAN key and the cell identifying information (e.g., the PCI, PCI||ARFCH, or other cell identifying information, such as the cell-identifying information received as part of the cell-specific security parameters).

At 616, the device 602 may use the cell-specific broadcast key to decrypt the encrypted broadcast information. In some examples, the device 602 may use a combination of the cell-specific broadcast key and the freshness parameter (e.g., the current time, the SFN, or combination of the HFN and SFN) to decrypt the encrypted broadcast information and produce decrypted broadcast information. In some examples, the device 602 may further derive a broadcast protection key from the cell-specific broadcast key to decrypt the encrypted broadcast information. In this example, the encrypted broadcast information is encrypted using the broadcast protection key. At 618, the device 602 may access the RAN node 604 and register with the core network utilizing the unencrypted broadcast information and the decrypted broadcast information. In some examples, instead of cell access, the device 602 may use the unencrypted broadcast information and decrypted broadcast information for cell re-selection or other suitable purpose.

Figure 7B:
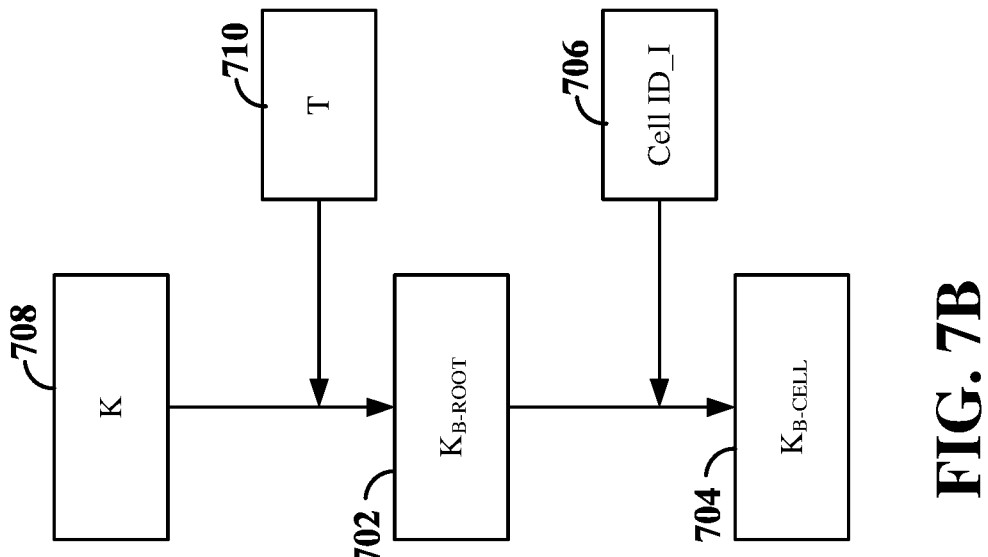
FIGS. 7A and 7B illustrate exemplary key derivations of the cell-specific broadcast key according to some aspects.
Figure 7A:
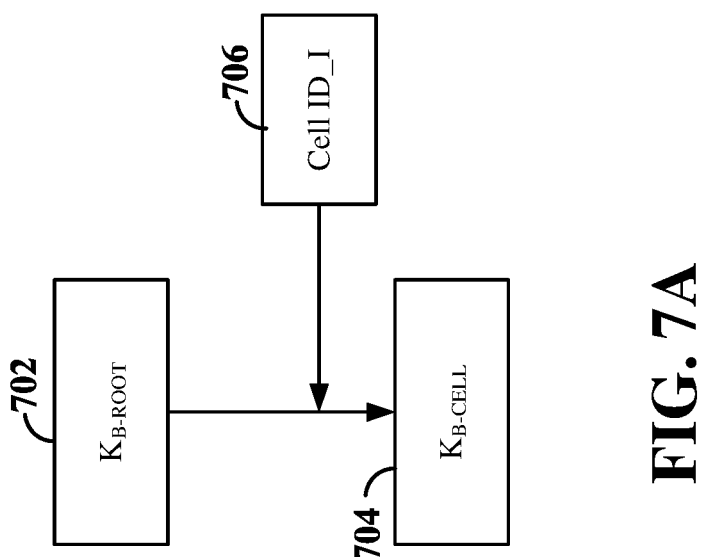

FIGS. 7A and 7B illustrate exemplary key derivations of the cell-specific broadcast key according to some aspects. In the example shown in FIG. 7A, the cell-specific broadcast key ($K_{B-CELL}$) 704 is derived from the broadcast root key ($K_{B-ROOT}$) 702 and the cell identifying information (Cell ID_I) 706. For example, the cell-specific broadcast key ($K_{B-CELL}$) may be derived as follows:

$$K_{B-CELL}=KDF(K_{B-ROOT}, \text{Cell } ID\_I) \qquad \text{(Equation 1),}$$

where Cell ID_I is the PCI, PCI||ARFCN, or other suitable cell identifying information.

In the example shown in FIG. 7B, the broadcast root key ($K_{B-ROOT}$) 702 is derived from a long term key (K) 708 and a refresh parameter (T) 710. In some examples, the refresh parameter 710 may be determined based on a current time ($T_{current}$) and a key refresh interval ($T_{refresh}$). The current time ($T_{current}$) and key refresh interval ($T_{refresh}$) may be included within the provisioning information transmitted to the device. As described above, the provisioning information may include the long term key, the key refresh interval, the current time, a key identifier (ID) of the long term key or broadcast root key, the HFN, and the SFN.

For example, the refresh parameter (T) 710 may include a quotient of a current counter value of a counter set based on the current time ($T_{current}$) and the key refresh interval ($T_{refresh}$). In some examples, the counter may correspond to a system clock of the device, and the device may set the system clock to the current time ($T_{current}$) upon receiving the provisioning information. For example, the broadcast root key ($K_{B-ROOT}$) may be derived as follows:

$$K_{B-ROOT}=KDF(K,T,[\text{optional param}]) \qquad \text{(Equation 2),}$$

where T=$[T_{current}/T_{refresh}]$. Once the counter value increases by an amount equal to the key refresh interval, the value of $K_{B-ROOT}$ changes, thus generating a new $K_{B-ROOT}$ at the expiration of each key refresh interval.

Other optional parameters that may be used to derive $K_{B-ROOT}$ may include one or more of the key ID associated with the long term key K (e.g., in examples in which more than one long term key is generated and used in the wireless communication network), a network identifier associated with the RAN, a tracking area code associated with a tracking area including the secure cell, an area identifier associated with the RAN node, or a registration area code associated with a registration area including the secure cell. The cell-specific broadcast key ($K_{B-CELL}$) 704 may then be derived based on $K_{B-ROOT}$ 702 and the cell identifying information (Cell ID_I) 706, as defined in Equation 1 above. In some examples, the refresh parameter (T) 710 may be used as a key ID of the cell-specific broadcast key.

Figure 8:
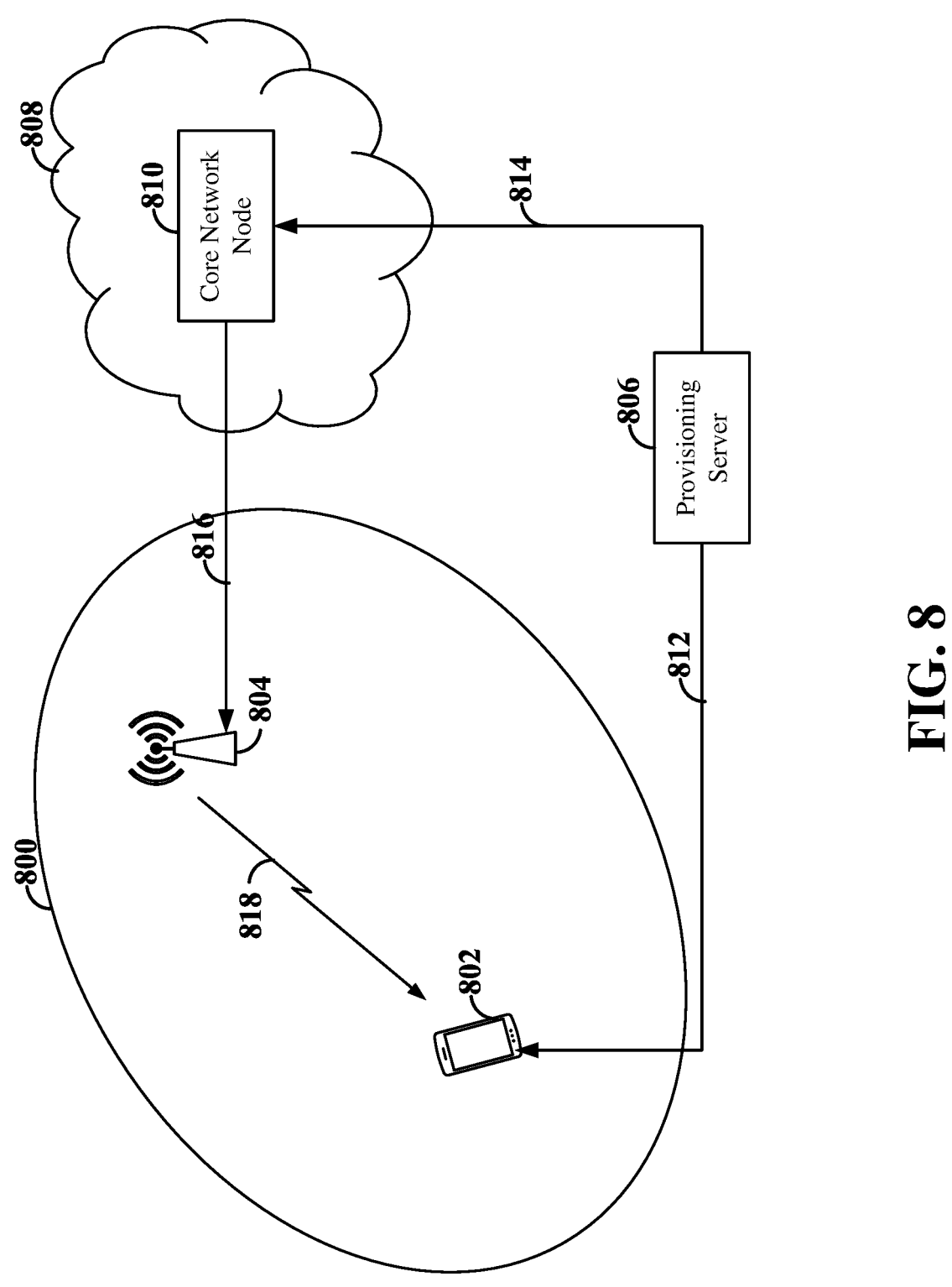
FIG. 8 is a diagram illustrating an example of an out-of-band delivery path for provisioning a cell-specific broadcast key according to some aspects.

FIG. 8 is a diagram illustrating an example of an out-of-band delivery path for provisioning a cell-specific broadcast key according to some aspects. In the example shown in FIG. 8, a device (e.g., UE) 802 is located within a secure cell 800 served by a RAN node (e.g., base station, such as a gNB) 804. The RAN node 804 may correspond to any of the base stations (e.g., gNB, eNB, etc.) or scheduling entities as shown in FIGS. 1-3. In addition, the device 802 may correspond to any of the UEs or scheduled entities as shown in FIGS. 1-3.

The RAN node 804 is coupled to a core network 808 (e.g., the core network 206 of FIG. 2) including a core network node 810. The core network node 810 may include one or more of an AMF, UDM, KMF or an OAM (which may be external to the core network 808). A provisioning server 806 is shown external to the wireless communication system (e.g., external to the RAN including the RAN node 804 and core network 808). For example, the provisioning server 806 may be within an external data network, such as (but not limited to) a private data network (e.g., via the Internet or LAN). In some examples, the provisioning server 806 may correspond to the provisioning server 606 shown in FIG. 6.

The provisioning server 806 is configured to generate one or more broadcast keys (e.g., broadcast root keys or long term keys) for use in encrypting and integrity protecting broadcast information related to cell access. Multiple broadcast root keys and/or multiple long term keys may be generated and utilized by different groups of devices or different groups of RAN nodes to avoid updating each of the devices and RAN nodes with new keys in the instance of key compromise of one of the keys.

In the example shown in FIG. 8, the provisioning server 806 may be configured to generate and transmit provisioning information 812 to the device 802 via an out-of-band delivery path. The provisioning information may include, for example, the broadcast root key or long term key and the key refresh interval (or expiration time of the broadcast root key). In addition, the provisioning information may further include the current time ($T_{current}$), a key ID of the long term key and/or broadcast root key, and/or the HFN and SFN.

In some examples, the out-of-band delivery path through which the provisioning server directly provides the provisioning information to the device 802 may include a Wi-Fi connection between the device 802 and an access point connected to a private data network including the provisioning server 806. For example, the device 802 may access the provisioning server 806 associated with the private data network to retrieve the provisioning information 812 over Wi-Fi using credentials (e.g., device-specific credentials) provided by the private network to the device 802. In other examples, the out-of-band delivery path may include a near field communication (NFC) connection between the device 802 and a security check point associated with the private data network that is connected to the provisioning server 806. For example, a user may scan an NFC device on the device 802 upon entering the security check point (e.g., at an entrance to a building associated with the private data network) to access the provisioning server 806 and retrieve the provisioning information 812 from the provisioning server 806 using credentials provided by the private data network to the device 802. In other examples, the out-of-band delivery path may include a USB port connection to the private data network including the provisioning server 806. For example, a user may connect a port on the device 802 to a USB port connected to the private data network to retrieve the provisioning information 812 from the provisioning server 806 using credentials provided by the private data network to the device 802. Other out-of-band delivery paths are possible, and the disclosure is not limited to any particular out-of-band delivery path.

In some examples, the credentials provided to the device 802 by the private data network may be used for device authentication. In addition, the device 802 may perform device attestation to check the device security state (e.g., is the operating system up to date, is the screen lock enabled, is the device fingerprint or biometric enabled, etc.). In some examples, the provisioning server 806 may provision a particular long term key (or broadcast root key) on the device 802 based on the device security state of the device 802. In this example, the provisioning server 806 may generate multiple long term keys (or broadcast root keys) and provision different keys on different devices based on the device security states of the devices. The different keys may allow devices access to certain cells.

The provisioning server 806 may further transmit key information 814 to the core network node 810 within the core network. The key information 814 may include, for example, the broadcast root key or long term key and a key refresh interval or expiration time associated with the long term key or broadcast root key. The key information 814 may further include a key ID of the long term key or broadcast root key. In some examples, the key information 814 may further include the current time and HFN/SFN to synchronize the core network node 810 with the provisioning server 806. The core network node 810 may derive the cell-specific broadcast key for the RAN node 804 from the broadcast root key or long term key using, for example, Equations 1 and 2 above. The core network node 810 may then provision the cell-specific broadcast key 816 on the RAN node 804. In some examples, instead of a cell-specific broadcast key, the core network node 810 may derive a broadcast RAN key from the broadcast root key and provision the broadcast RAN key on the RAN node 804.

The RAN node 804 may then transmit broadcast information 818 including encrypted and unencrypted broadcast information related to cell access within the secure cell 800. In some examples, the broadcast information 818 may include an acquisition signal, such as an SSB, a COER-SETO, and a SIB1. The device 802 may use the unencrypted broadcast information (e.g., within the acquisition signal) to obtain cell identifying information and use the cell identifying information and broadcast root key to derive the cell-specific broadcast key. The device 802 may then decrypt the encrypted broadcast information related to cell access to access the secure cell 800 or for other suitable purposes (e.g., cell reselection).

Figure 9:
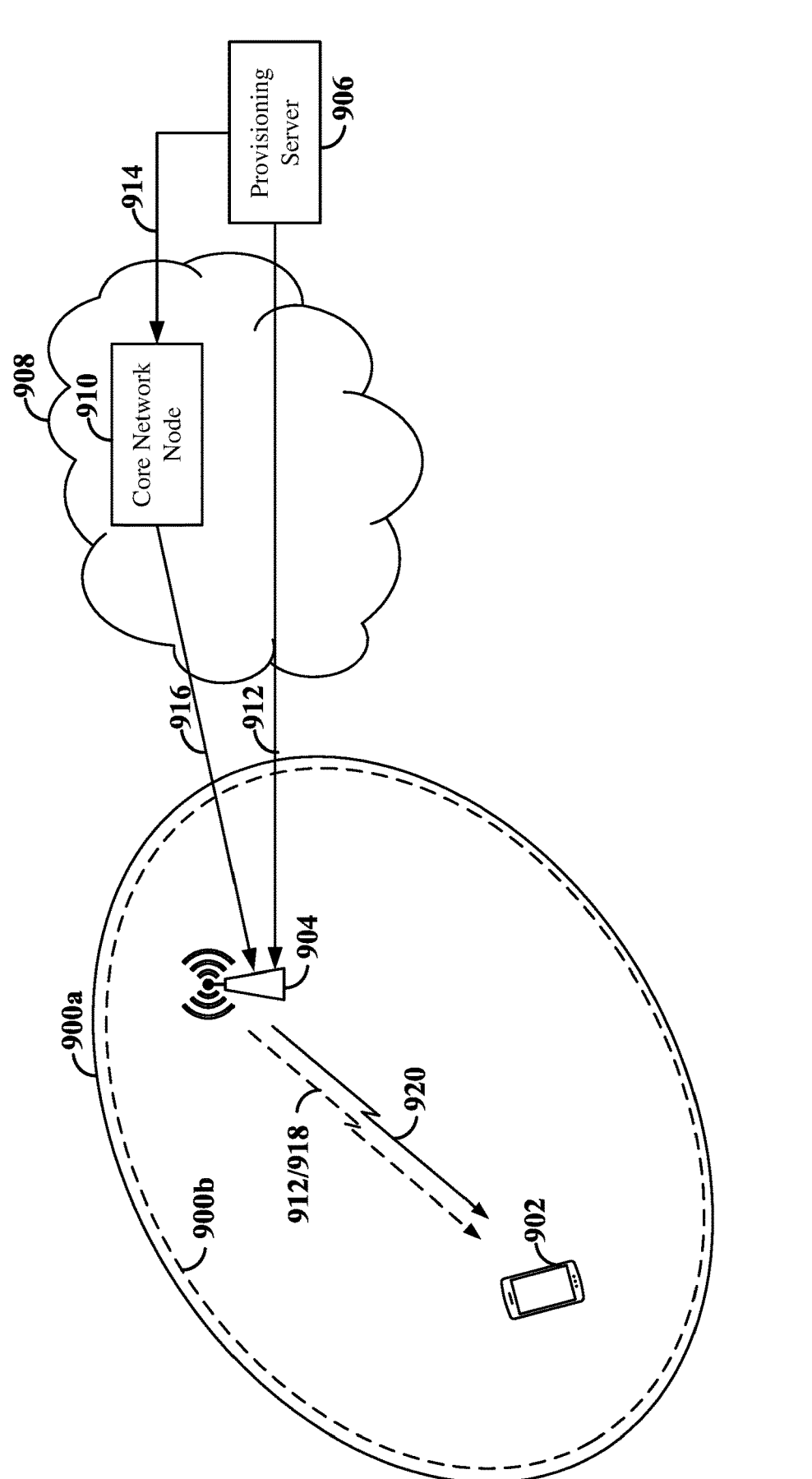
FIG. 9 is a diagram illustrating an example of an in-band delivery path for provisioning a cell-specific broadcast key according to some aspects.

FIG. 9 is a diagram illustrating an example of an in-band delivery path for provisioning a cell-specific broadcast key according to some aspects. In the example shown in FIG. 9, a device (e.g., UE) 902 is located within an area covered by both a secure cell 900a and a normal cell (referred to herein as a pinhole access cell) 900b. The secure cell 900a and pinhole access cell 900b are each identified by a different respective PCI. In addition, the pinhole access cell 900b and secure cell 900a are both served by a same RAN node (e.g., base station, such as a gNB) 904. The RAN node 904 may correspond to any of the base stations (e.g., gNB, eNB, etc.) or scheduling entities as shown in FIGS. 1-3. In addition, the device 902 may correspond to any of the UEs or scheduled entities as shown in FIGS. 1-3.

The RAN node 904 is coupled to a core network 908 (e.g., the core network 206 of FIG. 2) including a core network node 910. The core network node 910 may include one or more of an AMF, UDM, KMF or an OAM (which may be external to the core network 908). A provisioning server 906 is shown external to the wireless communication system (e.g., external to the RAN including the RAN node 904 and core network 908). For example, the provisioning server 906 may be within an external data network, such as (but not limited to) a private data network (e.g., via the Internet or a LAN). In some examples, the provisioning server 906 may correspond to the provisioning server 606 shown in FIG. 6 and/or the provisioning server 806 shown in FIG. 8.

The provisioning server 906 is configured to generate one or more broadcast keys (e.g., broadcast root keys or long term keys) for use in encrypting and integrity protecting broadcast information related to cell access. Multiple broadcast root keys and/or multiple long term keys may be generated and utilized by different groups of devices or different groups of RAN nodes to avoid updating each of the devices and RAN nodes with new keys in the instance of key compromise of one of the keys.

The provisioning server 906 may further be configured to transmit key information 914 to the core network node 910 within the core network. The key information 914 may include, for example, the broadcast root key or long term key and a key refresh interval or expiration time associated with the long term key or broadcast root key. The key information 914 may further include a key ID of the long term key or broadcast root key. In some examples, the key information 914 may further include the current time and HFN/SFN to synchronize the core network node 910 with the provisioning server 906. The core network node 910 may derive the cell-specific broadcast key for the RAN node 904 from the broadcast root key or long term key using, for example, Equations 1 and 2 above. The core network node 910 may then provision the cell-specific broadcast key 916 on the RAN node 904. In some examples, instead of a cell-specific broadcast key, the core network node 910 may derive a broadcast RAN key from the broadcast root key and provision the broadcast RAN key on the RAN node 904.

The pinhole access cell 900*b* broadcasts unencrypted broadcast information 918 related to cell access for use by the device 902 in accessing the pinhole access cell 900*b*. For example, the pinhole access cell 900*b* may broadcast unencrypted SSB, CORESET0, and PBCH to enable the device 902 to access the pinhole access cell 900*b*. Upon accessing the pinhole access cell 900*b*, the device 902 may register with the core network 908. For example, the device 902 may transmit a registration request to the AMF within the core network 908 via the RAN node 904. The AMF may then initiate non access stratum (NAS) level authentication between the device 902 and the core network 908 (e.g., an AUSF and UDM in the core network). The AMF may then retrieve mobility subscription data, SMF selection data, and UE context and communicate with the PCF for policy association for the device 902. The AMF may then send a NAS secure registration accept message to the device 902 to complete the registration.

Once the device 902 has registered with the core network 908, the device 902 may establish a PDU session via the pinhole access cell 900*b*. For example, the device 902 may transmit a PDU session establishment message to the SMF in the core network 908. Based on the policy information associated with the device registration via the pinhole access cell 900*b*, the SMF may allow the device 902 to only establish a connection with the provisioning server 906 in the private external data network via the PDU session. Thus, the pinhole access cell 900*b* limits the device 902 from connecting to any other server or data network other than the provisioning server 906 in the private data network. The connection between the device 902 and the provisioning server 906 may be routed through a UPF (or more than one UPF) in the core network 908, as selected by the SMF.

The device 902 may then perform device authentication and device attestation with the provisioning server 906 to establish a secure connection with the provisioning server 906. For example, the device 902 may use credentials (e.g., device-specific credentials) provided by the private network to perform device authentication. The provisioning server 906 may further check the device security state of the device 902 to perform device attestation. After authentication of the device 902 and passing the requirements for device attestation, the provisioning server 906 may transit provisioning information 912 to the device 902 via the RAN node 904 and the pinhole access cell 900*b*. The provisioning information provided by the provisioning server 906 to the device 902 may include, for example, the broadcast root key or long term key and the key refresh interval (or expiration time of the broadcast root key). In addition, the provisioning information may further include the current time ($T_{current}$), a key ID of the long term key and/or broadcast root key, and/or the HFN and SFN.

In some examples, the RAN node 904 may then transmit an RRC connection release message to the device 902 via the pinhole access cell 900*b*. The RRC connection release message may include redirection information for redirecting the device 902 to the secure cell 900*a*. In other examples, the RAN node 904 may transmit a handover command to the device 902 to initiate a handover of the device 902 from the pinhole access cell 900*b* to the secure cell 900*a*. The device 902 may then receive broadcast information 920 including encrypted and unencrypted broadcast information related to cell access broadcast by the RAN node 904 within the secure cell 900*a*. In some examples, the broadcast information 920 may include an acquisition signal, such as an SSB, along with a CORESET0, and a SIB1. The device 902 may use the unencrypted broadcast information (e.g., within the acquisition signal) to obtain cell identifying information and use the cell identifying information and broadcast root key to derive the cell-specific broadcast key. The device 902 may then decrypt the encrypted broadcast information related to cell access to access the secure cell 900*a* or for other suitable purposes (e.g., cell reselection).

Figure 10:
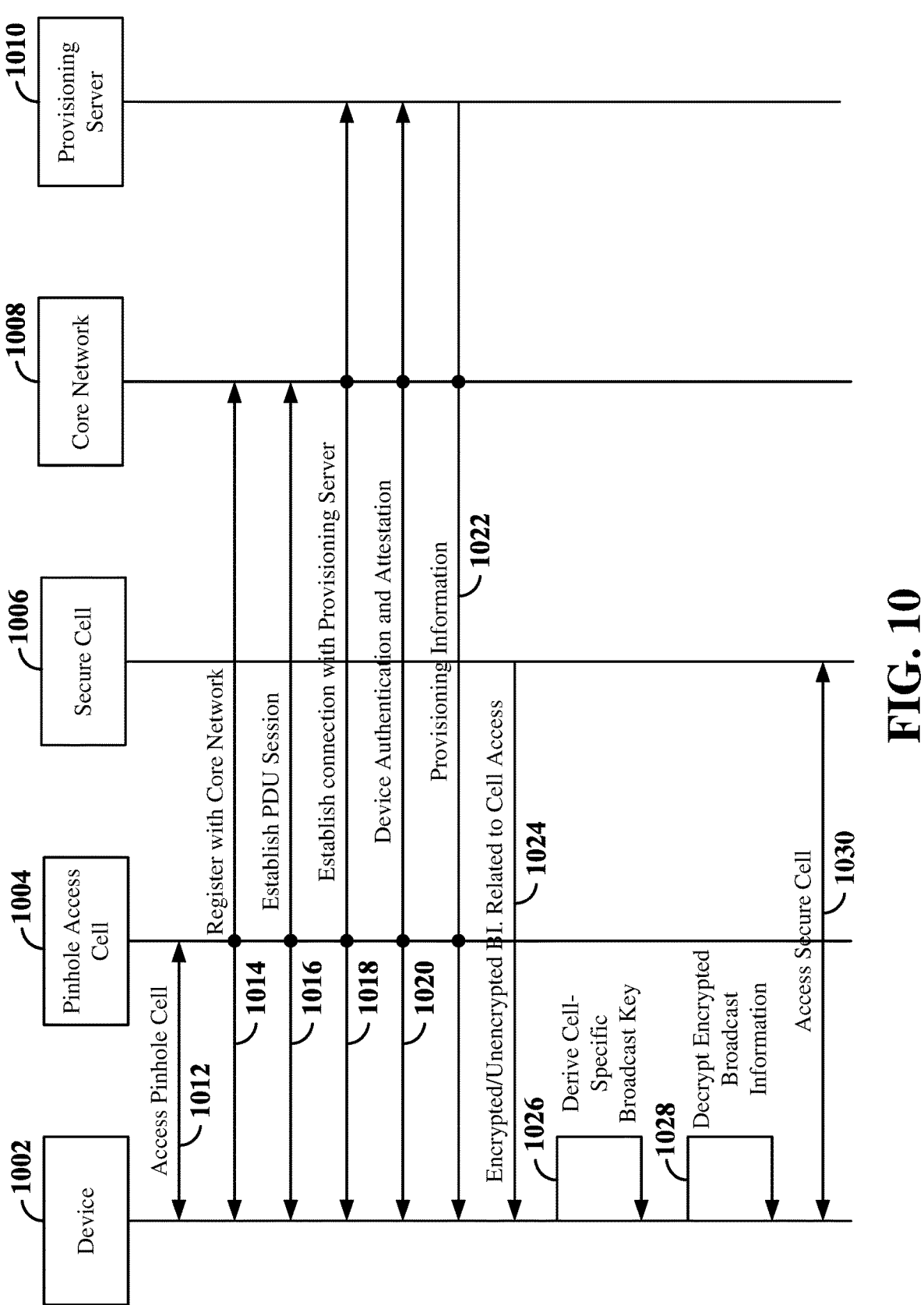
FIG. 10 is a signaling diagram illustrating exemplary signaling to provision a cell-specific broadcast key on a device using the in-band delivery path shown in FIG. 9 according to some aspects.

FIG. 10 is a signaling diagram illustrating exemplary signaling to provision a cell-specific broadcast key on a device 1002 using the in-band delivery path shown in FIG. 9 according to some aspects. As in FIG. 9, the device 1002 is located within an area covered by both a pinhole access cell 1004 and a secure cell 1006. The secure cell 1006 and pinhole access cell 1004 each have a different respective PCI and are both served by the same RAN node (e.g., base station, such as a gNB). The RAN node is coupled to a core network 1008 (e.g., the core network 206 shown in FIG. 2). In addition, a provisioning server 1010 is located within a private external data network external to the wireless communication system.

At 1012, the device 1002 may access the pinhole access cell 1004. For example, the pinhole access cell 1004 may broadcast unencrypted broadcast information related to cell access (e.g., SSB, CORESET0, and PBCH) for use by the device 1002 in accessing the pinhole access cell 1004. At 1014, the device 1002 may register with the core network 1008 via the pinhole access cell 1004. For example, the device 1002 may transmit a registration request to the AMF within the core network 1008. The AMF may then initiate non access stratum (NAS) level authentication between the device 1002 and the core network 1008 (e.g., an AUSF and UDM in the core network). The AMF may then retrieve mobility subscription data, SMF selection data, and UE context and communicate with the PCF for policy association for the device 1002. The AMF may then send a NAS secure registration accept message to the device 1002 to complete the registration.

At 1016, the device 1002 may establish a PDU session with the core network 1008 via the pinhole access cell 1004. For example, the device 1002 may transmit a PDU session establishment message to the SMF in the core network 1008. Based on the policy information associated with the device registration via the pinhole access cell 1004, at 1018, the SMF may allow the device 1002 to only establish a connection with the provisioning server 1010 in the private external data network via the PDU session. At 1020, the device 1002 may then perform device authentication and device attestation with the provisioning server 1010 to establish a secure connection with the provisioning server 1010. For example, the device 1002 may use credentials provided by the private network to perform device authentication. The provisioning server 1010 may further check the device security state of the device 1002 to perform device attestation. After successfully performing device authentication and device attestation, at 1022, the provisioning server 1010 may transit provisioning information to the device 1002 via the pinhole access cell 1004. The provisioning information provided by the provisioning server 1010 to the device 1002 may include, for example, the broadcast root key or long term key and the key refresh interval (or expiration time of the broadcast root key). In addition, the provisioning information may further include the current time ($T_{current}$), a key ID of the long term key and/or broadcast root key, and/or the HFN and SFN.

At 1024, the device 1002 may then be redirected or handed over to the secure cell 1006 to receive broadcast information including encrypted and unencrypted broadcast information related to cell access within the secure cell 1006. In some examples, the broadcast information may include an acquisition signal, such as an SSB, along with a CORESET0, and a SIB1. At 1026, the device 1002 may use the unencrypted broadcast information (e.g., within the acquisition signal) to obtain cell identifying information and derive the cell-specific broadcast key based on the cell identifying information and broadcast root key. At 1028, the device 1002 may then decrypt the encrypted broadcast information related to cell access, and at 1030, use the decrypted broadcast information to access the secure cell 1006.

Figure 11:
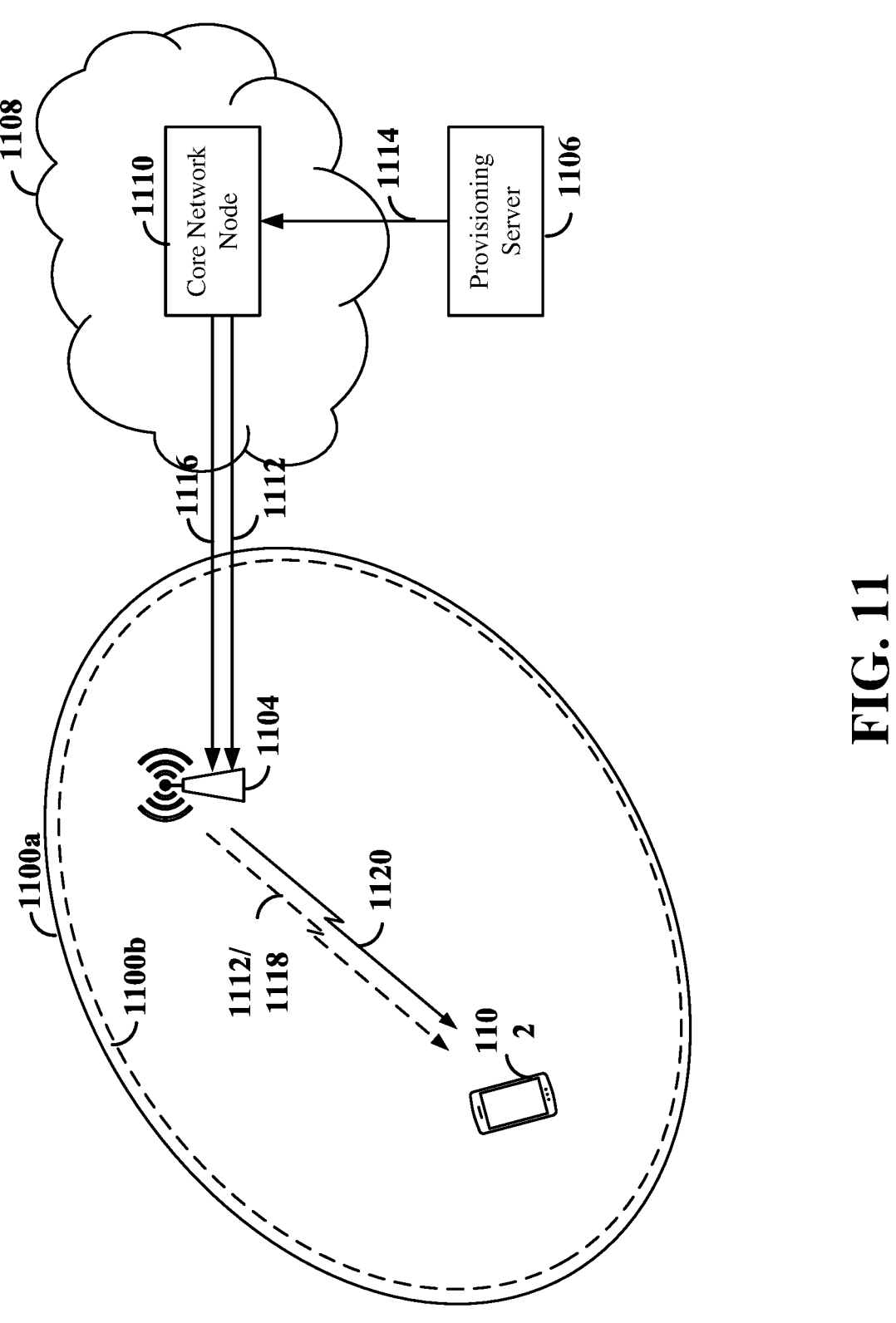
FIG. 11 is a diagram illustrating another example of an in-band delivery path for provisioning a cell-specific broadcast key according to some aspects.

FIG. 11 is a diagram illustrating another example of an in-band delivery path for provisioning a cell-specific broadcast key according to some aspects. In the example shown in FIG. 11, a device (e.g., UE) 1102 is located within an area covered by both a secure cell 1100a and a pinhole access cell 1100b. The secure cell 1100a and pinhole access cell 1100b are each identified by a different respective PCI. In addition, the pinhole access cell 1100b and secure cell 1100a are both served by a same RAN node (e.g., base station, such as a gNB) 1104. The RAN node 1104 may correspond to any of the base stations (e.g., gNB, eNB, etc.) or scheduling entities as shown in FIGS. 1-3. In addition, the device 1102 may correspond to any of the UEs or scheduled entities as shown in FIGS. 1-3.

The RAN node 1104 is coupled to a core network 1108 (e.g., the core network 206 of FIG. 2) including a core network node 1110. The core network node 1110 may include one or more of an AMF, UDM, KMF or an OAM (which may be external to the core network 1108). A provisioning server 1106 is shown external to the wireless communication system (e.g., external to the RAN including the RAN node 1104 and core network 1108). For example, the provisioning server 1106 may be within an external data network, such as (but not limited to) a private data network (e.g., via the Internet or a LAN). In some examples, the provisioning server 1106 may correspond to the provisioning server 606 shown in FIG. 6, the provisioning server 806 shown in FIG. 8, and/or the provisioning server 906/1010 shown in FIGS. 9 and/or 10.

The provisioning server 1106 is configured to generate one or more broadcast keys (e.g., broadcast root keys or long term keys) for use in encrypting and integrity protecting broadcast information related to cell access. Multiple broadcast root keys and/or multiple long term keys may be generated and utilized by different groups of devices or different groups of RAN nodes to avoid updating each of the devices and RAN nodes with new keys in the instance of key compromise of one of the keys.

The provisioning server 1106 may further be configured to transmit key information 1114 to the core network node 1110 within the core network. The key information 1114 may include, for example, the broadcast root key or long term key and a key refresh interval or expiration time associated with the long term key or broadcast root key. The key information 1114 may further include a key ID of the long term key or the broadcast root key. In some examples, the key information 1114 may further include the current time and HFN/SFN to synchronize the core network node 1110 with the provisioning server 1106. The core network node 1110 may derive the cell-specific broadcast key for the RAN node 1104 from the broadcast root key or long term key using, for example, Equations 1 and 2 above. The core network node 1110 may then provision the cell-specific broadcast key 1116 on the RAN node 1104. In some examples, instead of a cell-specific broadcast key, the core network node 1110 may derive a broadcast RAN key from the broadcast root key and provision the broadcast RAN key on the RAN node 1104.

The pinhole access cell 1100b broadcasts unencrypted broadcast information 1118 related to cell access for use by the device 1102 in accessing the pinhole access cell 1100b. For example, the pinhole access cell 1100b may broadcast unencrypted SSB, CORESET0, and PBCH to enable the device 1102 to access the pinhole access cell 1100b. Upon accessing the pinhole access cell 1100b, the device 1102 may register with the core network 1108. For example, the device 1102 may transmit a registration request to the AMF within the core network 1108 via the RAN node 1104. The AMF may then initiate non access stratum (NAS) level authentication between the device 1102 and the core network 1108 (e.g., an AUSF and UDM in the core network). The AMF may then retrieve mobility subscription data, SMF selection data, and UE context and communicate with the PCF for policy association for the device 1102. The AMF may then send a NAS secure registration accept message to the device 1102 to complete the registration.

In the example shown in FIG. 11, the AMF may further include provisioning information 1112 in the registration accept message transmitted to the device 1102 via the RAN node 1104 and pinhole access cell 1100b. Therefore, as shown in FIG. 11, instead of requiring the device 1102 to establish a PDU session and connection with the provisioning server 1106, the core network node 1110 may provide the provisioning information 1112 to the device 1102 in the registration accept message. The provisioning information may include, for example, the broadcast root key or long term key and the key refresh interval (or expiration time of the broadcast root key). In addition, the provisioning information provided by the AMF to the device 1102 may further include the current time ($T_{current}$), a key ID of the long term key and/or broadcast root key, and/or the HFN and SFN. In some examples, the AMF may be configured to perform device authentication (e.g., using device-specific credentials provided by the private data network) and/or device attestation with the device 1102 prior to delivering the provisioning information 1112.

In some examples, the RAN node 1104 may then transmit an RRC connection release message to the device 1102 via the pinhole access cell 1100b. The RRC connection release message may include redirection information for redirecting the device 1102 to the secure cell 1100a. In other examples, the RAN node 1104 may transmit a handover command to the device 1102 to initiate a handover of the device 1102 from the pinhole access cell 1100b to the secure cell 1100a. The device 1102 may then receive broadcast information 1120 including encrypted and unencrypted broadcast information related to cell access broadcast by the RAN node 1104 within the secure cell 1100a. In some examples, the broadcast information 1120 may include an acquisition signal, such as an SSB, along with a CORESET0, and a SIB1. The device 1102 may use the unencrypted broadcast information (e.g., within the acquisition signal) to obtain cell identifying information and use the cell identifying information and broadcast root key to derive the cell-specific broadcast key. The device 1102 may then decrypt the encrypted broadcast information related to cell access to access the secure cell 1100a or for other suitable purposes (e.g., cell reselection).

Figure 12:
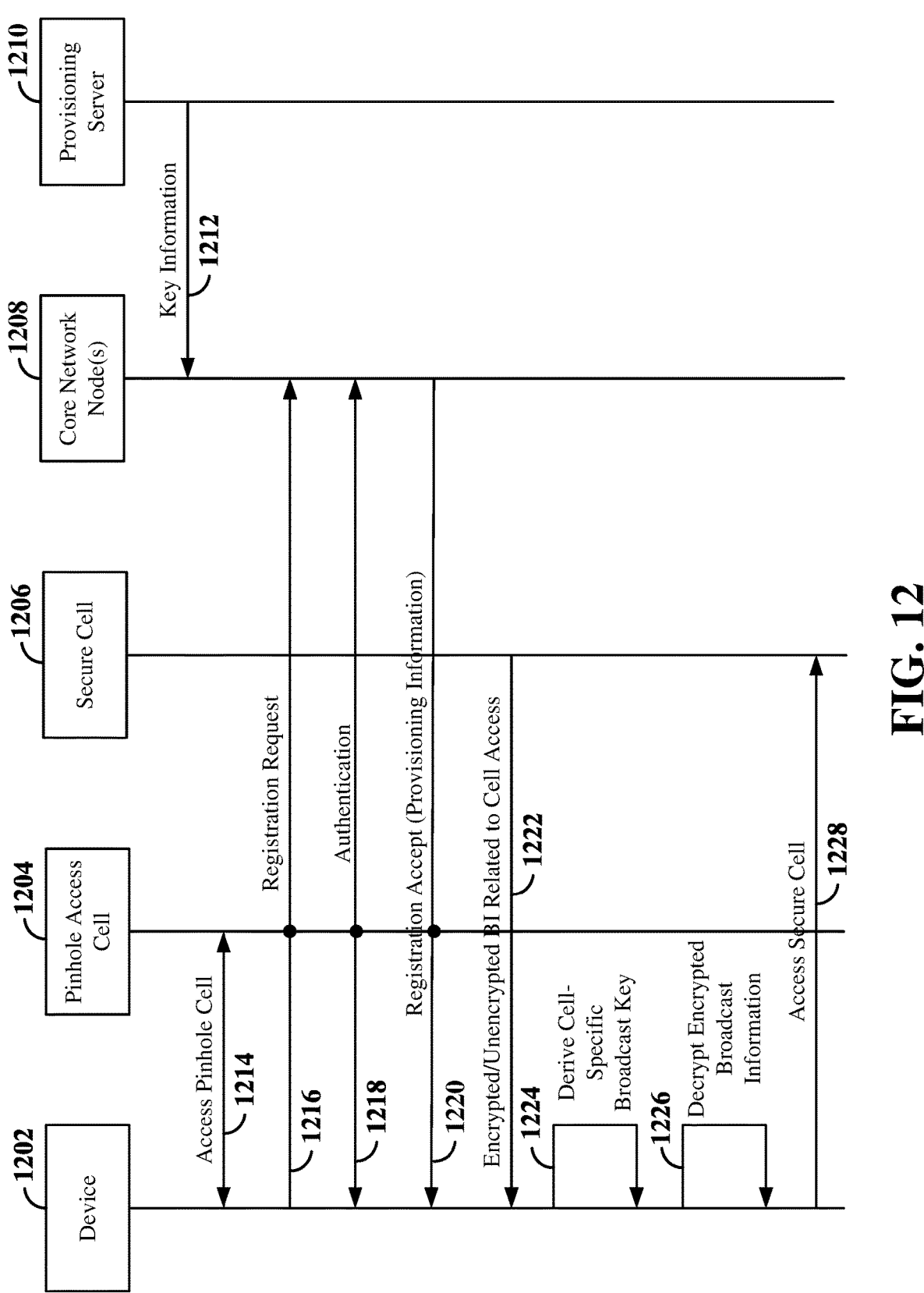
FIG. 12 is a signaling diagram illustrating exemplary signaling for provisioning the cell-specific broadcast key on a device using the in-band delivery path shown in FIG. 11 according to some aspects.

FIG. 12 is a signaling diagram illustrating exemplary signaling for provisioning the cell-specific broadcast key on a device 1202 using the in-band delivery path shown in FIG. 11 according to some aspects. As in FIG. 11, the device 1202 is located within an area covered by both a pinhole access cell 1204 and a secure cell 1206. The secure cell 1206 and pinhole access cell 1204 each have a different respective PCI and are both served by the same RAN node (e.g., base station, such as a gNB). The RAN node is coupled to one or more core network node(s) 1208 (e.g., within the core network 206 shown in FIG. 2). The core network node(s) 1208 may include, for example, an AMF and AUSF. In addition, a provisioning server 1210 is located within a private external data network external to the wireless communication system.

At 1212, the provisioning server 1210 may transmit key information to the core network node 1208 (e.g., the AMF) within the core network. The key information may include, for example, the broadcast root key or long term key and a key refresh interval or expiration time associated with the long term key or broadcast root key. The key information may further include a key ID of the long term key or broadcast root key. In some examples, the key information may further include the current time and HFN/SFN to synchronize the core network node 1208 with the provisioning server 1210.

At 1214, the device 1202 may access the pinhole access cell 1204. For example, the pinhole access cell 1204 may broadcast unencrypted broadcast information related to cell access (e.g., SSB, CORESET0, and PBCH) for use by the device 1202 in accessing the pinhole access cell 1204. At 1216, the device 1202 may transmit a registration request to the AMF 1208 via the pinhole access cell 1204. At block 1218, the AMF may then initiate non access stratum (NAS) level authentication between the device 1202 and an AUSF in the core network. The AMF may then retrieve mobility subscription data, SMF selection data, and UE context and communicate with the PCF for policy association for the device 1202.

At block 1220, the AMF 1208 may then send a NAS secure registration accept message to the device 1202 to complete the registration. In the example shown in FIG. 12, the AMF may further include provisioning information in the registration accept message transmitted to the device 1202 via the pinhole access cell 1204. The provisioning information may include, for example, the broadcast root key or long term key and the key refresh interval (or expiration time of the broadcast root key). In addition, the provisioning information provided by the AMF to the device 1202 may further include the current time ($T_{current}$), a key ID of the long term key and/or broadcast root key, and/or the HFN and SFN. In some examples, the AMF may be configured to perform device authentication (e.g., using device-specific credentials provided by the private data network) and/or device attestation with the device 1202 prior to delivering the provisioning information.

At 1222, the device 1202 may then be redirected or handed over to the secure cell 1206 to receive broadcast information including encrypted and unencrypted broadcast information related to cell access within the secure cell 1206. In some examples, the broadcast information may include an acquisition signal, such as an SSB, along with a CORESET0, and a SIB1. At 1224, the device 1202 may use the unencrypted broadcast information (e.g., within the acquisition signal) to obtain cell identifying information and derive the cell-specific broadcast key based on the cell identifying information and broadcast root key. At 1226, the device 1202 may then decrypt the encrypted broadcast information related to cell access, and at 1228, use the decrypted broadcast information to access the secure cell 1206.

Figure 13:
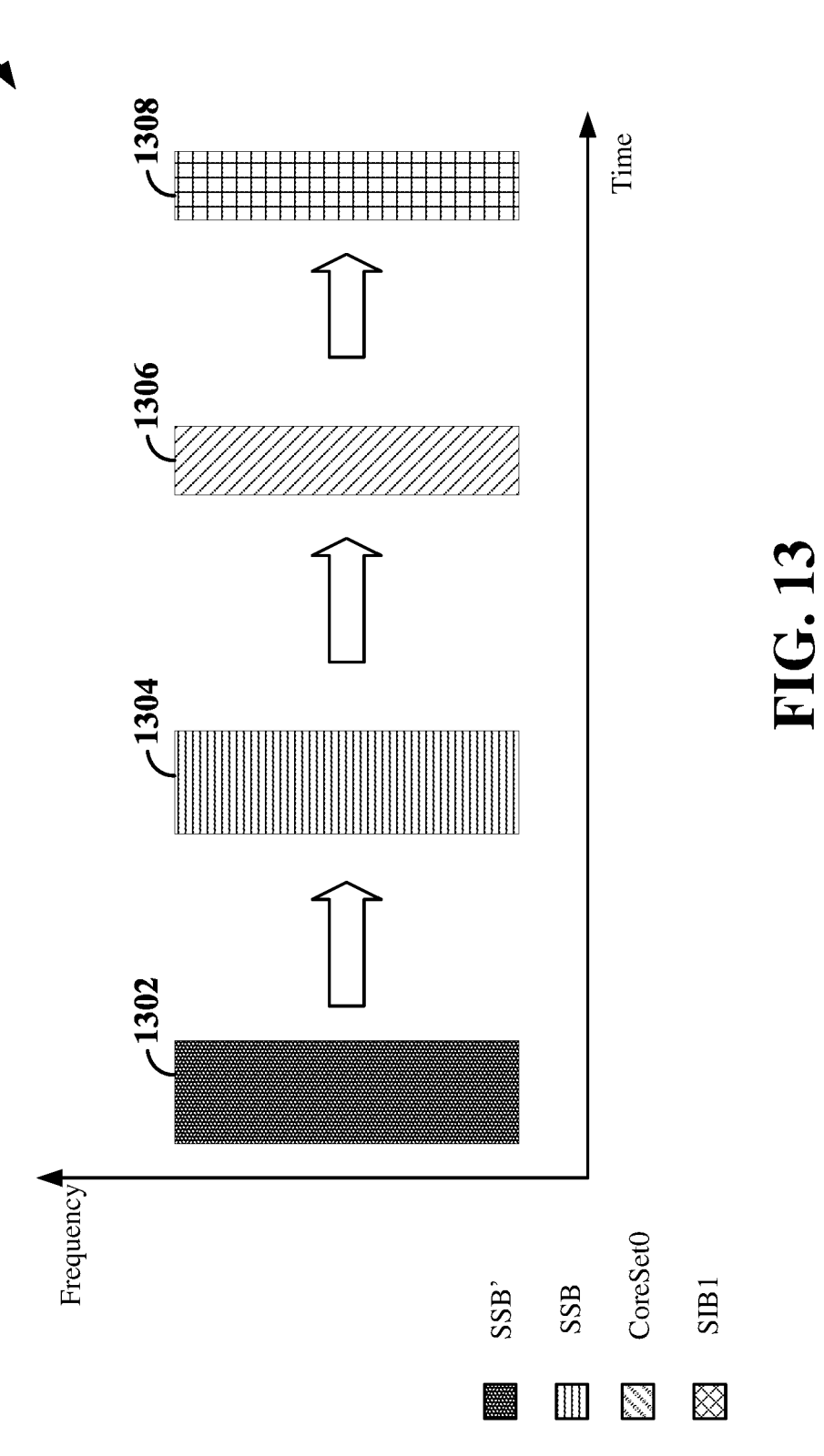
FIG. 13 is a diagram illustrating another example of encrypted and unencrypted broadcast information related to cell access according to some aspects.

FIG. 13 is a diagram illustrating another example of encrypted and unencrypted broadcast information 1300 related to cell access according to some aspects. The broadcast information 1300 may be transmitted by a RAN node (e.g., a base station, such as an eNB or gNB) on resources (e.g., time-frequency resources) allocated for the transmission of the broadcast information 1300 in a cell. The broadcast information 1300 includes a first acquisition signal 1302 and a second acquisition signal 1304. Each acquisition signal 1302 and 1304 may include, for example, an SSB. The first acquisition signal (SSB') 1302 and second acquisition signal (SSB) 1304 may be transmitted in different messages. For example, each acquisition signal 1302 and 1304 may be transmitted with a periodicity of 20 ms offset from one another by 10 ms, such that the first acquisition signal 1302 and second acquisition signal 1304 are transmitted in alternating frames (e.g., the first acquisition signal 1302 is transmitted in a first frame, the second acquisition signal 1304 is transmitted in a second frame, the first acquisition signal 1302 is transmitted again in a third frame, and so on).

The first acquisition signal (SSB') 1302 may be unencrypted and may carry at least one cell-specific security parameter. The cell-specific security parameter(s) may include, for example, cell identifying information. The cell identifying information may include the PCI, ARFCN, and/ or other cell identifying information, such as a random number assigned to the cell. The cell-specific security parameter(s) may further include, but are not limited to, a key identifier of the broadcast root key, an identifier of the RAN node, a security algorithm, and/or a freshness parameter (e.g., a counter, such as the current time, and/or the HFN and SFN). In an example, the first acquisition signal may include a PSS, an SSS, and a modified PBCH including the at least one cell-specific security parameter. The modified PBCH may further set the cell barred indication to prevent unauthorized devices from accessing the cell. In some examples, the first acquisition signal 1302 may be integrity protected using the cell-specific broadcast key.

The second acquisition signal 1304 may be fully encrypted and integrity protected using the cell-specific broadcast key (and in some examples, the freshness parameter). The second acquisition signal 1304 may include a PSS, a SSS, and a normal PBCH. Thus, the PBCH of the second acquisition signal 1304 includes the MIB carrying various system information (SI) including, for example, the scheduling information for a CORESET0 1306. In addition, the CORESET0 1306 carries a PDCCH with DCI that contains scheduling information for scheduling a SIB1 1308. The SIB1 1308 contains remaining minimum system information (SI) that may be used to access the cell.

A device may use the cell-specific security parameter(s) in the first acquisition signal 1302 (SSB') to derive the cell-specific broadcast key. For example, the device may derive the cell-specific broadcast key from the broadcast root key and one or more of the cell-specific security parameters (e.g., the PCI, ARFCN, other cell identifying information, SFN, RAN node identifier, key ID, etc.). The device may then decrypt and decode the second acquisition signal 1304

(SSB) using the cell-specific broadcast key (and in some examples, the freshness parameter). In examples in which the first acquisition signal 1302 is integrity protected using the cell-specific broadcast key, the device may use the derived cell-specific broadcast key (or an integrity protection key derived from the cell-specific broadcast key) to verify the integrity (e.g., check the message authentication code) of the first acquisition signal 1302.

Figure 14:
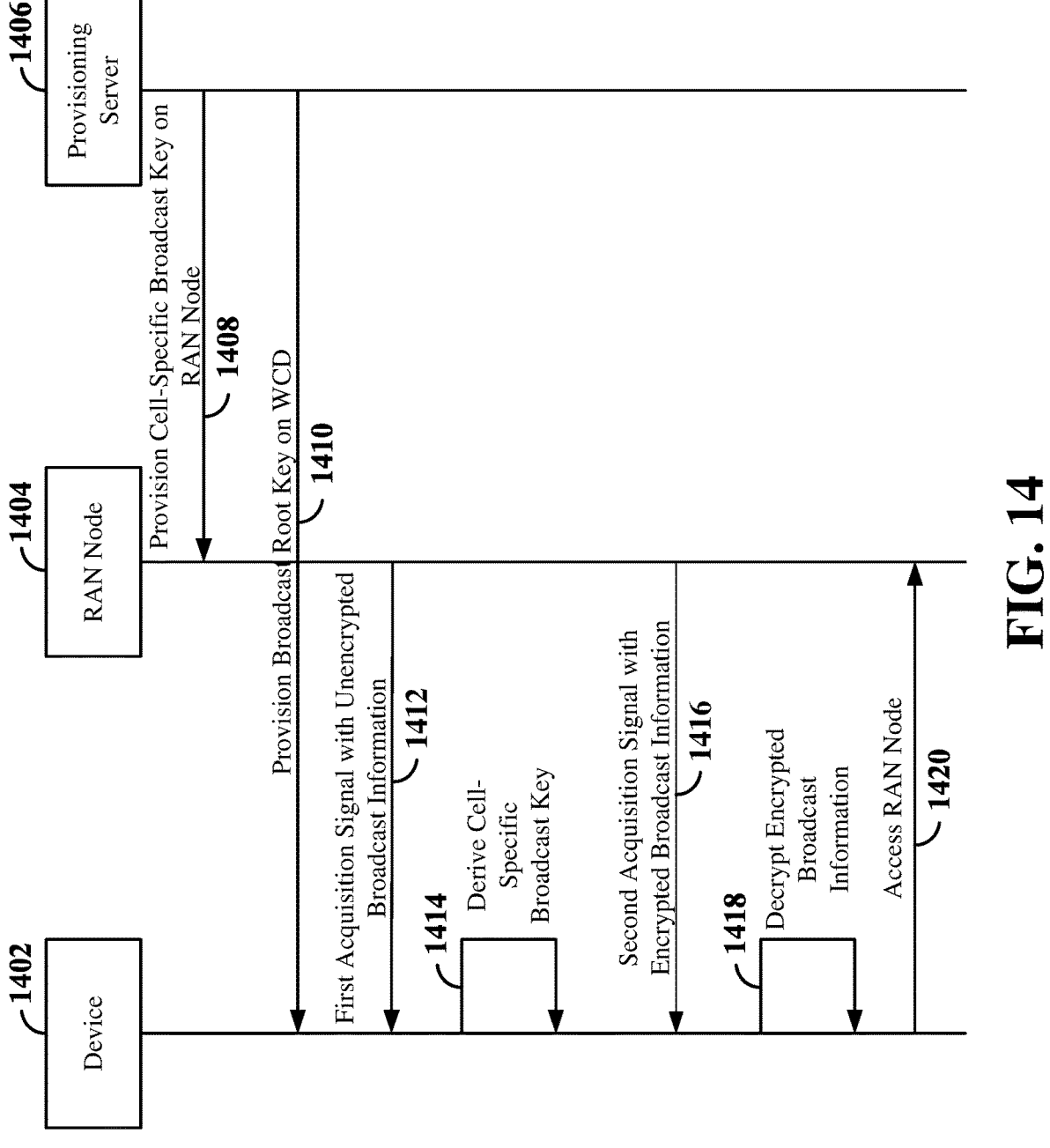
FIG. 14 is a signaling diagram illustrating other exemplary signaling to provide secure communication of broadcast information related to cell access according to some aspects.

FIG. 14 is a signaling diagram illustrating other exemplary signaling to provide secure communication of broadcast information related to cell access according to some aspects. In the example shown in FIG. 14, a device 1402 is attempting to access a secure cell served by a RAN node 1404. The RAN node 1404 may correspond to any of the base stations (e.g., gNB, eNB, etc.) or scheduling entities as shown in FIGS. 1-3. In addition, the device 1402 may correspond to any of the UEs or scheduled entities as shown in FIGS. 1-3. The device 1402 may attempt cell access, for example, upon entering the wireless communication network (e.g., a private network), powering on, or transitioning from a radio resource control (RRC) idle state to an RRC connected state.

A provisioning server 1406 is configured to generate one or more broadcast keys for use in encrypting and integrity protecting broadcast information related to cell access. In some examples, the broadcast key(s) are broadcast root key(s) from which cell-specific broadcast keys may be derived. The broadcast root key(s) may expire after a certain, predetermined duration of time, and therefore, the provisioning server 1406 may generate new broadcast root key(s) prior to expiration of the current broadcast root key(s). In some examples, the provisioning server 1406 may generate one or more long term keys from which the broadcast root key(s) may be derived. Multiple broadcast root keys and/or multiple long term keys may be generated and provided to different groups of devices or different groups of RAN nodes to avoid updating each of the devices and RAN nodes with new keys in the instance of key compromise of one of the keys. In some examples, the provisioning server 1406 may be external to the wireless communication system (e.g., the wireless communication system including the RAN and the core network). For example, the provisioning server 1406 may be within an external data network, such as (but not limited to) a private data network (e.g., via the Internet or a LAN).

At 1408, the provisioning server 1406 may provision a cell-specific broadcast key on the RAN node 1404. The cell-specific broadcast key may be unique to the secure cell served by the RAN node 1404 (e.g., unique within the wireless communication network including the RAN node 1404 or unique to a group of cells within the wireless communication network). In some examples, the provisioning server 1406 may generate one or more broadcast root keys and provide the generated broadcast root key(s) to a core network node within a core network (e.g., the core network 206 shown in FIG. 2). The core network node may then derive the cell-specific broadcast keys for each secure cell in the wireless communication network from the broadcast root key(s) and provision the cell-specific broadcast key for each secure cell on the corresponding serving RAN node. In some examples, the core network node that derives and provisions the cell-specific broadcast key on the RAN node 1404 may include one or more of the AMF, UDM, KMF or OAM (which may be external to the core network).

In some examples, the provisioning server 1406 may provision a broadcast RAN key (unique to the RAN node 1404) on the RAN node 1404. The RAN node 1404 may then derive the cell-specific broadcast key from the broadcast RAN key. A broadcast RAN key may be provisioned in examples where the RAN node serves multiple secure cells or in examples in which the number of cells in the private network is large and additional cell-specific security parameter(s), such as the RAN node ID, are used to derive unique cell-specific broadcast root keys.

At 1410, the provisioning server 1406 may provision the broadcast root key on the device 1402. In some examples, the provisioning server 1406 may directly provision the broadcast root key and an expiration time of the broadcast root key on the device 1402. In other examples, the provisioning server 1406 may transmit the broadcast root key to a core network node (e.g., an AMF) within the core network, which may then transmit the broadcast root key to the device 1402 upon successfully registering with the core network.

In some examples, the device 1402 may be provisioned with a long term key from which the broadcast root key may be derived using a key derivation function (KDF), as described above. In some examples, the broadcast root key (or long term key) may be included within provisioning information transmitted from the provisioning server 1406 or core network node to the device 1402. The provisioning information may include additional information, such as the key refresh interval (or expiration time) of the broadcast root key, the current time, a key identifier (ID) of the long term key or broadcast root key, and/or the HFN and SFN.

At 1412, the RAN node 1404 may broadcast a first acquisition signal (e.g., a first SSB) including unencrypted broadcast information related to cell access in the secure cell. The unencrypted broadcast information may include one or more cell-specific security parameter(s). The cell-specific security parameter(s) may include, for example, cell identifying information (e.g., the PCI, ARFCN, and/or other cell identifying information, such as a random number assigned to the cell), a key identifier of the broadcast root key, an identifier of the RAN node, a security algorithm, and/or a freshness parameter (e.g., a counter, such as the current time, the SFN, or a combination of the HFN and SFN). In an example, the first acquisition signal may include a modified SSB (e.g., SSB') including a PSS, an SSS, and a modified PBCH including the at least one cell-specific security parameter.

At 1414, the device 1402 may derive the cell-specific broadcast key based on the broadcast root key and the cell-specific security parameter(s). For example, the device 1402 may derive the cell-specific broadcast key using a key derivation function (KDF) of the broadcast root key and the cell-specific security parameters. In some examples, the device 1402 may derive the broadcast RAN key from the broadcast root key and then further derive the cell-specific broadcast key from the broadcast RAN key. For example, the device 1402 may derive the broadcast RAN key using a KDF of the broadcast root key and the identifier of the RAN node 1404 included in the cell-specific security parameters. The device 1402 may then derive the cell-specific broadcast key using a KDF of at least the broadcast RAN key and the cell identifying information (e.g., the PCI, PCI|ARFCH, or other cell identifying information included in the cell-specific security parameters). Other cell-specific security parameters may further be used in deriving the cell-specific broadcast key. Once the cell-specific broadcast key is derived, the device 1402 may use the cell-specific broadcast key (or an integrity protection key derived from the cell-specific broadcast key) to verify the integrity of the first acquisition signal based on a message authentication code included in the first acquisition signal.

At 1416, the RAN node 1404 may broadcast a second acquisition signal (e.g., a second SSB) including encrypted broadcast information related to cell access. The encrypted broadcast information may include, for example, the PSS, the SSS, and the PBCH. Additional encrypted broadcast information related to cell access following the second acquisition signal may further include a CORESET0 and a SIB1. The encrypted broadcast information may further be integrity protected based on the cell-specific broadcast key.

At 1418, the device 1402 may use the cell-specific broadcast key to decrypt the encrypted broadcast information. In some examples, the device 1402 may use a combination of the cell-specific broadcast key and the freshness parameter (e.g., the current time, the SFN or a combination of the HFN and SFN) to decrypt the encrypted broadcast information and produce decrypted broadcast information. Upon decrypting and decoding the encrypted broadcast information, the device 1402 may verify the integrity of the encrypted broadcast information. At 1418, the device 1402 may access the RAN node 1404 and register with the core network. In some examples, instead of cell access, the device 1402 may use the unencrypted broadcast information and decrypted broadcast information for cell re-selection or other suitable purpose.

Figure 15:
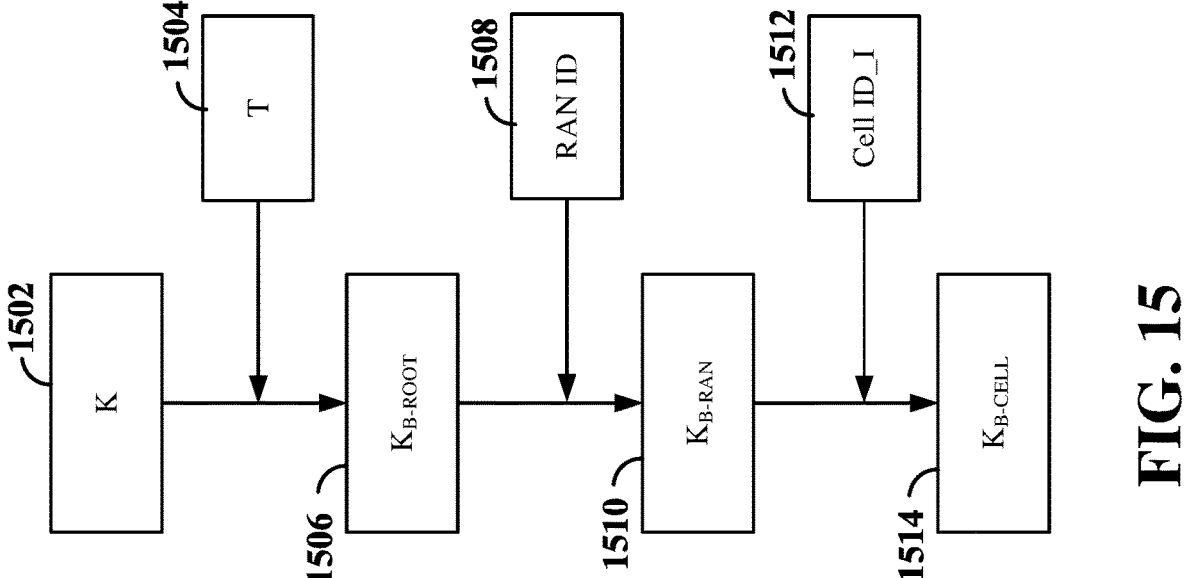
FIG. 15 illustrates another exemplary key derivation of the cell-specific broadcast key according to some aspects.

FIG. 15 illustrates another exemplary key derivation of the cell-specific broadcast key according to some aspects. In the example shown in FIG. 15, a broadcast root key (K$_{B-ROOT}$) 1506 is derived from a long term key (K) 1502 and a refresh parameter (T) 1504, using, for example, Equation 2 above. In some examples, the refresh parameter 1504 may be determined based on the current time (T$_{current}$) and the key refresh interval (T$_{refresh}$) included within the provisioning information transmitted to the device. In addition, the provisioning information may further include the long term key, a key identifier (ID) of the long term key or broadcast root key, the HFN, and the SFN.

For example, the refresh parameter (T) 1504 may include a quotient of a current counter value of a counter set based on the current time (T$_{current}$) and the key refresh interval (T$_{refresh}$). In some examples, the counter may correspond to a system clock of the device, and the device may set the system clock to the current time (T$_{current}$) upon receiving the provisioning information. Once the counter value increases by an amount equal to the key refresh interval, the value of K$_{B-ROOT}$ changes, thus generating a new K$_{B-ROOT}$ at the expiration of each key refresh interval.

Other optional parameters that may be used to derive K$_{B-ROOT}$ may include one or more of the key ID associated with the long term key K (e.g., in examples in which more than one long term key is generated and used in the wireless communication network), a network identifier associated with the RAN, a tracking area code associated with a tracking area including the secure cell, an area identifier associated with the RAN node, or a registration area code associated with a registration area including the secure cell.

As further shown in FIG. 15, a broadcast RAN key (K$_{B-RAN}$) 1510 may then be derived from the broadcast root key (K$_{B-ROOT}$) and an identifier of the RAN (RAN ID) 1508. For example, the broadcast RAN key (K$_{B-RAN}$) 1510 may be derived as follows:

$$K_{B-RAN}=KDF(K_{B-ROOT}, RAN\ ID) \qquad \text{(Equation 3),}$$

where the RAN ID 1508 may be received as part of the cell-specific security parameters within the unencrypted acquisition signal (e.g., SSB', shown in FIGS. 13 and 14).

The cell-specific broadcast key (K$_{B-CELL}$) 1514 may then be derived based on K$_{B-RAN}$ 1510 and cell identifying information (Cell ID_I) 1512, as defined in Equation 1 above. In some examples, K$_{B-CELL}$ may be derived based on K$_{B-RAN}$ 1510, Cell ID_I 1512 and one or more additional cell-specific security parameters, such as a key identifier of the broadcast root key, a security algorithm, and/or a freshness parameter. In some examples, the broadcast RAN key 1510 may be provisioned on the RAN node and the RAN node may derive the cell-specific broadcast key (K$_{B-CELL}$) 1514 using the same KDF (e.g., based on the same set of parameters) as the device.

Figure 16:
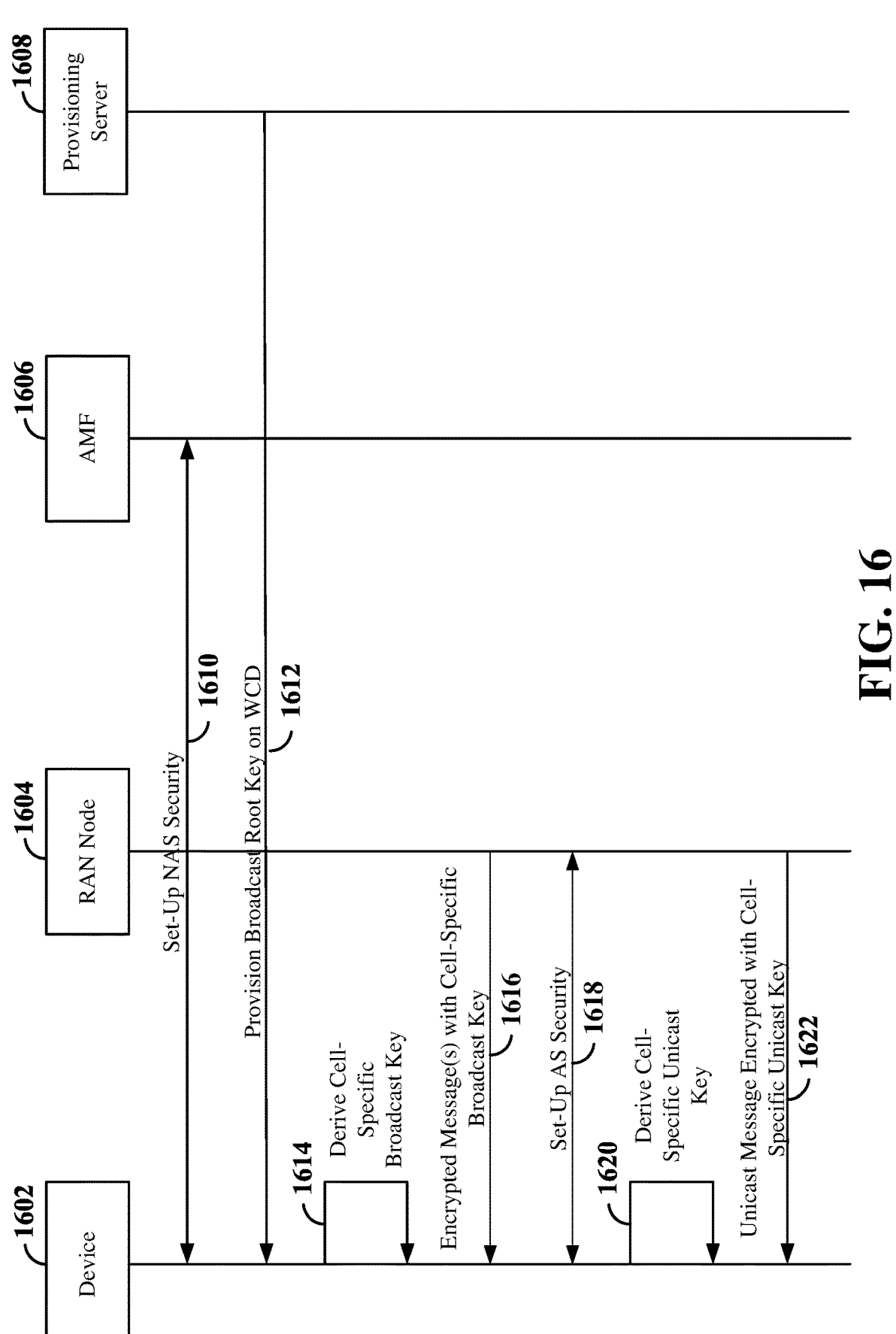
FIG. 16 is a diagram illustrating an example of provisioning a cell-specific unicast key according to some aspects.

FIG. 16 is a diagram illustrating an example of provisioning a cell-specific unicast key according to some aspects. In the example shown in FIG. 16, a device (e.g., UE) 1602 is located within a secure cell served by a RAN node 1604 (e.g., base station, such as a gNB). The RAN node 1604 may correspond to any of the base stations (e.g., gNB, eNB, etc.) or scheduling entities as shown in FIGS. 1-3. In addition, the device 1602 may correspond to any of the UEs or scheduled entities as shown in FIGS. 1-3. The RAN node 1604 is coupled to an AMF 1606. A provisioning server 1608 is located in an external private data network. The provisioning server 1608 is configured to generate one or more broadcast keys (e.g., broadcast root keys or long term keys) for use in encrypting and integrity protecting broadcast information related to cell access.

At 1610, the device 1602 and AMF 1606 may set-up non access stratum (NAS) security to securely deliver NAS messages in the control plane between the device 1602 and the AMF 1606. The NAS security may be set up, for example, during registration of the device 1602 on the core network. In some examples, NAS security may utilize NAS security keys derived from the authentication key KAMF obtained during an authentication and key agreement (AKA) procedure with the core network (e.g., during authentication of the device with the AUSF as part of the registration procedure). After NAS security is set up, the AMF 1606 and device 1602 may share the NAS security keys (e.g., a NAS encryption key and a NAS integrity protection key) that may then be used to encrypt and integrity protect NAS messages transmitted between the device 1602 and AMF 1606. For example, the NAS encryption and integrity protection keys may be used to protect the registration accept message transmitted from the AMF 1606 to the device 1602.

At 1612, the provisioning server 1608 provisions the broadcast root key, along with other provisioning information, on the device 1602 via an out-of-band delivery path or an in-band delivery path. In some examples, the provisioning information may be provided to the device 1602 via an out-of-band delivery path prior to registration of the device 1602 (e.g., prior to 1610). In other examples, the provisioning information may be provided within the registration accept message transmitted from the AMF 1606 to the device 1602 after NAS security is set up. In still other examples, the provisioning server 1608 may deliver the provisioning information via a connection between the device 1602 and provisioning server 1608 established during a PDU session.

At 1614, the device 1602 may derive the cell-specific broadcast key from the broadcast root key and at least cell identifying information. In some examples, the device 1602 may use unencrypted broadcast information (e.g., within an acquisition signal) to obtain the cell identifying information (and other possible cell-specific security parameters) and use the cell identifying information and broadcast root key to derive the cell-specific broadcast key.

At 1616, the device 1602 may receive one or more encrypted messages from the RAN node 1604 encrypted using the cell-specific broadcast key. In some examples, the encrypted messages may include broadcast messages or unicast messages. For example, the encrypted unicast messages may include device-specific downlink control information (DCI) containing control information specific to the device 1602.

At 1618, the device 1602 may establish or set-up an access stratum (AS) security context with the RAN node 1604 to securely deliver RRC messages in the control plane and IP packets in the user plane between the device 1602 and the RAN node 1604. The AS security may utilize AS security keys derived from a RAN node key ($K_{gNB}$). The RAN node key ($K_{gNB}$) may be derived by the device 1602 from KAMF and may be provided to the RAN node 1604 by the AMF 1606. After AS security is set up, the RAN node 1604 and device 1602 may share the AS security keys (e.g., an RRC AS encryption key, an RRC AS integrity protection key, and a user plane encryption key) that may then be used to encrypt and integrity protect RRC messages and to encrypt IP packets transmitted between the device 1602 and RAN node 1604.

At 1620, the device 1602 may further derive a cell-specific unicast key based on the RAN node key ($K_{gNB}$) and at least one parameter. For example, the cell-specific unicast key ($K_{U\text{-}Cell}$) may be derived as follows:

$$K_{U\text{-}CELL} = KDF(K_{gNB}, \text{parameter}) \qquad \text{(Equation 4)},$$

where the parameter may include one or more of cell identifying information and a freshness parameter. In some examples, the parameter may include a concatenation of the cell identifying information and the freshness parameter (e.g., a counter).

At 1622, the RAN node 1604 may transmit encrypted unicast message(s) encrypted with the cell-specific unicast key to the device 1602. In some examples, the encrypted unicast message(s) may include encrypted DCI including unicast information for the device 1602. The device 1602 may then use the cell-specific unicast key to decrypt the encrypted DCI. In some examples, the device 1602 and RAN node 1604 may switch from using the cell-specific broadcast key to the cell-specific unicast key for unicast messages when the device 1602 is an RRC connected state allocated with a cell radio network temporary identifier (C-RNTI). In some examples, the device 1602 and RAN node 1604 may switch from using the cell-specific broadcast key to the cell-specific unicast key for unicast messages after the device 1602 sends an AS security mode compete message to the RAN node 1604 (e.g., indicating that the AS security set-up is complete), after the device 1602 sends an RRC Reconfiguration complete message to the RAN node 1604, after the device 1602 receives an RRC Reestablishment message from the RAN node 1604, or after the device 1602 receives an RRC Resume message from the RAN node 1604.

Figure 17:
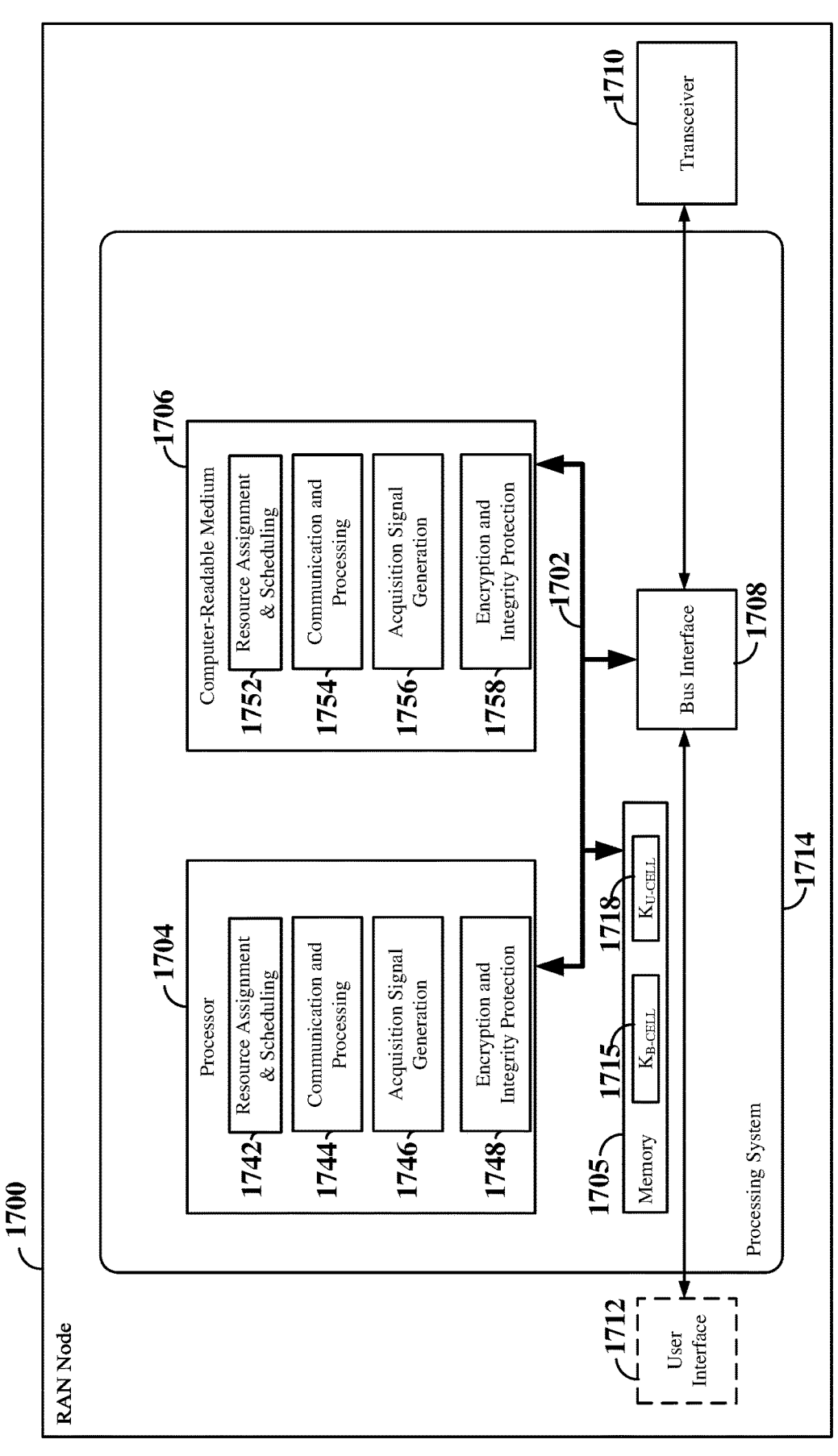
FIG. 17 is a block diagram illustrating an example of a hardware implementation for a RAN node employing a processing system according to some aspects.

FIG. 17 is a conceptual diagram illustrating an example of a hardware implementation for an exemplary RAN node employing a processing system 1714. For example, the RAN node 1700 may be any of the base stations (e.g., gNB or eNB) illustrated in any one or more of FIGS. 1-3, 6, 8-12, 14, and/or 16. The RAN node 1700 may be configured to serve at least one secure cell. In addition, the RAN node 1700 may be configured to serve a pinhole access cell.

The RAN node 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1700 may be configured to perform any one or more of the functions described herein. That is, the processor 1704, as utilized in a RAN node 1700, may be used to implement any one or more of the processes described below. The processor 1704 may in some instances be implemented via a baseband or modem chip and in other implementations, the processor 1704 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710. The transceiver 1710 provides a means for communicating with various other apparatus over a transmission medium (e.g., air interface). A user interface 1712 (e.g., keypad, display, speaker, microphone, joystick) may also be provided.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. In some examples, the computer-readable medium 1706 may be part of the memory 1705. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1704 may include circuitry configured for various functions. For example, the processor 1704 may include resource assignment and scheduling circuitry 1742, configured to generate, schedule, and modify a resource assignment or grant of time-frequency resources (e.g., a set of one or more resource elements). For example, the resource assignment and scheduling circuitry 1742 may schedule time-frequency resources within a plurality of time division duplex (TDD) and/or frequency division duplex (FDD) subframes, slots, and/or mini-slots to carry user data traffic and/or control information to and/or from multiple devices (e.g., UEs).

In some examples, the resource assignment and scheduling circuitry 1742 may be configured to schedule resources for the transmission of acquisition signals (e.g., SSBs) and other broadcast information related to cell access (e.g., CORESET0 and SIB1) in a secure cell. In some examples, at least a portion of the broadcast information (e.g., SSB, CORESET0, and SIB1) may include encrypted broadcast information. For example, the resource assignment and scheduling circuitry 1742 may schedule resources for an SSB including a PSS, a SSS, and a PBCH. In this example, the PSS, SSS, and a portion of the PBCH (e.g., the SFN) may be unencrypted, while the remaining portion of the PBCH may be encrypted. As another example, the resource assignment and scheduling circuitry 1742 may schedule resources for the transmission of a first acquisition signal (e.g., a first SSB) including unencrypted broadcast information related to cell access and a second acquisition signal (e.g., a second SSB) including encrypted broadcast information. In this example, the first SSB may include a first PSS, a first SSS, and a modified PBCH including one or more cell-specific security parameter(s). The second SSB may include a second PSS, a second SSS, and a second PBCH (e.g., a normal PBCH). The first and second PSS may include the same PSS sequence, and the first and second SSS may include the same SSS sequence to identify the secure cell.

In addition, the resource assignment and scheduling circuitry 1742 may further be configured to schedule resources for the transmission of additional broadcast and/or unicast messages that may be encrypted in the secure cell. The resource assignment and scheduling circuitry 1742 may further be configured to schedule resources for the transmission of unencrypted broadcast information (e.g., SSB, CORESET0, and SIB1) in a pinhole access cell. The resource assignment and scheduling circuitry 1742 may further be configured to execute resource assignment and scheduling software 1752 stored in the computer-readable medium 1706 to implement one or more of the functions described herein.

The processor 1704 may further include communication and processing circuitry 1744, configured to communicate with a scheduled entity (e.g., a device or UE). In some examples, the communication and processing circuitry 1744 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1744 may be configured to transmit, via the transceiver 1710, acquisition signals (e.g., SSBs) and other broadcast information related to cell access (e.g., CORESET0 and SIB1) in a secure cell. In some examples, at least a portion of the broadcast information (e.g., SSB, CORESET0, and SIB1) may include encrypted broadcast information. For example, the communication and processing circuitry 1744 may be configured to transmit, via the transceiver 1710, an SSB including a PSS, a SSS, and a PBCH. In this example, the PSS, SSS, and a portion of the PBCH (e.g., the SFN) may be unencrypted, while the remaining portion of the PBCH may be encrypted. As another example, the communication and processing circuitry 1744 may be configured to transmit, via the transceiver 1710, a first acquisition signal (e.g., a first SSB) including unencrypted broadcast information related to cell access and a second acquisition signal (e.g., a second SSB) including encrypted broadcast information. In this example, the first SSB may include a first PSS, a first SSS, and a modified PBCH including one or more cell-specific security parameter(s). The second SSB may include a second PSS, a second SSS, and a second PBCH (e.g., a normal PBCH). The first and second PSS may include the same PSS sequence, and the first and second SSS may include the same SSS sequence to identify the secure cell.

In addition, the communication and processing circuitry 1744 may further be configured to transmit, via the transceiver 1710, additional broadcast and/or unicast messages that may be encrypted in the secure cell. The communication and processing circuitry 1744 may further be configured to transmit, via the transceiver, unencrypted broadcast information (e.g., SSB, CORESET0, and SIB1) in a pinhole access cell. The communication and processing circuitry 1744 may further be configured to execute communication and processing software 1754 stored in the computer-readable medium 1706 to implement one or more of the functions described herein.

The processor 1704 may further include acquisition signal generation circuitry 1746, configured to generate an acquisition signal including at least cell-identifying information for transmission in a cell served by the RAN node 1700. The acquisition signal may be, for example, an SSB that includes a PSS, an SSS, and a PBCH. In some examples, the acquisition signal generation circuitry 1746 may be configured to generate a first SSB containing unencrypted broadcast information for transmission in a pinhole access cell served by the RAN node 1700 and a second SSB containing both encrypted and unencrypted broadcast information for transmission in a secure cell served by the RAN node 1700. In some examples, the acquisition signal generation circuitry 1746 may be configured to generate a first SSB containing unencrypted broadcast information and a second SSB containing encrypted broadcast information for transmission in the secure cell. In this example, the first SSB may include a modified PBCH including one or more cell-specific security parameter(s). The acquisition signal generation circuitry 1746 may further be configured to execute acquisition signal generation software 1756 stored in the computer-readable medium 1706 to implement one or more of the functions described herein.

The processor 1704 may further include encryption and integrity protection circuitry 1748, configured to encrypt and integrity protect at least a portion of broadcast information related to cell access using a cell-specific broadcast key ($K_{B-CELL}$) 1715. The cell-specific broadcast key 1715 may be stored, for example, in memory 1705. The RAN node 1700 may be provisioned with the cell-specific broadcast key 1715 by a core network node (e.g., AMF, UDM, KMF, or OAM) or may be provisioned with a broadcast RAN key ($K_{B-RAN}$) by the core network node and derive the cell-specific broadcast key from the broadcast RAN key.

In some examples, the encryption and integrity protection circuitry 1748 may be configured to encrypt and integrity protect a part of an acquisition signal (e.g., an SSB). For example, the encryption and integrity protection circuitry 1748 may be configured to encrypt and integrity protect a portion of the PBCH of an SSB that excludes the SFN using the cell-specific broadcast key 1715. In other examples, the encryption and integrity protection circuitry 1748 may be configured to encrypt and integrity protect all parts of an acquisition signal (e.g., the PSS, SSS, and PBCH of an SSB) using the cell-specific broadcast key 1715. In still other examples, the encryption and integrity protection circuitry 1748 may be configured to integrity protect a modified SSB (e.g., an SSB including a modified PBCH) using the cell-specific broadcast key 1715. The encryption and integrity protection circuitry 1748 may further be configured to encrypt and integrity protect other broadcast information related to cell access, such as the CORESET0 and SIB1 using the cell-specific broadcast key 1715. In addition, the encryption and integrity protection circuitry 1748 may be configured to encrypt and integrity protect other broadcast and unicast messages using the cell-specific broadcast key 1715.

In some examples, the encryption and integrity protection circuitry 1748 may be configured to encrypt broadcast and/or unicast messages using the cell-specific broadcast key 1715 and a freshness parameter (e.g., a counter). In one example, the freshness parameter may include the current time. In another example, the freshness parameter may include the SFN. In still another example, the freshness parameter includes a combination (e.g., concatenation) of the SFN and the HFN. In some examples, the encryption and integrity protection circuitry 1748 may be configured to derive an integrity protection key from the cell-specific broadcast key and generate a message authentication code for a broadcast or unicast message from the integrity protection key and the message. The message authentication code may then be provided to the communication and processing circuitry 1744 to append to the encrypted message.

In some examples, the encryption and integrity protection circuitry 1748 may further be configured to encrypt and integrity protect unicast messages (e.g., DCI specific to a device) using a cell-specific unicast key ($K_{U-CELL}$) 1718. The cell-specific unicast key 1718 may be stored, for example, in memory. In some examples, the encryption and integrity protection circuitry 1748 may derive the cell-specific unicast key from a RAN node key provisioned on the RAN node by the core network. The encryption and integrity protection key may further be configured to execute encryption and integrity protection software 1758 stored in the computer-readable medium 1706 to implement one or more of the functions described herein.

Figure 18:
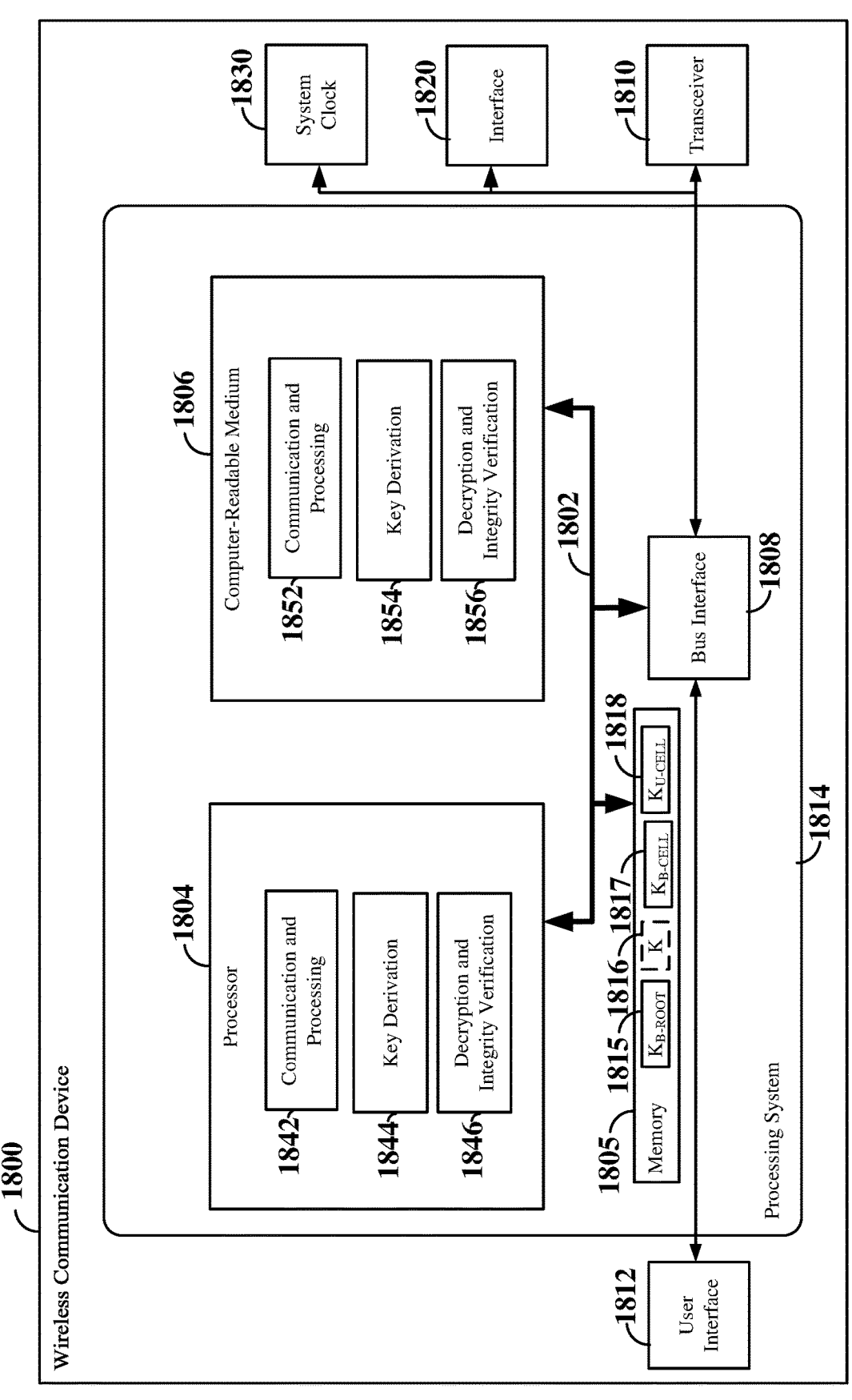
FIG. 18 is a block diagram illustrating an example of a hardware implementation for a wireless communication device employing a processing system according to some aspects.

FIG. 18 is a block diagram illustrating an example of a hardware implementation for a wireless communication device 1800 employing a processing system 1814. For example, the wireless communication device 1800 may correspond to any of the UEs shown and described above in any one or more of FIGS. 1-3, 6, 8-12, 14, and/or 16.

In accordance with various aspects of the disclosure, an element, or any portion of an element, or any combination of elements may be implemented with a processing system 1814 that includes one or more processors 1804. The processing system 1814 may be substantially the same as the processing system 1714 illustrated in FIG. 17, including a bus interface 1808, a bus 1802, a memory 1805, a processor 1804, and a computer-readable medium 1806. Furthermore, the wireless communication device 1800 may include a user interface 1812 and a transceiver 1810 substantially similar to those described above in FIG. 17. That is, the processor 1804, as utilized in a wireless communication device 1800, may be used to implement any one or more of the processes described below.

In some aspects of the disclosure, the processor 1804 may include circuitry configured for various functions. For example, the processor 1804 may include communication and processing circuitry 1842 configured to communicate with a RAN node (e.g., base station, such as a gNB or eNB) via the transceiver 1810. The communication and processing circuitry 1842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1842 may be configured to exchange control information and data with the base station via one or more subframes, slots, and/or mini-slots.

In some examples, the communication and processing circuitry 1842 may be configured to receive a broadcast key, such as a broadcast root key ($K_{B-ROOT}$) 1815 or a long term key (K) 1816, and to store the broadcast key 1815 or 1816 within, for example, in memory 1805. In examples in which the communication and processing circuitry 1842 receives the broadcast root key 1815, the long term key 1816 may not be received or stored. In some examples, the communication and processing circuitry 1842 may be configured to receive the broadcast key 1815 or 1816 from a provisioning server or a core network node in the core network via the RAN node and the transceiver 1810. In other examples, the communication and processing circuitry 1842 may be configured to receive the broadcast key 1815 or 1816 via the transceiver 1810 through a Wi-Fi connection with a private data network. In still other examples, the communication and processing circuitry 1842 may be configured to receive the broadcast key 1815 or 1816 via an interface 1820 (e.g., an interface of a USB port or an NFC device) providing a connection to a private data network.

In some examples, the communication and processing circuitry 1842 may be configured to receive broadcast information related to cell access from the RAN node via the transceiver 1810. In some examples, the communication and processing circuitry 1842 may be configured to receive one or more acquisition signals (e.g., SSBs) and other broadcast information related to cell access (e.g., CORESET0 and SIB1) in a secure cell. In some examples, at least a portion of the broadcast information (e.g., SSB, CORESET0, and SIB1) may include encrypted broadcast information. For example, the communication and processing circuitry 1842 may be configured to receive, via the transceiver 1810, an SSB including a PSS, a SSS, and a PBCH. In this example, the PSS, SSS, and a portion of the PBCH (e.g., the SFN) may be unencrypted, while the remaining portion of the PBCH may be encrypted. As another example, the communication and processing circuitry 1842 may be configured to receive, via the transceiver 1810, a first acquisition signal (e.g., a first SSB) including unencrypted broadcast information related to cell access and a second acquisition signal (e.g., a second SSB) including encrypted broadcast information. In this example, the first SSB may include a first PSS, a first SSS, and a modified PBCH including one or more cell-specific security parameter(s). The second SSB may include a second PSS, a second SSS, and a second PBCH (e.g., a normal PBCH). The first and second PSS may include the same PSS sequence, and the first and second SSS may include the same SSS sequence to identify the secure cell. In addition, the communication and processing circuitry 1842 may further be configured to receive, via the transceiver 1810, additional broadcast and/or unicast messages that may be encrypted in the secure cell.

The communication and processing circuitry 1842 may further be configured to receive, via the transceiver 1810, unencrypted broadcast information (e.g., SSB, CORESET0, and SIB1) transmitted in a pinhole access cell. In this example, the communication and processing circuitry 1842 may be configured to access the pinhole access cell using the unencrypted broadcast information. The communication and processing circuitry 1842 may further be configured to register with a core network via the pinhole access cell to provision the broadcast root key 1815 on the wireless communication device 1800. For example, the communication and processing circuitry 1842 may be configured to receive the broadcast root key 1815 or long term key 1816 from a provisioning server (e.g., after the communication and processing circuitry 1842 establishes a PDU session and a connection with the provisioning server) or a core network node (e.g., included within a registration accept message).

The communication and processing circuitry 1842 may further be configured to receive provisioning information (which may include the broadcast root key or long term key) from the provisioning server or core network node via the transceiver 1810 or interface 1820. In some examples, the provisioning information may include a key refresh interval (or expiration time) of the broadcast root key, the current time, a key identifier (ID) of the long term key or broadcast root key, and/or the HFN and the SFN. In some examples, the SFN may be considered part of the provisioning information, though the SFN may be received as part of the unencrypted broadcast information from the RAN node. The communication and processing circuitry 1842 may further be configured to execute communication and processing software 1852 stored on the computer-readable medium 1806 to implement one or more functions described herein.

The processor 1804 may further include key derivation circuitry 1844, configured to derive one or more keys for use in decrypting encrypted broadcast and/or unicast messages received by the communication and processing circuitry 1842. In examples in which the communication and processing circuitry 1842 receives the broadcast root key 1815, the key derivation circuitry 1844 may be configured to request a new broadcast root key prior to the expiration time of the current broadcast root key 1815.

In examples in which the communication and processing circuitry 1842 receives the long term key 1816, the key derivation circuitry 1844 may be configured to derive the broadcast root key 1815 from the long term key 1816 and a refresh parameter. In some examples, the refresh parameter may be determined based on the current time received as part of the provisioning information. For example, the key derivation circuitry 1844 may be configured to set a system clock 1830 to the received current time and use the system clock as a counter in determining the refresh parameter. In some examples, the refresh parameter may correspond to a quotient of a current counter value of the counter and the key refresh interval. Here, the key refresh interval may be received as part of the provisioning information. The key derivation circuitry 1844 may further derive the broadcast root key 1815 based on other additional parameters, such as one or more of the key identifier associated with the long term key, a network identifier associated with the RAN, a tracking area code associated with a tracking area comprising the secure cell, an area identifier associated with the RAN node, or a registration area code associated with a registration area comprising the secure cell.

The key derivation circuitry 1844 may further be configured to derive a cell-specific broadcast key ($K_{B\text{-}CELL}$) 1817 based on the broadcast root key 1815. In some examples, the key derivation circuitry 1844 may derive the cell-specific broadcast key 1817 based on the broadcast root key 1815 and cell identifying information. In some examples, the cell identifying information may include the PCI or a combination (concatenation) of the PCI and ARFCN indicated by the unencrypted and received PSS and SSS of an SSB. In other examples, the cell identifying information may include other cell identifying information (e.g., a random number generated for the secure cell) included in the cell-specific security parameter(s). Thus, the cell identifying information may include one or more of the PCI, ARFCN, and/or other cell identifying information. The key derivation circuitry 1844 may further derive the cell-specific broadcast key 1817 based on one or more additional cell-specific security parameters, such as the key ID of the broadcast root key, an identifier of the RAN node (RAN node ID), a security algorithm, or an additional freshness parameter (e.g., an additional counter, which may include the current time, the SFN, or a combination of the HFN and the SFN). For example, the key derivation circuitry 1844 may be configured to derive a broadcast RAN key ($K_{B\text{-}RAN}$) from the broadcast root key 1815 and the RAN node ID and then derive the cell-specific broadcast key 1817 from the broadcast RAN key and at least the cell identifying information.

The key derivation circuitry 1844 may further be configured to derive a cell-specific unicast key ($K_{U\text{-}CELL}$) 1818 for use in decrypting unicast messages (e.g., unicast DCI specific to the wireless communication device 1800) transmitted from the RAN node to the wireless communication device 1800. In some examples, the key derivation circuitry 1844 may be configured to derive the cell-specific unicast key 1818 from a RAN node key ($K_{gNB}$) that may be derived from an authentication key obtained from the core network during registration. For example, the key derivation circuitry 1844 may be configured to derive the cell-specific unicast key 1818 from the RAN node key and at least one other parameter. In some examples, the other parameter may include one or more of cell identifying information and a freshness parameter. The key derivation circuitry 1844 may further be configured to execute key derivation software 1854 stored on the computer-readable medium 1806 to implement one or more functions described herein.

The processor 1804 may further include decryption and integrity verification circuitry 1846, configured to decrypt and verify the integrity of a part of an acquisition signal (e.g., an SSB). For example, the decryption and integrity verification circuitry 1846 may be configured to decrypt and verify the integrity of a portion of the PBCH of an SSB that excludes the SFN using the cell-specific broadcast key 1817. In other examples, the decryption and integrity verification circuitry 1846 may be configured to decrypt and verify the integrity of all parts of an acquisition signal (e.g., the PSS, SSS, and PBCH of an SSB) using the cell-specific broadcast key 1817. In still other examples, the decryption and integrity verification circuitry 1846 may be configured to verify the integrity of a modified SSB (e.g., an SSB including a modified PBCH) using the cell-specific broadcast key 1817. The decryption and integrity verification circuitry 1846 may further be configured to decrypt and verify the integrity of other broadcast information related to cell access, such as the CORESET0 and SIB1 using the cell-specific broadcast key 1817. In addition, the decryption and integrity verification circuitry 1846 may be configured to decrypt and verify the integrity of other broadcast and unicast messages using the cell-specific broadcast key 1817.

In some examples, the decryption and integrity verification circuitry 1846 may be configured to decrypt broadcast and/or unicast messages using the cell-specific broadcast key 1817 and a freshness parameter (e.g., a counter). In one example, the freshness parameter may include the current time. In another example, the freshness parameter may include the SFN. In still another example, the freshness parameter includes a combination (e.g., concatenation) of the SFN and the HFN. In some examples, the decryption and integrity verification circuitry 1846 may be configured to derive an integrity protection key from the cell-specific broadcast key and verify a message authentication code included in a broadcast or unicast message based on the integrity protection key.

In some examples, the decryption and integrity verification circuitry 1846 may further be configured to decrypt and verify the integrity of unicast messages (e.g., unicast DCI) using the cell-specific unicast key 1818. The decryption and integrity verification key may further be configured to execute decryption and integrity verification software 1856 stored in the computer-readable medium 1806 to implement one or more of the functions described herein.

Figure 19:
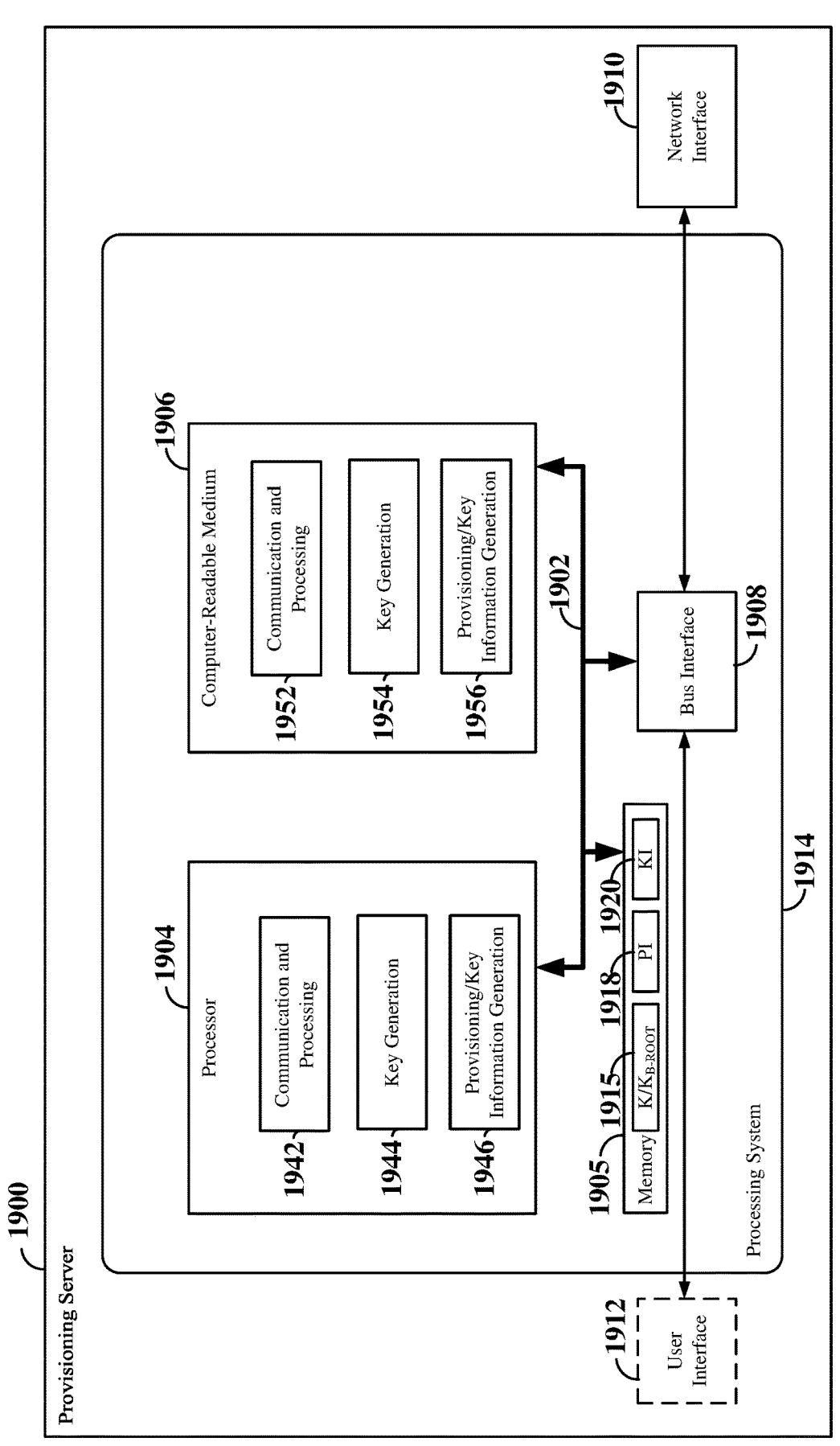
FIG. 19 is a block diagram illustrating an example of a hardware implementation for a provisioning server employing a processing system according to some aspects.

FIG. 19 is a block diagram illustrating an example of a hardware implementation for a provisioning server 1900 employing a processing system 1914. For example, the provisioning server 1900 may correspond to any of the provisioning servers shown and described above in any one or more of FIGS. 6, 8-12, 14, and/or 16.

In accordance with various aspects of the disclosure, an element, or any portion of an element, or any combination of elements may be implemented with a processing system 1914 that includes one or more processors 1904. The processing system 1914 may be substantially the same as the processing system 1714 illustrated in FIG. 17, including a bus interface 1908, a bus 1902, memory 1905, a processor 1904, and a computer-readable medium 1906. Furthermore, the provisioning server 1900 may include an optional user interface 1912 and a network interface 1910 substantially similar to those described above in FIG. 18. That is, the processor 1904, as utilized in a provisioning server 1900, may be used to implement any one or more of the processes described below.

In some aspects of the disclosure, the processor 1904 may include circuitry configured for various functions. For example, the processor 1904 may include communication and processing circuitry 1942 configured to communicate over a data network (e.g., one or more of a private data network, the Internet, or other suitable network) via the network interface 1910. The communication and processing circuitry 1942 may include one or more hardware components that provide the physical structure that performs processes related to wired communication (e.g., signal reception and/or signal transmission) and signal processing (e.g., processing a received signal and/or processing a signal for transmission). For example, the communication and processing circuitry 1942 may be configured to exchange data packets (e.g., IP packets) with a core network and/or a device via the core network and a RAN.

In some examples, the communication and processing circuitry 1942 may be configured to provision a broadcast root key on a device for use by the device in deriving a cell-specific broadcast key utilized by a secure cell to securely transmit encrypted broadcast information related to cell access to the device. In some examples, the communication and processing circuitry 1942 may establish a connection with a device over an in-band path through a wireless communication network (e.g., RAN) via the network interface 1910 (e.g., via the core network and a RAN). For example, the communication and processing circuitry 1942 may be configured to establish the connection via a PDU session between the device and the core network over the RAN. The communication and processing circuitry 1942 may further be configured to transmit a broadcast key 1915, such as a broadcast root key ($K_{B-ROOT}$) or a long term key (K) from which $K_{B-ROOT}$ may be derived and other provisioning information 1918, to the device over the in-band connection to provision the broadcast root key on the device.

In other examples, the communication and processing circuitry 1942 may be configured to establish a connection with a core network node (e.g., an AMF, UDM, KMF, or OAM) in a core network via the network interface 1910 and to transmit one or more broadcast key(s) 1915 and other provisioning information 1918 to the core network node over the core network connection. The core network node may then provision the broadcast root key on the device. In still other examples, the communication and processing circuitry 1942 may be configured to establish a connection with a device over an out-of-band path via the network interface 1910 and transmit the broadcast key 1915 and other provisioning information 1918 to the device over the out-of-band connection. For example, the communication and processing circuitry 1942 may be configured to transmit the broadcast key 1915 and other provisioning information 1918 to the device through a Wi-Fi connection, an NFC connection, or other out-of-band private data network connection with the device.

The communication and processing circuitry 1942 may further be configured to provision the cell-specific broadcast key on a RAN node serving the secure cell within which the device is located via the core network. In some examples, the communication and processing circuitry 1942 may be configured to transmit key information 1920 including at least the broadcast key 1915 (e.g., broadcast root key or long term key) and a key refresh interval (or key expiration time) to a core network node within the core network via the network interface 1910. The key information 1920 may further include a key ID of the long term key or the broadcast root key. In some examples, the key information 1920 may further include the current time and HFN/SFN to synchronize the core network node with the provisioning server. The core network node may then derive the cell-specific broadcast key (or broadcast RAN key) from the broadcast key 1915 and provision the cell-specific broadcast key (or broadcast RAN key) on the RAN node. The communication and processing circuitry 1942 may further be configured to execute communication and processing software 1952 stored in the computer-readable medium 1906 to implement one or more of the functions described herein.

The processor 1904 may further include key generation circuitry 1944, configured to generate one or more broadcast keys (broadcast root keys or long term keys) 1915 and to store the broadcast keys 1915 within, for example, memory 1905. The stored broadcast key(s) 1915 may be used by the communication and processing circuitry 1942 in distributing the broadcast key(s) 1915 to core network nodes and/or devices. The key generation circuitry 1944 may generate broadcast root key(s) periodically (e.g., prior to the end of the expiration time of the current broadcast root key). Multiple long term keys and/or broadcast root keys may be generated at a time and provided to different groups of devices or different groups of RAN nodes/cells. The use of multiple broadcast keys 1915 may reduce the burden on the provisioning server 1900 when one or more of the broadcast keys is compromised by an attacker by enabling the provisioning server 1900 to update only the devices and/or RAN nodes/cells impacted by the compromised broadcast key(s) with a new broadcast key. In addition, provisioning different broadcast keys 1915 on different devices based on the device security states of the devices may allow different devices to access different parts of the wireless communication network (e.g., different cells). The key generation circuitry 1944 may further be configured to execute key generation software 1954 stored in the computer-readable medium 1906 to implement one or more of the functions described herein.

The processor 1904 may further include provisioning/key information generation circuitry 1946, configured to generate provisioning information 1918 and key information 1920 associated with the broadcast key(s) 1915. The provisioning information 1918 and key information 1920 may be stored within, for example, memory 1905. The stored provisioning information 1918 and key information 1920 may be used by the communication and processing circuitry 1942 in distributing the corresponding provisioning information 1918 or key information 1920 with the broadcast key(s) 1915 to the core network nodes and devices. In some examples, the provisioning information 1918 associated with a broadcast key 1915 may include one or more of a key refresh interval (or expiration time) of the broadcast root key, the current time, a key identifier (ID) of the long term key or broadcast root key, and/or the HFN and the SFN. In some examples, the key information 1920 associated with a broadcast key 1915 may include a key refresh interval or expiration time associated with the broadcast key 1915, along with a key ID of the long term key or broadcast root key. The provisioning/key information generation circuitry 1946 may further be configured to execute provisioning/key information generation software 1956 stored in the computer-readable medium 1906 to implement one or more of the functions described herein.

Figure 20:
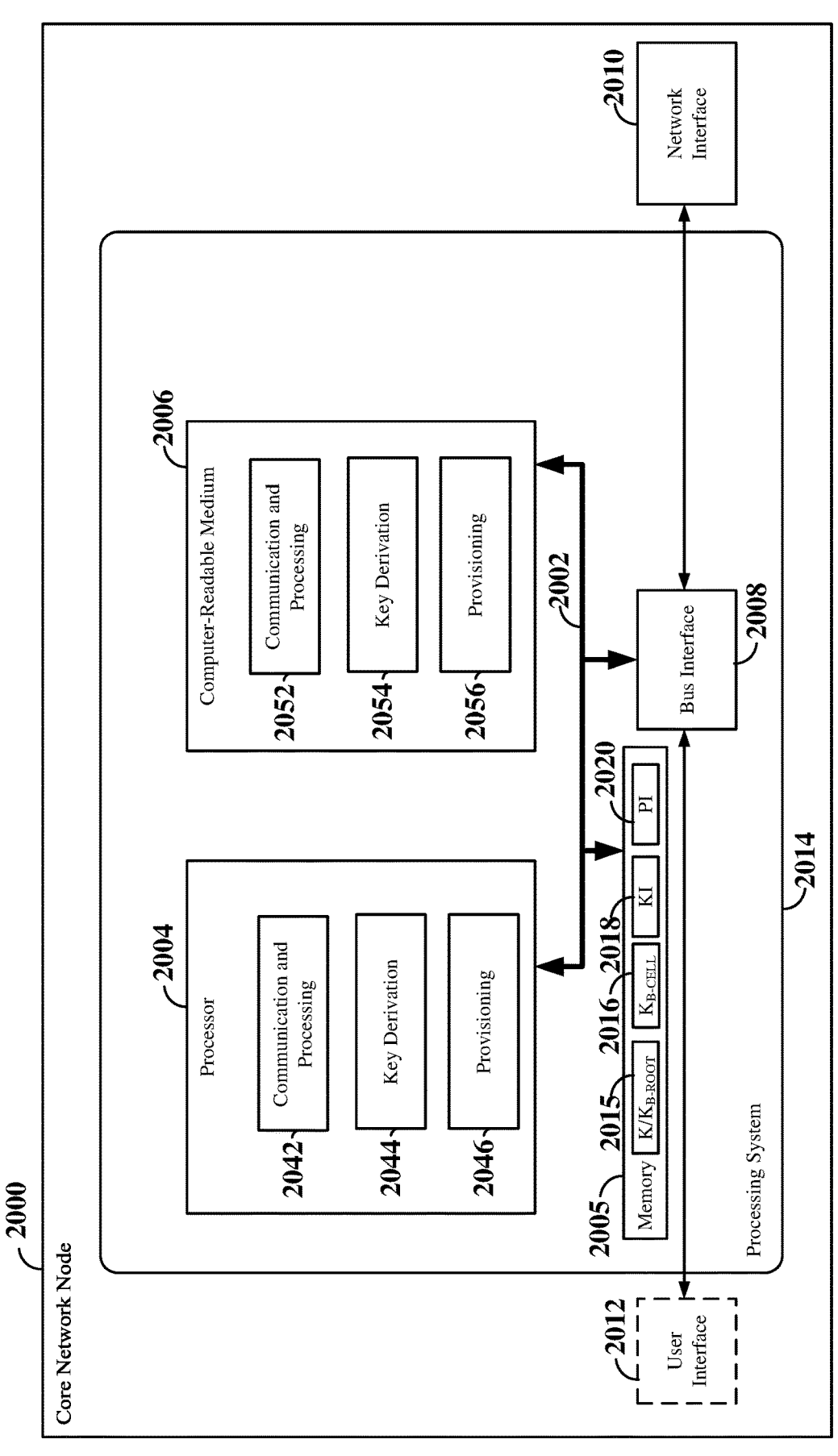
FIG. 20 is a block diagram illustrating an example of a hardware implementation for a core network node employing a processing system according to some aspects.

FIG. 20 is a block diagram illustrating an example of a hardware implementation for a core network node 2000 employing a processing system 2014. For example, the core network node 2000 may correspond to any of the core network nodes shown and described above in any one or more of FIGS. 1, 2, 6, 8-12, 14, and/or 16. In some examples, the core network node may correspond to one or more of an AMF, UDM, SMF, UPF, KMF, and/or OAM.

In accordance with various aspects of the disclosure, an element, or any portion of an element, or any combination of elements may be implemented with a processing system 2014 that includes one or more processors 2004. The processing system 2014 may be substantially the same as the processing system 1714 illustrated in FIG. 17, including a bus interface 2008, a bus 2002, memory 2005, a processor 2004, and a computer-readable medium 2006. Furthermore, the core network node 2000 may include an optional user interface 2012 and a network interface 2010 substantially similar to those described above in FIGS. 18 and 19. That is, the processor 2004, as utilized in a core network node 2000, may be used to implement any one or more of the processes described below.

In some aspects of the disclosure, the processor 2004 may include circuitry configured for various functions. For example, the processor 2004 may include communication and processing circuitry 2042 configured to communicate over a core network via the network interface 2010. The communication and processing circuitry 2042 may include one or more hardware components that provide the physical structure that performs processes related to communication (e.g., signal reception and/or signal transmission) and signal processing (e.g., processing a received signal and/or processing a signal for transmission). For example, the communication and processing circuitry 2042 may be configured to exchange NAS signaling, data packets (e.g., IP packets) and/or other messages or signaling information with a device via the core network and a RAN, a RAN node via the core network and RAN, or a provisioning server via the core network and an external data network (e.g., a private data network).

In some examples, the communication and processing circuitry 2042 may be configured to provision a broadcast key 2015 (e.g., a broadcast root key or long term key) on a device for use by the device in deriving a cell-specific broadcast key utilized by a secure cell to securely transmit encrypted broadcast information related to cell access to the device. In some examples, the communication and processing circuitry 2042 may establish a PDU session with a device via the network interface 2010 (e.g., via the core network and the RAN) and then establish a connection (e.g., user plane connection) between the device and the provisioning server via the network interface 2010 (e.g., via the core network, the RAN, and the external data network). Here, the core network node may include an SMF and/or UPF. The communication and processing circuitry 2042 may further be configured to transmit a broadcast key 2015, such as a broadcast root key ($K_{B-ROOT}$) or a long term key (K), from which $K_{B-ROOT}$ may be derived and other provisioning information 2020, from the provisioning server to the device over the user plane connection to provision the broadcast root key on the device.

In other examples, the communication and processing circuitry 2042 may be configured to receive key information (KI) 2018 from the provisioning server and to store the key information 2018 within, for example, memory 2005. The key information 2018 may include one or more broadcast keys 2015 and associated key refresh intervals or expiration times of the keys. The key information 2018 may further include a respective key ID for each of the broadcast keys 2015. In some examples, the key information 2018 may further include the current time and HFN/SFN to synchronize the core network node with the provisioning server. The communication and processing circuitry 2042 may further be configured to transmit a broadcast key 2015 of the one or more broadcast keys and corresponding provisioning information (PI) 2020 corresponding to the broadcast key to a device. For example, the communication and processing circuitry 2042 may be configured to include the broadcast key 2015 and corresponding provisioning information 2020 within a NAS registration accept message transmitted to the device during the registration procedure. Here, the core network node may include the AMF.

In some examples, the communication and processing circuitry 2042 may be configured to receive the one or more broadcast keys 2015 and key information 2018 from the provisioning server and to establish a connection with a RAN node to transmit a cell-specific broadcast key 2016 derived from a broadcast key 2015 of the one or more broadcast keys to the RAN node via the network interface 2010. Here, the core network node may include an AMF, UDM, KMF, or OAM. In some examples, the communication and processing circuitry 2042 may transmit a broadcast RAN key to the RAN node that is derived from the broadcast key 2015 and from which the cell-specific broadcast key 2016 may be derived. The communication and processing circuitry 2042 may further be configured to execute communication and processing software 2052 stored in the computer-readable medium 2006 to implement one or more of the functions described herein.

The processor 2004 may further include key derivation circuitry 2044, configured to derive the cell-specific broadcast key(s) 2016 (or broadcast RAN key(s)) for each of the secure cells served by the core network node 2000 from the one or more broadcast keys (broadcast root keys or long term keys) 2015 and to store the cell-specific broadcast keys (or broadcast RAN keys) 2016 within, for example, memory 2005. The stored cell-specific broadcast key(s) 2016 may be used by the communication and processing circuitry 2042 in distributing the cell-specific broadcast key(s) 2016 to RAN nodes. The key derivation circuitry 2044 may further periodically update the cell-specific broadcast key(s) 2016 (e.g., derive new cell-specific broadcast keys 2016 from the broadcast keys 2015) based on the expiration time and/or key refresh interval. The key derivation circuitry 2044 may further be configured to execute key derivation software 2054 stored in the computer-readable medium 2006 to implement one or more of the functions described herein.

The processor 2004 may further include provisioning circuitry 2046, configured to provision a broadcast key 2015 on a device. In some examples, the provisioning circuitry 2046 may be configured to generate provisioning information 2020 associated with the broadcast key 2015. For example, the provisioning information 2020 associated with a broadcast key 2015 may include one or more of a key refresh interval (or expiration time) of the broadcast key (e.g., as determined from the KI 2018), the current time, a key identifier (ID) of the long term key or broadcast root key (e.g., as determined from the KI 2018), and/or the HFN and the SFN. The generated provisioning information 2020 may then be provided together with the broadcast key to a device by the communication and processing circuitry 2042. Here, the core network node may include the AMF.

The provisioning circuitry 2046 may further be configured to operate together with the communication and processing circuitry 2042 to provision the cell-specific broadcast keys (or broadcast RAN keys) 2016 on corresponding RAN nodes via the network interface 2010. For example, the provisioning circuitry 2046 may provision new cell-specific broadcast keys (or broadcast RAN keys) 2016 on corresponding RAN nodes once derived by the key derivation circuitry 2044. The provisioning circuitry 2046 may further be configured to execute provisioning software 2056 stored in the computer-readable medium 2006 to implement one or more of the functions described herein.

FIG. 21 is a flow chart 2100 of a method of securely receiving broadcast information related to cell access on a wireless communication device according to some aspects.

As described below, some or all illustrated features may be omitted in a particular implementation within the scope of the present disclosure, and some illustrated features may not be required for implementation of all embodiments. In some examples, the method may be performed by the wireless communication device 1800, as described above and illustrated in FIG. 18, by a processor or processing system, or by any suitable means for carrying out the described functions.

At block 2102, the wireless communication device may obtain a broadcast root key. In some examples, the wireless communication device may receive provisioning information associated with the broadcast root key from a provisioning server via an out-of-band delivery path or an in-band delivery path (e.g., via a connection with the provisioning server or from a core network node during registration of the wireless communication device on the core network). In some examples, the provisioning information includes at least one of the broadcast root key, a long term key, a current time, a key identifier of the broadcast root key, or a system frame number (SFN) of the RAN. In some examples, the wireless communication device may derive the broadcast root key from the long term key. For example, the wireless communication device may derive the broadcast root key using a key derivation function of at least the long term key and a refresh parameter determined based on the current time. In some examples, the refresh parameter includes a quotient of a current counter value of a counter set based on the current time and a key refresh interval. For example, the counter may include a system clock of the wireless communication device, and the wireless communication device may further set the system clock to the current time.

In some examples, the wireless communication device may derive the broadcast root key based on the long term key, the refresh parameter, and one or more of the key identifier associated with the long term key, a network identifier associated with the RAN, a tracking area code associated with a tracking area comprising the secure cell, an area identifier associated with the RAN node, or a registration area code associated with a registration area comprising the secure cell. In some examples, the provisioning information includes the broadcast root key and an expiration time of the broadcast root key. In this example, the wireless communication device may further retrieve a new broadcast root key from the provisioning server or the core network node prior to the expiration time. For example, the communication and processing circuitry 1842 and key derivation circuitry 1844, together with the transceiver 1810, shown and described above in connection with FIG. 18, may provide a means to obtain the broadcast root key.

At block 2104, the wireless communication device may receive an acquisition signal from a RAN node serving a secure cell within the RAN. In some examples, the acquisition signal may include an SSB. In some examples, the SSB may be an unencrypted modified SSB including a modified PBCH (e.g., including cell-specific security parameters). In other examples, the SSB may include encrypted and unencrypted broadcast information related to cell access. For example, the PSS and SSS, along with the SFN in the PBCH, may be unencrypted, while the remainder of the PBCH may be encrypted. For example, the communication and processing circuitry 1842, together with the transceiver 1810, shown and described above in connection with FIG. 18 may provide a means to receive the acquisition signal.

At block 2106, the wireless communication device may obtain cell identifying information based on at least the acquisition signal. In some examples, the cell identifying information may include the PCI, ARFCN, and/or other cell identifying information (e.g., a random number assigned to the cell). In some examples, the cell identifying information includes at least the PCI or a concatenation of the PCI and the ARFCN of the secure cell. In this example, the acquisition signal may include unencrypted information including the PCI and ARFCN. For example, the communication and processing circuitry 1842, together with the key derivation circuitry 1844, shown and described above in connection with FIG. 18 may provide a means to obtain the cell identifying information.

At block 2108, the wireless communication device may derive a cell-specific broadcast key based on at least the broadcast root key and the cell identifying information. In some examples, the wireless communication device may derive the cell-specific broadcast key based on the broadcast root key, the cell identifying information, and one or more other cell-specific security parameters. Examples of cell-specific security parameters include the key ID of the broadcast root key, an identifier of the RAN node, a security algorithm, or a freshness parameter (e.g., a counter, which may include the current time, the SFN, or a combination of the HFN and the SFN).

In some examples, the at least one cell-specific security parameter may include the cell identifying information. In this example, the wireless communication device may derive the cell-specific broadcast key based on the broadcast root key and the at least one cell-specific security parameter. In some examples, the acquisition signal may include a first acquisition signal including the encrypted broadcast information and a second acquisition signal including the at least one cell-specific security parameter. In some examples, the second acquisition signal may include a message authentication code derived from the cell-specific broadcast key and the second acquisition signal. In this example, the wireless communication device may further verify an integrity of the second acquisition signal using the message authentication code based on an integrity protection key derived from the cell-specific broadcast key. In some examples, the first acquisition signal includes a first SSB and the second acquisition signal includes a second SSB. In some examples, the second acquisition signal including the at least one cell-specific security parameter is received in a different frame than a frame containing the first acquisition signal.

In some examples, the wireless communication device may further derive a key ID of the cell-specific broadcast key from the refresh parameter (e.g., determined based on the current time). In some examples, the wireless communication device may derive a broadcast RAN key based on the broadcast root key and an identifier of the RAN node. The wireless communication device may then derive the cell-specific broadcast key based on the broadcast RAN key and the cell identifying information. For example, the key derivation circuitry 1844 shown and described above in connection with FIG. 18 may provide a means to derive the cell-specific broadcast key.

At block 2110, the wireless communication device may receive encrypted broadcast information related to cell access. In some examples, the encrypted broadcast information may include an encrypted acquisition signal (e.g., an encrypted SSB) or encrypted broadcast information within an SSB that includes both the encrypted broadcast information or unencrypted broadcast information. In other examples, the encrypted broadcast information may include an encrypted CORESET0 and/or encrypted SIB1. For example, the communication and processing circuitry 1842, together with the transceiver 1810, shown and described above in connection with FIG. 18 may provide a means to receive the encrypted broadcast information.

At block 2112, the wireless communication device may decrypt the encrypted broadcast information using the cell-specific broadcast key to produce decrypted broadcast information. In some examples, the wireless communication device may use the cell-specific broadcast key and a freshness parameter (e.g., the current time, the SFN, or combination of the HFN and SFN) to decrypt the encrypted broadcast information. For example, the freshness parameter may include at least the SFN or a concatenation of the HFN and SFN. In some examples, the wireless communication device may further verify the integrity of the encrypted broadcast information using the cell-specific broadcast key (e.g., using an integrity protection key derived from the cell-specific broadcast key). For example, the decryption and integrity verification circuitry 1846 shown and described above in connection with FIG. 18 may provide a means to decrypt the encrypted broadcast information.

FIG. 22 is a flow chart 2200 of another method of securely receiving broadcast information related to cell access on a wireless communication device according to some aspects. As described below, some or all illustrated features may be omitted in a particular implementation within the scope of the present disclosure, and some illustrated features may not be required for implementation of all embodiments. In some examples, the method may be performed by the wireless communication device 1800, as described above and illustrated in FIG. 18, by a processor or processing system, or by any suitable means for carrying out the described functions.

At block 2202, the wireless communication device may access a pinhole access cell served by a radio access network (RAN) node (e.g., base station, such as a gNB) based on unencrypted broadcast information related to cell access transmitted in the pinhole access cell. For example, the unencrypted broadcast information may include unencrypted SSB, CORESET0, and PBCH. For example, the communication and processing circuitry 1842, together with the transceiver 1810, shown and described above in connection with FIG. 18 may provide a means to access the pinhole cell.

At block 2204, the wireless communication device may register with a core network via the pinhole access cell. For example, the wireless communication device may transmit a registration request to the AMF within the core network via the pinhole access cell. The AMF may then initiate non access stratum (NAS) level authentication between the wireless communication device and the core network (e.g., an AUSF and UDM in the core network). The AMF may then retrieve mobility subscription data, SMF selection data, and UE context and communicate with the PCF for policy association for the wireless communication device. The AMF may then send a NAS secure registration accept message to the wireless communication device to complete the registration. For example, the communication and processing circuitry 1842, together with the transceiver 1810, shown and described above in connection with FIG. 18 may provide a means to register with the core network.

At block 2206, the wireless communication device may establish a PDU session via the pinhole access cell. For example, the wireless communication device may transmit a PDU session establishment message to the SMF in the core network. For example, the communication and processing circuitry 1842, together with the transceiver 1810, shown and described above in connection with FIG. 18 may provide a means to establish a PDU session.

At block 2208, the wireless communication device may establish a connection with a provisioning server via the PDU session. In some examples, based on the policy information associated with the registration via the pinhole access cell, the SMF may allow the wireless communication device to only establish a connection with the provisioning server in a private external data network via the PDU session. The connection between the wireless communication device and the provisioning server may be routed through a UPF (or more than one UPF) in the core network, as selected by the SMF. For example, the communication and processing circuitry 1842, together with the transceiver 1810, shown and described above in connection with FIG. 18 may provide a means to establish a connection with the provisioning server.

At block 2210, the wireless communication device may receive provisioning information associated with a broadcast root key from the provisioning server. In some examples, the provisioning information may include the broadcast root key or a long term key. In addition, the provisioning information may further include the current time, a key ID of the long term key and/or broadcast root key, the SFN, and/or the HFN. In some examples, the wireless communication device may perform authentication and device attestation with the provisioning server to establish a secure connection with the provisioning server. For example, the wireless communication device may use credentials (e.g., device-specific credentials) provided by the private network to perform device authentication. The provisioning server may further check the device security state of the wireless communication device to perform device attestation. The wireless communication device may then receive the provisioning information in response to successfully performing the device authentication and device attestation.

In some examples, the wireless communication device may then receive an RRC connection release message from the pinhole access cell. The RRC connection release message may include redirection information for redirecting the wireless communication device to a secure cell. In other examples, the wireless communication device may receive a handover command from the pinhole access cell to initiate a handover of the wireless communication device from the pinhole access cell to the secure cell. For example, the communication and processing circuitry 1842, together with the transceiver 1810, shown and described above in connection with FIG. 18 may provide a means to receive the provisioning information.

At block 2212, the wireless communication device may derive a cell-specific broadcast key based on at least the broadcast root key and cell identifying information of the secure cell. In some examples, the wireless communication device may receive broadcast information including encrypted and unencrypted broadcast information related to cell access broadcast by the RAN node within the secure cell. In some examples, the broadcast information may include an acquisition signal, such as an SSB, along with a CORESET0, and a SIB1. The wireless communication device may use the unencrypted broadcast information (e.g., within the acquisition signal) to obtain the cell identifying information and use the cell identifying information and broadcast root key to derive the cell-specific broadcast key. For example, the communication and processing circuitry 1842, together with the key derivation circuitry 1844 and transceiver 1810, shown and described above in connection with FIG. 18 may provide a means to derive the cell-specific broadcast key.

At block 2214, the wireless communication device may decrypt encrypted broadcast information using the cell-specific broadcast key to produce decrypted broadcast information. In some examples, the wireless communication device may use the cell-specific broadcast key and a freshness parameter (e.g., the current time, the SFN, or combination of the HFN and SFN) to decrypt the encrypted broadcast information. For example, the freshness parameter may include at least the SFN or a concatenation of the HFN and SFN. In some examples, the wireless communication device may further verify the integrity of the encrypted broadcast information using the cell-specific broadcast key (e.g., using an integrity protection key derived from the cell-specific broadcast key). For example, the decryption and integrity verification circuitry 1846 shown and described above in connection with FIG. 18 may provide a means to decrypt the encrypted broadcast information.

At block 2216, the wireless communication device may access the secure cell utilizing the decrypted broadcast information. For example, the communication and processing circuitry 1842, together with the transceiver 1810, shown and described above in connection with FIG. 18 may provide a means to access the secure cell.

FIG. 23 is a flow chart 2300 of another method of securely receiving broadcast information related to cell access on a wireless communication device according to some aspects. As described below, some or all illustrated features may be omitted in a particular implementation within the scope of the present disclosure, and some illustrated features may not be required for implementation of all embodiments. In some examples, the method may be performed by the wireless communication device 1800, as described above and illustrated in FIG. 18, by a processor or processing system, or by any suitable means for carrying out the described functions.

At block 2302, the wireless communication device may access a pinhole access cell served by a radio access network (RAN) node (e.g., base station, such as a gNB) based on unencrypted broadcast information related to cell access transmitted in the pinhole access cell. For example, the unencrypted broadcast information may include unencrypted SSB, CORESET0, and PBCH. For example, the communication and processing circuitry 1842, together with the transceiver 1810, shown and described above in connection with FIG. 18 may provide a means to access the pinhole cell.

At block 2304, the wireless communication device may transmit a registration request message to a core network node within a core network via the pinhole access cell. For example, the wireless communication device may transmit a registration request to the AMF within the core network via the pinhole access cell. The AMF may then initiate non access stratum (NAS) level authentication between the wireless communication device and the core network (e.g., an AUSF and UDM in the core network). The AMF may then retrieve mobility subscription data, SMF selection data, and UE context and communicate with the PCF for policy association for the wireless communication device. For example, the communication and processing circuitry 1842, together with the transceiver 1810, shown and described above in connection with FIG. 18 may provide a means to transmit the registration request message.

At block 2306, the wireless communication device may receive a registration accept message from the core network via the pinhole access cell. The registration accept message may include provisioning information associated with a broadcast root key. For example, the AMF may send a NAS secure registration accept message including the provisioning information to the wireless communication device to complete the registration. The provisioning information may include, for example, the broadcast root key or a long term key. In addition, the provisioning information provided by the AMF to the wireless communication device may further include the current time, a key ID of the long term key and/or broadcast root key, the SFN and/or the HFN. In some examples, the AMF may be configured to perform device authentication (e.g., using device-specific credentials provided by the private data network) and/or device attestation with the wireless communication device prior to delivering the registration accept message including the provisioning information.

In some examples, the wireless communication device may then receive an RRC connection release message from the pinhole access cell. The RRC connection release message may include redirection information for redirecting the wireless communication device to a secure cell. In other examples, the wireless communication device may receive a handover command from the pinhole access cell to initiate a handover of the wireless communication device from the pinhole access cell to the secure cell. For example, the communication and processing circuitry 1842, together with the transceiver 1810, shown and described above in connection with FIG. 18 may provide a means to receive the registration accept message.

At block 2308, the wireless communication device may derive a cell-specific broadcast key based on at least the broadcast root key and cell identifying information of the secure cell. In some examples, the wireless communication device may receive broadcast information including encrypted and unencrypted broadcast information related to cell access broadcast by the RAN node within the secure cell. In some examples, the broadcast information may include an acquisition signal, such as an SSB, along with a CORESET0, and a SIB1. The wireless communication device may use the unencrypted broadcast information (e.g., within the acquisition signal) to obtain the cell identifying information and use the cell identifying information and broadcast root key to derive the cell-specific broadcast key. For example, the communication and processing circuitry 1842, together with the key derivation circuitry 1844 and transceiver 1810, shown and described above in connection with FIG. 18 may provide a means to derive the cell-specific broadcast key.

At block 2310, the wireless communication device may decrypt encrypted broadcast information using the cell-specific broadcast key to produce decrypted broadcast information. In some examples, the wireless communication device may use the cell-specific broadcast key and a freshness parameter (e.g., the current time, the SFN, or combination of the HFN and SFN) to decrypt the encrypted broadcast information. For example, the freshness parameter may include at least the SFN or a concatenation of the HFN and SFN. In some examples, the wireless communication device may further verify the integrity of the encrypted broadcast information using the cell-specific broadcast key (e.g., using an integrity protection key derived from the cell-specific broadcast key). For example, the decryption and integrity verification circuitry 1846 shown and described above in connection with FIG. 18 may provide a means to decrypt the encrypted broadcast information.

At block 2312, the wireless communication device may access the secure cell utilizing the decrypted broadcast information. For example, the communication and processing circuitry 1842, together with the transceiver 1810, shown and described above in connection with FIG. 18 may provide a means to access the secure cell.

FIG. 24 is a flow chart 2400 of another method of securely receiving broadcast information related to cell access on a wireless communication device according to some aspects. As described below, some or all illustrated features may be omitted in a particular implementation within the scope of the present disclosure, and some illustrated features may not be required for implementation of all embodiments. In some examples, the method may be performed by the wireless communication device 1800, as described above and illustrated in FIG. 18, by a processor or processing system, or by any suitable means for carrying out the described functions.

At block 2402, the wireless communication device may access a secure cell. For example, the wireless communication device may utilize any of the methods shown in FIGS. 21-23 to access the secure cell. For example, the communication and processing circuitry 1842, together with the key derivation circuitry 1844, the decryption and integrity verification circuitry 1846, and the transceiver 1810, shown and described above in connection with FIG. 18 may provide a means to access the secure cell.

At block 2404, the wireless communication device may register with a core network upon accessing the secure cell. For example, the wireless communication device and AMF within the core network may set-up non access stratum (NAS) security to securely deliver NAS messages in the control plane between the device wireless communication device and the AMF. For example, the communication and processing circuitry 1842, together with the transceiver 1810, shown and described above in connection with FIG. 18 may provide a means to register with the core network.

At block 2406, the wireless communication device may establish an access stratum (AS) security context with a radio access network (RAN) node. The AS security context may include a RAN node key. The AS security context may be utilized to securely deliver RRC messages in the control plane and IP packets in the user plane between the wireless communication device and the RAN node. In some examples, the AS security may utilize AS security keys derived from the RAN node key.

In some examples, the wireless communication device may receive at least one message from the RAN node prior to establishing the AS security context. The at least one message may be encrypted using a cell-specific broadcast key. For example, the at least one message may be a broadcast message or a unicast message. For example, the communication and processing circuitry 1842, together with the transceiver 1810, shown and described above in connection with FIG. 18 may provide a means to establish an AS security context.

At block 2408, the wireless communication device may derive a cell-specific unicast key based on the RAN node key and at least one parameter. The at least one parameter may include a concatenation of cell identifying information for the secure cell and a freshness parameter (e.g., a counter). For example, the communication and processing circuitry 1842, together with the key derivation circuitry 1844, and transceiver 1810, shown and described above in connection with FIG. 18 may provide a means to derive the cell-specific unicast key.

At block 2410, the wireless communication device may receive encrypted downlink control information including unicast information for the wireless communication device from the RAN node. For example, the communication and processing circuitry 1842, together with the transceiver 1810, shown and described above in connection with FIG. 18 may provide a means to receive the encrypted downlink control information.

At block 2412, the wireless communication device may decrypt the encrypted downlink control information using the cell-specific unicast key. For example, the decryption and integrity verification circuitry 1846 shown and described above in connection with FIG. 18 may provide a means to decrypt the downlink control information.

In one configuration, the wireless communication device 1800 includes means for performing the various functions and processes described in relation to FIGS. 1-3, 8, 9, 11, and/or 18. In one aspect, the aforementioned means may be the processor 1804 shown in FIG. 18 configured to perform the functions recited by the aforementioned means. In another aspect, the aforementioned means may be a circuit or any apparatus configured to perform the functions recited by the aforementioned means.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1-3, 8, 9, 11, and/or 18 and utilizing, for example, the processes and/or algorithms described herein in relation to FIGS. 6, 7A, 7B, 10, 12, 14, 16, and 21-24.

Figure 25:
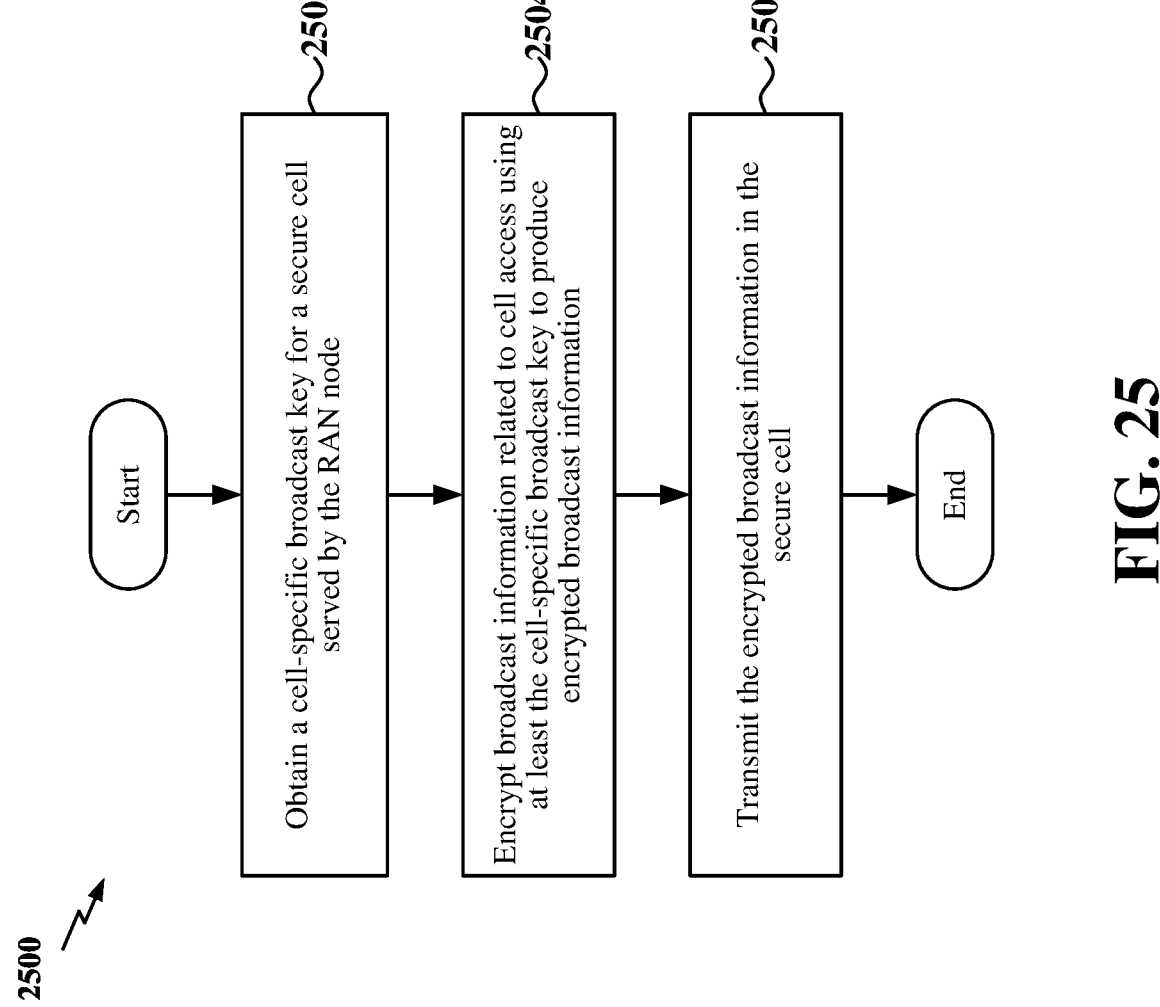
FIG. 25 is a flow chart of an exemplary method for securely transmitting broadcast information related to cell access by a RAN node according to some aspects.

FIG. 25 is a flow chart 2500 of a method for securely transmitting broadcast information related to cell access by a RAN node according to some aspects. As described below, some or all illustrated features may be omitted in a particular implementation within the scope of the present disclosure, and some illustrated features may not be required for implementation of all embodiments. In some examples, the method may be performed by the RAN node 1700, as described above and illustrated in FIG. 17, by a processor or processing system, or by any suitable means for carrying out the described functions.

At block 2502, the RAN node may obtain a cell-specific broadcast key for a secure cell served by the RAN node. In some examples, the RAN node may receive the cell-specific broadcast key from a core network node (e.g., AMF, UDM, KMF, or OAM) within a core network. In this example, the cell-specific broadcast key may be derived from a broadcast root key provided to the core network node by a provisioning server. In other examples, the RAN node may receive a broadcast RAN key from the core network node and may derive the cell-specific broadcast key based on the broadcast RAN key and cell identifying information of the secure cell (e.g., PCI, PCI∥ARFCN, or other cell identifying information). For example, the communication and processing circuitry 1744, together with the encryption and integrity protection circuitry 1748 and transceiver 1710, shown and described above in connection with FIG. 17, may provide a means to obtain the cell-specific broadcast key.

At block 2504, the RAN node may encrypt broadcast information related to cell access using the cell-specific broadcast key to produce encrypted broadcast information. In some examples, the encrypted broadcast information may include at least a part of an acquisition signal. For example, the encrypted broadcast information may include an SSB or the PBCH of an SSB excluding the SFN. The encrypted broadcast information may further include a CORESET0 and/or SIB1. In some examples, the RAN node may encrypt the broadcast information using the cell-specific broadcast key and a freshness parameter (e.g., the current time, the SFN, or a combination (concatenation) of the HFN and SFN).

In some examples, the RAN node may transmit an acquisition signal including at least a part of the encrypted broadcast information and unencrypted broadcast information. For example, the unencrypted broadcast information may include a physical cell identity (PCI) of the secure cell and an absolute radio frequency channel number (ARFCN) of the secure cell. In this example, the acquisition signal may include an SSB including a PSS, SSS, and PBCH. The unencrypted broadcast information may include the PSS, the SSS, and a first portion of the PBCH, and the encrypted broadcast information may include a remaining portion of the PBCH, a SIB (e.g., SIB1), and a PDCCH resource set (CORESET 0) including scheduling information for the SIB1. In some examples, the first portion of the PBCH may include the SFN within a MIB. For example, the encryption and integrity protection circuitry 1748, together with the acquisition signal generation circuitry 1746, shown and described above in connection with FIG. 17, may provide a means to encrypt the broadcast information.

At block 2506, the RAN node may transmit the encrypted broadcast information in the secure cell. For example, the communication and processing circuitry 1744, together with the transceiver 1710, shown and described above in connection with FIG. 17 may provide a means to transmit the encrypted broadcast information.

FIG. 26 is a flow chart 2600 of another method for securely transmitting broadcast information related to cell access by a RAN node according to some aspects. As described below, some or all illustrated features may be omitted in a particular implementation within the scope of the present disclosure, and some illustrated features may not be required for implementation of all embodiments. In some examples, the method may be performed by the RAN node 1700, as described above and illustrated in FIG. 17, by a processor or processing system, or by any suitable means for carrying out the described functions.

At block 2602, the RAN node may obtain a cell-specific broadcast key for a secure cell served by the RAN node. In some examples, the RAN node may receive the cell-specific broadcast key from a core network node (e.g., AMF, UDM, KMF, or OAM) within a core network. In this example, the cell-specific broadcast key may be derived from a broadcast root key provided to the core network node by a provisioning server. In other examples, the RAN node may receive a broadcast RAN key from the core network node and may derive the cell-specific broadcast key based on the broadcast RAN key and cell identifying information of the secure cell (e.g., PCI, PCI∥ARFCN, or other cell identifying information). For example, the communication and processing circuitry 1744, together with the encryption and integrity protection circuitry 1748 and transceiver 1710, shown and described above in connection with FIG. 17, may provide a means to obtain the cell-specific broadcast key.

At block 2604, the RAN node may encrypt broadcast information related to cell access using the cell-specific broadcast key to produce encrypted broadcast information. In some examples, the encrypted broadcast information may include an SSB or the PBCH of an SSB excluding the SFN. The encrypted broadcast information may further include a CORESET0 and/or SIB1. In some examples, the RAN node may encrypt the broadcast information using the cell-specific broadcast key and a freshness parameter (e.g., the current time, the SFN, or a combination (concatenation) of the HFN and SFN). For example, the encryption and integrity protection circuitry 1748, together with the acquisition signal generation circuitry 1746, shown and described above in connection with FIG. 17, may provide a means to encrypt the broadcast information.

At block 2606, the RAN node may transmit a first acquisition signal including at least part of the encrypted broadcast information in the secure cell. For example, the first acquisition signal may include a first SSB. For example, the communication and processing circuitry 1744, together with the transceiver 1710, shown and described above in connection with FIG. 17 may provide a means to transmit the first acquisition signal.

At block 2608, the RAN node may transmit a second acquisition signal including at least one cell-specific security parameter in the secure cell. For example, the second acquisition signal may include a second SSB. In some examples, the at least one cell-specific security parameter includes cell identifying information. In some examples, the at least one cell-specific security parameter further includes at least one of a key ID of the broadcast root key, an identifier of the RAN node, or a freshness parameter. In some examples, the RAN node may transmit the second acquisition signal in a different message than a message containing the first acquisition signal. In some examples, the second acquisition signal includes a message authentication code derived from the cell-specific broadcast key and the second acquisition signal. For example, the communication and processing circuitry 1744, together with the transceiver 1710, shown and described above in connection with FIG. 17 may provide a means to transmit the second acquisition signal.

Figure 27:
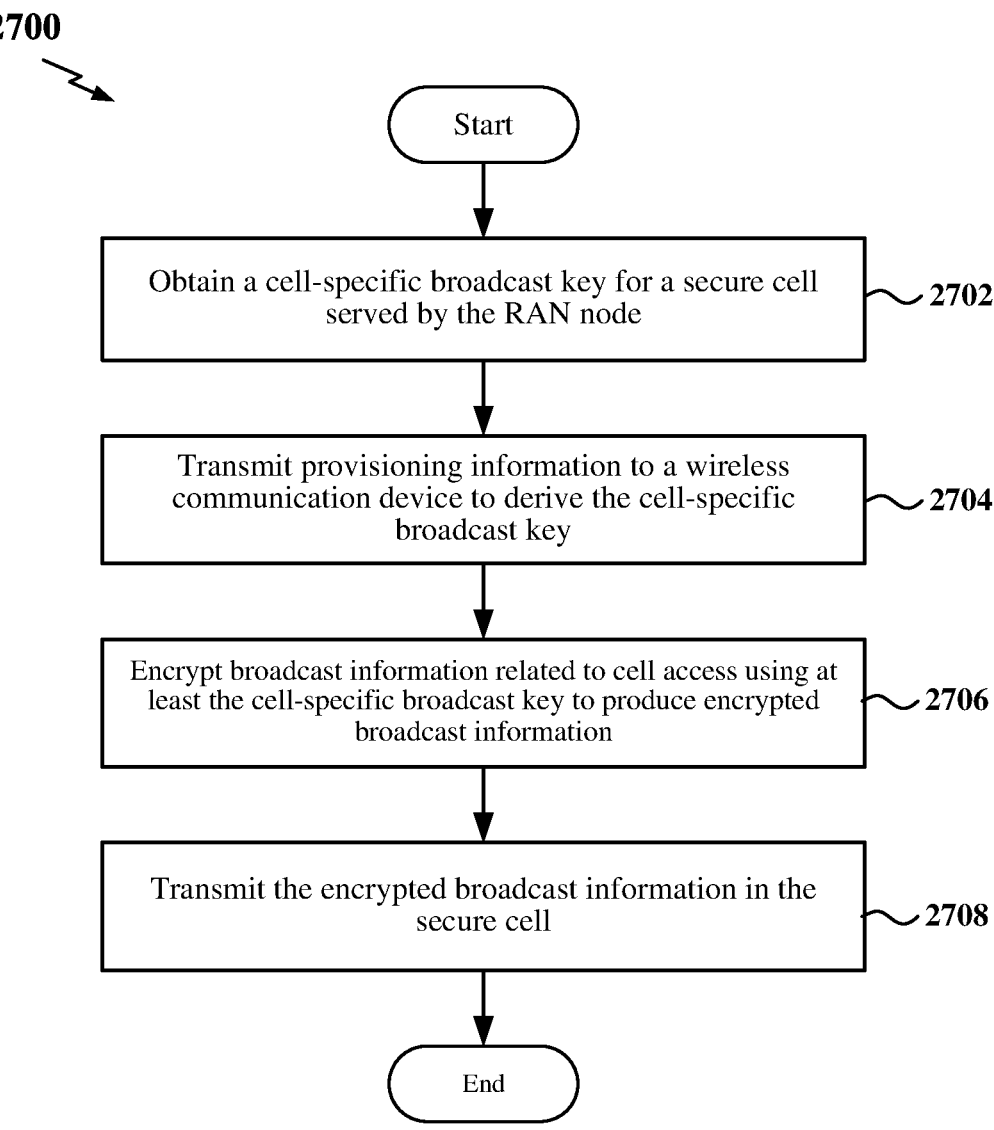
FIG. 27 is a flow chart of another exemplary method for securely transmitting broadcast information related to cell access by a RAN node according to some aspects.

FIG. 27 is a flow chart 2700 of another method for securely transmitting broadcast information related to cell access by a RAN node according to some aspects. As described below, some or all illustrated features may be omitted in a particular implementation within the scope of the present disclosure, and some illustrated features may not be required for implementation of all embodiments. In some examples, the method may be performed by the RAN node 1700, as described above and illustrated in FIG. 17, by a processor or processing system, or by any suitable means for carrying out the described functions.

At block 2702, the RAN node may obtain a cell-specific broadcast key for a secure cell served by the RAN node. In some examples, the RAN node may receive the cell-specific broadcast key from a core network node (e.g., AMF, UDM, KMF, or OAM) within a core network. In this example, the cell-specific broadcast key may be derived from a broadcast root key provided to the core network node by a provisioning server. In other examples, the RAN node may receive a broadcast RAN key from the core network node and may derive the cell-specific broadcast key based on the broadcast RAN key and cell identifying information of the secure cell (e.g., PCI, PCI|ARFCN, or other cell identifying information). For example, the communication and processing circuitry 1744, together with the encryption and integrity protection circuitry 1748 and transceiver 1710, shown and described above in connection with FIG. 17, may provide a means to obtain the cell-specific broadcast key.

At block 2704, the RAN node may transmit provisioning information to a wireless communication device. At least a part of the provisioning information may originate at a provisioning server and be provided to the RAN node from the provisioning server directly or via a core network node within a core network. The provisioning information may enable provisioning of a broadcast root key from which the cell-specific broadcast key is derived on the wireless communication device. In some examples, the provisioning information may include at least one of the broadcast root key, a long term key, a current time, a key ID of the broadcast root key, an SFN, or an HFN of the RAN. For example, the communication and processing circuitry 1744, together with the transceiver 1710, shown and described above in connection with FIG. 17, may provide a means transmit the provisioning information.

At block 2706, the RAN node may encrypt broadcast information related to cell access using the cell-specific broadcast key to produce encrypted broadcast information. In some examples, the encrypted broadcast information may include at least a part of an acquisition signal. For example, the encrypted broadcast information may include an SSB or the PBCH of an SSB excluding the SFN. The encrypted broadcast information may further include a CORESET0 and/or SIB1. In some examples, the RAN node may encrypt the broadcast information using the cell-specific broadcast key and a freshness parameter (e.g., the current time, the SFN, or a combination (concatenation) of the HFN and SFN).

In some examples, the RAN node may transmit an acquisition signal including at least a part of the encrypted broadcast information and unencrypted broadcast information. For example, the unencrypted broadcast information may include a physical cell identity (PCI) of the secure cell and an absolute radio frequency channel number (ARFCN) of the secure cell. In this example, the acquisition signal may include an SSB including a PSS, SSS, and PBCH. The unencrypted broadcast information may include the PSS, the SSS, and a first portion of the PBCH, and the encrypted broadcast information may include a remaining portion of the PBCH, a SIB (e.g., SIB1), and a PDCCH resource set (CORESET 0) including scheduling information for the SIB1. In some examples, the first portion of the PBCH may include the SFN within a MIB. For example, the encryption and integrity protection circuitry 1748, together with the acquisition signal generation circuitry 1746, shown and described above in connection with FIG. 17, may provide a means to encrypt the broadcast information.

At block 2708, the RAN node may transmit the encrypted broadcast information in the secure cell. For example, the communication and processing circuitry 1744, together with the transceiver 1710, shown and described above in connection with FIG. 17 may provide a means to transmit the encrypted broadcast information.

FIG. 28 is a flow chart 2800 of another method for securely transmitting broadcast information related to cell access by a RAN node according to some aspects. As described below, some or all illustrated features may be omitted in a particular implementation within the scope of the present disclosure, and some illustrated features may not be required for implementation of all embodiments. In some examples, the method may be performed by the RAN node 1700, as described above and illustrated in FIG. 17, by a processor or processing system, or by any suitable means for carrying out the described functions.

At block 2802, the RAN node may transmit unencrypted broadcast information related to cell access in a pinhole access cell served by a radio access network (RAN) node. For example, the unencrypted broadcast information may include unencrypted SSB, CORESET0, and PBCH. For example, the communication and processing circuitry 1744, together with the transceiver 1710, shown and described above in connection with FIG. 17 may provide a means to transmit the unencrypted broadcast information in the pinhole access cell.

At block 2804, the RAN node may receive a registration request from a wireless communication device via the pinhole access cell based on the unencrypted broadcast information to register the wireless communication device with a core network. In some examples, the RAN node may further establish a protocol data unit (PDU) session for the wireless communication device via the pinhole access cell and the core network. The RAN node may then establish a connection between the wireless communication device and a provisioning server via the PDU session. In addition, the RAN node may transmit provisioning information from the provisioning server to the wireless communication device. The provisioning information may enable provision of a broadcast root key from which a cell-specific broadcast key is derived on the wireless communication device. For example, the communication and processing circuitry 1744, together with the transceiver 1710, shown and described above in connection with FIG. 17 may provide a means to receive a registration request from the wireless communication device via the pinhole access cell.

At block 2806, the RAN node may transmit a registration accept message from a core network node within the core network to the wireless communication device via the pinhole access cell. In some examples, the registration accept message includes the provisioning information that enables provisioning of a broadcast root key from which the cell-specific broadcast key is derived on the wireless communication device.

In some examples, the RAN node may further transmit a radio resource control (RRC) connection release message to the wireless communication device via the pinhole access cell. The RRC connection release message can include redirection information for redirecting the wireless communication device to a secure cell. In other examples, the RAN node may transmit a handover command to the wireless communication device via the pinhole access cell to handover the wireless communication device from the pinhole access cell to the secure cell. For example, the communication and processing circuitry 1744, together with the transceiver 1710, shown and described above in connection with FIG. 17 may provide a means to transmit the registration accept message to the wireless communication device via the pinhole access cell.

FIG. 29 is a flow chart 2900 of another method for securely transmitting broadcast information related to cell access by a RAN node according to some aspects. As described below, some or all illustrated features may be omitted in a particular implementation within the scope of the present disclosure, and some illustrated features may not be required for implementation of all embodiments. In some examples, the method may be performed by the RAN node 1700, as described above and illustrated in FIG. 17, by a processor or processing system, or by any suitable means for carrying out the described functions.

At block 2902, the RAN node may establish an access stratum (AS) security context with a wireless communication device upon the wireless communication device registering with a core network via a secure cell. The AS security context can include a RAN node key. The AS security context may be utilized to securely deliver RRC messages in the control plane and IP packets in the user plane between the wireless communication device and the RAN node. In some examples, the AS security may utilize AS security keys derived from the RAN node key.

In some examples, the RAN node may transmit at least one message to the wireless communication device prior to establishing the AS security context. The at least one message may be encrypted using a cell-specific broadcast key. For example, the at least one message may be a broadcast message or a unicast message. For example, the communication and processing circuitry 1744, together with the transceiver 1710, shown and described above in connection with FIG. 17 may provide a means to establish the AS security context with the wireless communication device.

At block 2904, the RAN node may derive a cell-specific unicast key based on the RAN node key and at least one parameter. The at least one parameter may include a concatenation of cell identifying information for the secure cell and a freshness parameter (e.g., a counter). For example, the encryption and integrity protection circuitry 1748 shown and described above in connection with FIG. 17 may provide a means to derive the cell-specific unicast key.

At block 2906, the RAN node may encrypt downlink control information including unicast information for the wireless communication device using the cell-specific unicast key to produce encrypted downlink control information. For example, the encryption and integrity protection circuitry 1748 shown and described above in connection with FIG. 17 may provide a means to encrypt the downlink control information.

At block 2908, the RAN node may transmit the encrypted downlink control information to the wireless communication device. For example, the communication and processing circuitry 1744, together with the transceiver 1710, shown and described above in connection with FIG. 17 may provide a means to transmit the encrypted downlink control information to the wireless communication device.

In one configuration, the RAN node 1700 includes means for performing the various functions and processes described in relation to FIGS. 1-3, 8, 9, 11, and/or 17. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1-3, 8, 9, 11, and/or 17, and utilizing, for example, the processes and/or algorithms described herein in relation to FIGS. 6, 7A, 7B, 10, 12, 14, 16, and/or 25-29.

Figure 30:
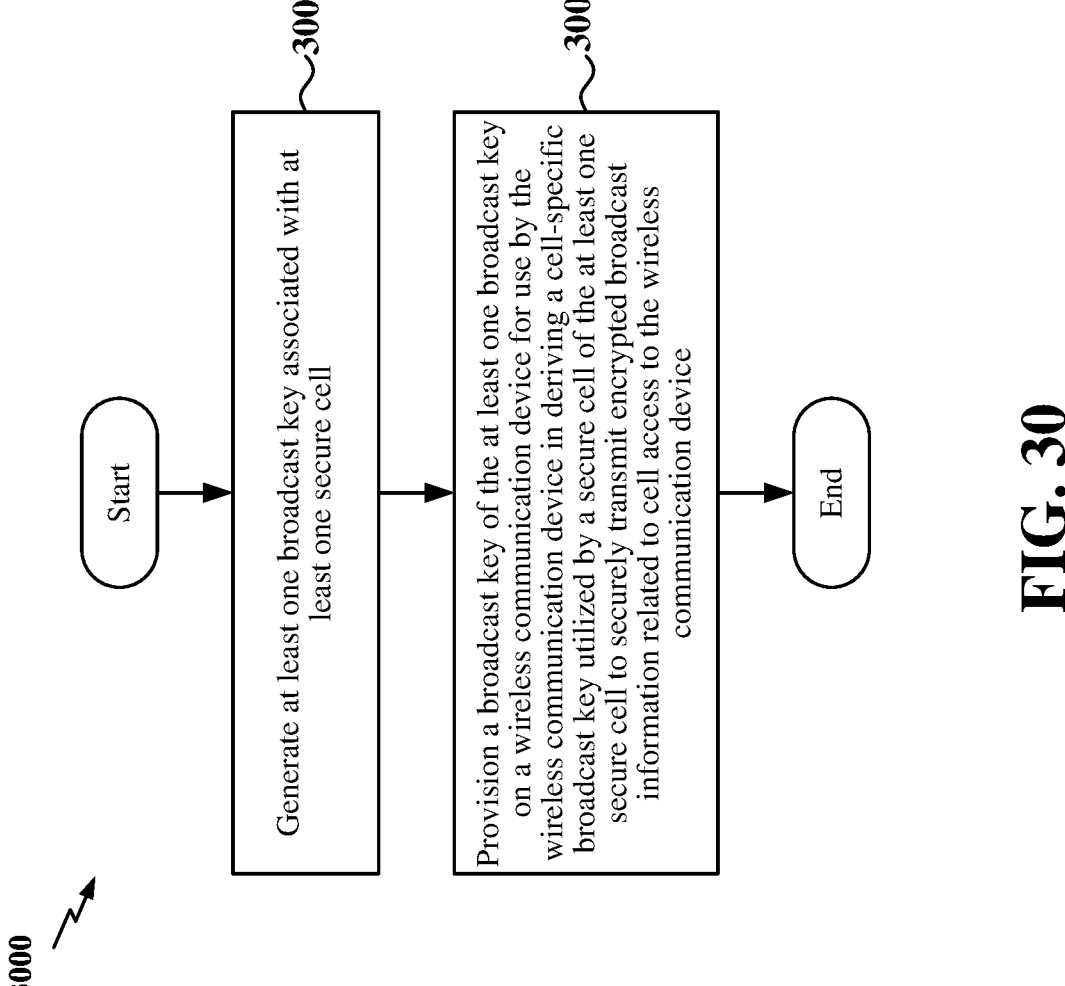
FIG. 30 is a flow chart of an exemplary method for enabling secure communication of broadcast information related to cell access according to some aspects.

FIG. 30 is a flow chart 3000 of a method for enabling secure communication of broadcast information related to cell access according to some aspects. As described below, some or all illustrated features may be omitted in a particular implementation within the scope of the present disclosure, and some illustrated features may not be required for implementation of all embodiments. In some examples, the method may be performed by the provisioning server 1900, as described above and illustrated in FIG. 19, by a processor or processing system, or by any suitable means for carrying out the described functions.

At block 3002, the provisioning server may generate at least one broadcast key associated with at least one secure cell. In some examples, the at least one broadcast key may include at least one long term key or at least one broadcast root key. In some examples, the provisioning server may generate the at least one long term key from which the at least one broadcast root key may be derived. For example, the key generation circuitry 1944 shown and described above in connection with FIG. 19 may provide a means to generate the at least one broadcast key.

At block 3004, the provisioning server may provision a broadcast key (e.g., long term key or broadcast root key) of the at least one broadcast key on a wireless communication device for use by the wireless communication device in deriving a cell-specific broadcast key utilized by a secure cell of the at least one secure cell to securely transmit encrypted broadcast information related to cell access to the wireless communication device. In some examples, the provisioning server may provision the broadcast key via an out-of-band delivery path or an in-band delivery path (e.g., via a connection with the wireless communication device or via a core network node during registration of the wireless communication device on the core network). In some examples, the provisioning server may further transmit provisioning information to the wireless communication device (e.g., either directly or via the core network node).

In some examples, the provisioning server may establish a connection with the wireless communication device via a protocol data unit (PDU) session associated with the wireless communication device. The provisioning server may then transmit the broadcast key to the wireless communication device via the connection. In some examples, the broadcast key is a long term key of the at least one long term key to the wireless communication device via the connection. In some examples, the provisioning server may further transmit provisioning information to the wireless communication device via the connection. The provisioning information can include at least one of a first key identifier of the long term key, a second key identifier of a broadcast root key of the at least one broadcast root key, or a key refresh interval.

In some examples, the provisioning server may transmit key information including the at least one long term key and a key refresh interval to a core network node within a core network for transmission of provisioning information including at least the long term key and the key refresh interval from the core network node to the wireless communication device during registration of the wireless communication device with the core network.

In some examples, the provisioning server may provision the cell-specific broadcast key on a RAN node serving the secure cell via a core network. In some examples, the provisioning server may generate at least one long term key from which at least one broadcast root key may be derived. The provisioning server may then transmit key information including at least a long term key of the at least one long term key and a key refresh interval to a core network node within the core network to derive a broadcast root key of the at least one broadcast root key and the cell-specific broadcast key or a broadcast RAN key therefrom. The cell-specific broadcast key or the broadcast RAN key and the key refresh interval may then be transmitted to the RAN node from the core network node. The cell-specific network key may be derived from the broadcast RAN key. In other examples, the provisioning server may transmit key information including at least the broadcast key and a key refresh interval to a core network node within the core network to derive the cell-specific broadcast key or a broadcast RAN key therefrom. The cell-specific broadcast key or broadcast RAN key and the key refresh interval may then be transmitted to the RAN node from the core network node. The cell-specific network key may be derived from the broadcast RAN key. For example, the communication and processing circuitry 1942, together with the network interface 1910, shown and described above in connection with FIG. 19, may provide a means to provision the broadcast key on the wireless communication device.

In one configuration, the provisioning server 1900 includes means for performing the various functions and processes described in relation to FIGS. 1-3, 8, 9, 11, and/or 19. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1-3, 8, 9, 11, and/or 19, and utilizing, for example, the processes and/or algorithms described herein in relation to FIGS. 6, 7A, 7B, 10, 12, 14, 16, and/or 30.

The processes shown in FIGS. 21-30 may include additional aspects, such as any single aspect or any combination of aspects described below and/or in connection with one or more other processes described elsewhere herein.

Aspect 1: A method of wireless communication in a radio access network (RAN) of a wireless communication system, comprising, at a wireless communication device: obtaining a broadcast root key; receiving an acquisition signal from a RAN node serving a secure cell within the RAN; obtaining cell identifying information based on at least the acquisition signal; deriving a cell-specific broadcast key based on at least the broadcast root key and the cell identifying information; receiving encrypted broadcast information related to cell access; and decrypting the encrypted broadcast information using the cell-specific broadcast key to produce decrypted broadcast information.

Aspect 2: The method of aspect 1, wherein the obtaining the broadcast root key further comprises: receiving provisioning information comprising at least one of the broadcast root key, a long term key, a current time, a key identifier of the broadcast root key, or a system frame number (SFN) of the RAN.

Aspect 3: The method of aspect 2, wherein the obtaining the broadcast root key further comprises: deriving the broadcast root key based on at least the long term key, a refresh parameter determined based on the current time, and one or more of the key identifier associated with the long term key, a network identifier associated with the RAN, a tracking area code associated with a tracking area comprising the secure cell, an area identifier associated with the RAN node, or a registration area code associated with a registration area comprising the secure cell.

Aspect 4: The method of aspect 3, wherein the refresh parameter comprises a quotient of a current counter value of a counter set based on the current time and a key refresh interval.

Aspect 5: The method of any of aspects 2 through 4, wherein the provisioning information further comprises a hyper frame number (HFN) of the RAN, and wherein the decrypting the encrypted broadcast information further comprises: decrypting the encrypted broadcast information based on the cell-specific broadcast key and a freshness parameter, wherein the freshness parameter comprises a concatenation of the HFN and the SFN.

Aspect 6: The method of any of aspects 1 through 5, wherein the obtaining the broadcast root key further comprises: receiving provisioning information associated with the broadcast root key via an out-of-band delivery path external to the wireless communication system.

Aspect 7: The method of any of aspects 1 through 5, wherein the obtaining the broadcast root key further comprises: receiving provisioning information associated with the broadcast root key from at least one of a provisioning server, a core network node, or the RAN node.

Aspect 8: The method of any of aspects 1 through 5 or 7, wherein the obtaining the broadcast root key further comprises: accessing a pinhole access cell served by the RAN node based on unencrypted broadcast information related to cell access transmitted in the pinhole access cell; and registering with a core network via the pinhole access cell to obtain the broadcast root key.

Aspect 9: The method of aspect 8, wherein the obtaining the broadcast root key further comprises: establishing a protocol data unit (PDU) session via the pinhole access cell; establishing a connection with a provisioning server via the PDU session; and receiving provisioning information associated with the broadcast root key on the wireless communication device from the provisioning server.

Aspect 10: The method of aspect 9, further comprising: performing device authentication and device attestation with the provisioning server to establish a secure connection with the provisioning server, wherein the receiving the provisioning information further comprises: receiving the provisioning information in response to successfully performing the device authentication and the device attestation.

Aspect 11: The method of aspect 8, wherein the registering with the core network further comprises: transmitting a registration request message to a core network node within the core network via the pinhole access cell; and receiving a registration accept message from the core network node via the pinhole access cell, wherein the registration accept message comprises provisioning information associated with the broadcast root key.

Aspect 12: The method of any of aspects 8 through 11, further comprising: receiving a radio resource control (RRC) connection release message from the pinhole access cell, wherein the RRC connection release message comprises redirection information for redirecting the wireless communication device to the secure cell; and accessing the secure cell utilizing the decrypted broadcast information.

Aspect 13: The method of any of aspects 8 through 11, further comprising: receiving a handover command from the pinhole access cell to handover the wireless communication device from the pinhole access cell to the secure cell; and accessing the secure cell utilizing the decrypted broadcast information.

Aspect 14: The method of any of aspects 1 through 13, wherein the cell identifying information comprises a concatenation of the PCI and an absolute radio frequency channel number (ARFCN) of the secure cell, and the acquisition signal comprises unencrypted broadcast information and at least a part of the encrypted broadcast information, wherein the unencrypted broadcast information comprises the PCI and the ARFCN.

Aspect 15: The method of aspect 14, wherein: the acquisition signal comprises a synchronization signal block (SSB) comprising a primary synchronization signal, a secondary synchronization signal, and a physical broadcast control channel (PBCH), the unencrypted broadcast information comprises the primary synchronization signal, the secondary synchronization signal and a first portion of the PBCH, the first portion of the PBCH comprises a system frame number (SFN) within a master information block (MIB), and the encrypted broadcast information comprises a remaining portion of the PBCH, a system information block, and a physical downlink control channel (PDCCH) control resource set comprising scheduling information for the system information block.

Aspect 16: The method of any of aspects 1 through 15, wherein the acquisition signal comprises a first acquisition signal comprising the encrypted broadcast information and a second acquisition signal comprising at least one cell-specific security parameter.

Aspect 17: The method of aspect 16, wherein the at least one cell-specific security parameter comprises the cell identifying information, and wherein the deriving the cell-specific broadcast key further comprises: deriving the cell-specific broadcast key based on the broadcast root key and the at least one cell-specific security parameter, wherein the at least one cell-specific security parameter further comprises at least one of a key identifier of the broadcast root key, an identifier of the RAN node, or a freshness parameter.

Aspect 18: The method of aspect 16 or 17, wherein the second acquisition signal comprises a message authentication code derived from the cell-specific broadcast key and the second acquisition signal, and further comprising: verifying an integrity of the second acquisition signal using the message authentication code based on an integrity protection key derived from the cell-specific broadcast key.

Aspect 19: The method of any of aspects 1 through 18, wherein the deriving the cell-specific broadcast key further comprises: deriving a broadcast RAN key based on the broadcast root key and an identifier of the RAN node; and deriving the cell-specific broadcast key based on the broadcast RAN key and the cell identifying information.

Aspect 20: The method of any of aspects 1 through 19, further comprising: registering with a core network upon accessing the secure cell; establishing an access stratum security context with the RAN node, the access stratum security context comprising a RAN node key; deriving a cell-specific unicast key based on the RAN node key and at least one parameter, wherein the at least one parameter comprises a concatenation of the cell identifying information and a freshness parameter; receiving encrypted downlink control information comprising unicast information for the wireless communication device from the RAN node; and decrypting the encrypted downlink control information using the cell-specific unicast key.

Aspect 21: A method of wireless communication in a wireless communication system, comprising, at a radio access network (RAN) node: obtaining a cell-specific broadcast key for a secure cell served by the RAN node; encrypting broadcast information related to cell access using at least the cell-specific broadcast key to produce encrypted broadcast information; and transmitting the encrypted broadcast information in the secure cell.

Aspect 22: The method of aspect 21, wherein the obtaining the cell-specific broadcast key further comprises: receiving the cell-specific broadcast key from a core network node within a core network, wherein the cell-specific broadcast key is derived from a broadcast root key provided to the core network node by a provisioning server.

Aspect 23: The method of aspect 21, wherein the obtaining the cell-specific broadcast key further comprises: receiving a broadcast RAN key from a core network node in a core network; and deriving the cell-specific broadcast key based on the broadcast RAN key and cell identifying information associated with the secure cell.

Aspect 24: The method of any of aspects 21 through 23, wherein at least a part of the encrypted broadcast information is transmitted within a first acquisition signal in the secure cell, and further comprising: transmitting a second acquisition signal comprising at least one cell-specific security parameter, wherein the at least one cell-specific security parameter comprises cell identifying information and further comprises at least one of a key identifier of a broadcast root key from which the cell-specific broadcast key is derived, an identifier of the RAN node, or a freshness parameter.

Aspect 25: The method of any of aspects 21 through 24, further comprising: transmitting provisioning information to a wireless communication device, at least part of the provisioning information originating at a provisioning server, wherein the provisioning information enables provisioning of a broadcast root key from which the cell-specific broadcast key is derived on the wireless communication device, wherein the provisioning information comprises at least one of the broadcast root key, a long term key, a current time, a key identifier of the broadcast root key, or a system frame number (SFN) of the RAN.

Aspect 26: The method of aspect 25, wherein the provisioning information further comprises a hyper frame number (HFN) of the RAN, and wherein the encrypting the broadcast information further comprises: encrypting the broadcast information using the cell-specific broadcast key and a freshness parameter comprising a concatenation of the HFN and the SFN.

Aspect 27: The method of any of aspects 21 through 26, further comprising: transmitting unencrypted broadcast information related to cell access in a pinhole access cell served by the RAN node; receiving a registration request from a wireless communication device via the pinhole access cell based on the unencrypted broadcast information to register the wireless communication device with a core network; and transmitting a registration accept message from a core network node within the core network to the wireless communication device via the pinhole access cell.

Aspect 28: The method of any of aspects 21 through 27, further comprising: establishing an access stratum security context with a wireless communication device upon the wireless communication device registering with a core network, the access stratum security context comprising a RAN node key; deriving a cell-specific unicast key based on the RAN node key and at least one parameter; encrypting downlink control information comprising unicast information for the wireless communication device using the cell-specific unicast key to produce encrypted downlink control information; and transmitting the encrypted downlink control information to the wireless communication device.

Aspect 29: An apparatus in a wireless communication network comprising a transceiver, a memory, and a processor coupled to the transceiver and the memory, the processor and the memory configured to perform a method of any one of aspects 1 through 20 or aspects 21 through 28.

Aspect 30: An apparatus in a wireless communication network comprising at least one means for performing a method of any one of aspects 1 through 20 or aspects 21 through 28.

Aspect 31: A non-transitory computer-readable medium storing computer-executable code, comprising code for causing an apparatus in a wireless communication network to perform a method of any one of aspects 1 through 20 or aspects 21 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of functions described in the present disclosure.

One or more of the components, steps, features and/or functions illustrated in FIGS. 1-30 may be rearranged and/or combined into a single component, step, feature or function or embodied in several components, steps, or functions. Additional stages, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising, at a wireless communication device:

obtaining a broadcast root key of a plurality of broadcast root keys, wherein each of the plurality of broadcast root keys is allocated to a different respective set of wireless communication devices;

receiving an acquisition signal from a radio access network (RAN) node serving a secure cell within a RAN of a wireless communication system;

receiving provisioning information comprising a system frame number (SFN) of the RAN and a hyper frame number (HFN) of the RAN;

obtaining cell identifying information based on at least the acquisition signal;

deriving a cell-specific broadcast key based on at least the broadcast root key and the cell identifying information, wherein the cell-specific broadcast key is unique to the secure cell and derivable by each of a plurality of wireless communication devices within the secure cell, wherein the cell-specific broadcast key is common to all of the plurality of wireless communication devices within the secure cell;

receiving encrypted broadcast information related to cell access broadcast to the plurality of wireless communication devices, including the wireless communication device, in the secure cell; and decrypting the encrypted broadcast information based on the cell-specific broadcast key and a freshness parameter to produce decrypted broadcast information, wherein the freshness parameter comprises a concatenation of the HFN and the SFN.

2. The method of claim 1, wherein the obtaining the broadcast root key further comprises:

receiving provisioning information further comprising additional provisioning information that comprises at least one of the broadcast root key, a long term key, a current time, or a key identifier of the broadcast root key, or a system frame number (SFN) of the RAN.

3. The method of claim 2, wherein the obtaining the broadcast root key further comprises:

deriving the broadcast root key based on at least the long term key, a refresh parameter determined based on the current time, and one or more of a network identifier associated with the RAN, a tracking area code associated with a tracking area comprising the secure cell, an area identifier associated with the RAN node, or a registration area code associated with a registration area comprising the secure cell.

4. The method of claim 3, wherein the refresh parameter comprises a quotient of a current counter value of a counter set based on the current time and a key refresh interval.

5. The method of claim 1, wherein the obtaining the broadcast root key further comprises:

receiving additional provisioning information associated with the broadcast root key via an out-of-band delivery path external to the wireless communication system.

6. The method of claim 1, wherein the obtaining the broadcast root key further comprises:

receiving additional provisioning information associated with the broadcast root key from at least one of a provisioning server, a core network node, or the RAN node.

7. The method of claim 1, wherein the obtaining the broadcast root key further comprises:

accessing a pinhole access cell served by the RAN node based on unencrypted broadcast information related to cell access transmitted in the pinhole access cell; and registering with a core network via the pinhole access cell to obtain the broadcast root key.

8. The method of claim 7, wherein the obtaining the broadcast root key further comprises:

establishing a protocol data unit (PDU) session via the pinhole access cell; establishing a connection with a provisioning server via the PDU session; and receiving additional provisioning information associated with the broadcast root key on the wireless communication device from the provisioning server.

9. The method of claim 8, further comprising:

performing device authentication and device attestation with the provisioning server to establish a secure connection with the provisioning server, wherein the receiving the additional provisioning information further comprises:

receiving the additional provisioning information in response to successfully performing the device authentication and the device attestation.

10. The method of claim 7, wherein the registering with the core network further comprises:

transmitting a registration request message to a core network node within the core network via the pinhole access cell; and receiving a registration accept message from the core network node via the pinhole access cell, wherein the registration accept message comprises the additional provisioning information associated with the broadcast root key.

11. The method of claim 7, further comprising:

receiving a radio resource control (RRC) connection release message from the pinhole access cell, wherein the RRC connection release message comprises redirection information for redirecting the wireless communication device to the secure cell; and accessing the secure cell utilizing the decrypted broadcast information.

12. The method of claim 7, further comprising:

receiving a handover command from the pinhole access cell to handover the wireless communication device from the pinhole access cell to the secure cell; and accessing the secure cell utilizing the decrypted broadcast information.

13. The method of claim 1, wherein:

the cell identifying information comprises a concatenation of a physical cell identity (PCI) and an absolute radio frequency channel number (ARFCN) of the secure cell, and the acquisition signal comprises unencrypted broadcast information and at least a part of the encrypted broadcast information, wherein the unencrypted broadcast information comprises the PCI and the ARFCN.

14. The method of claim 13, wherein:

the acquisition signal comprises a synchronization signal block (SSB) comprising a primary synchronization signal, a secondary synchronization signal, and a physical broadcast control channel (PBCH), the unencrypted broadcast information comprises the primary synchronization signal, the secondary synchronization signal and a first portion of the PBCH, the first portion of the PBCH comprises the SFN within a master information block (MIB), and the encrypted broadcast information comprises a remaining portion of the PBCH, a system information block, and a physical downlink control channel (PDCCH) control resource set comprising scheduling information for the system information block.

15. The method of claim 1, wherein the acquisition signal comprises a first acquisition signal comprising the encrypted broadcast information and a second acquisition signal comprising at least one cell-specific security parameter.

16. The method of claim 15, wherein the at least one cell-specific security parameter comprises the cell identifying information, and wherein the deriving the cell-specific broadcast key further comprises:

deriving the cell-specific broadcast key based on the broadcast root key and the at least one cell-specific security parameter, wherein the at least one cell-specific security parameter further comprises at least one of a key identifier of the broadcast root key, an identifier of the RAN node, or the freshness parameter.

17. The method of claim 15, wherein the second acquisition signal comprises a message authentication code derived from the cell-specific broadcast key and the second acquisition signal, and further comprising:

verifying an integrity of the second acquisition signal using the message authentication code based on an integrity protection key derived from the cell-specific broadcast key.

18. The method of claim 1, wherein the deriving the cell-specific broadcast key further comprises:

deriving a broadcast RAN key based on the broadcast root key and an identifier of the RAN node; and deriving the cell-specific broadcast key based on the broadcast RAN key and the cell identifying information.

19. The method of claim 1, further comprising:

registering with a core network upon accessing the secure cell;

establishing an access stratum security context with the RAN node, the access stratum security context comprising a RAN node key;

deriving a cell-specific unicast key based on the RAN node key and at least one parameter, wherein the at least one parameter comprises a concatenation of the cell identifying information and the freshness parameter;

receiving encrypted downlink control information comprising unicast information for the wireless communication device from the RAN node; and decrypting the encrypted downlink control information using the cell-specific unicast key.

20. A wireless communication device configured for wireless communication, comprising:

one or more memories; and one or more processors coupled to the one or more memories, wherein the one or more processors are configured to:

obtain provisioning information comprising a broadcast root key of a plurality of broadcast root keys, wherein each of the plurality of broadcast root keys is allocated to a different respective set of wireless communication devices;

receive an acquisition signal from a radio access network (RAN) node serving a secure cell within a RAN of a wireless communication network;

receive provisioning information comprising a system frame number (SFN) of the RAN and a hyper frame number (HFN) of the RAN;

obtain cell identifying information based on at least the acquisition signal;

derive a cell-specific broadcast key based on at least the broadcast root key and the cell identifying information, wherein the cell-specific broadcast key is unique to the secure cell and derivable by each of a plurality of wireless communication devices within the secure cell, wherein the cell-specific broadcast key is common to all of the plurality of wireless communication devices within the secure cell;

receive encrypted broadcast information related to cell access, the encrypted broadcast information being broadcast to the plurality of wireless communication devices, including the wireless communication device, in the secure cell; and decrypt the encrypted broadcast information based on the cell-specific broadcast key and a freshness parameter to produce decrypted broadcast information, wherein the freshness parameter comprises a concatenation of the HFN and the SFN to access the secure cell.

21. A method of wireless communication in a wireless communication system, comprising, at a radio access network (RAN) node:

obtaining a cell-specific broadcast key for a secure cell served by the RAN node within a RAN, the cell-specific broadcast key being derived based on a broadcast root key of a plurality of broadcast root keys, each associated with a different respective set of wireless communication devices, wherein the cell-specific broadcast key is unique to the secure cell and derivable by each of a plurality of wireless communication devices within the secure cell, wherein the cell-specific broadcast key is common to all of the plurality of wireless communication devices within the secure cell;

transmitting provisioning information comprising a system frame number (SFN) of the RAN and a hyper frame number (HFN) of the RAN to a wireless communication device;

encrypting broadcast information related to cell access for broadcast to the plurality of wireless communication devices in the secure cell based on the cell-specific broadcast key and a freshness parameter to produce encrypted broadcast information, wherein the freshness parameter comprises a concatenation of the HFN and the SFN; and providing the encrypted broadcast information in the secure cell.

22. The method of claim 21, wherein the obtaining the cell-specific broadcast key further comprises:

receiving the cell-specific broadcast key from a core network node within a core network, wherein the cell-specific broadcast key is derived from the broadcast root key provided to the core network node by a provisioning server.

23. The method of claim 21, wherein the obtaining the cell-specific broadcast key further comprises:

receiving a broadcast RAN key derived from the broadcast root key from a core network node in a core network; and deriving the cell-specific broadcast key based on the broadcast RAN key and cell identifying information associated with the secure cell.

24. The method of claim 21, wherein at least a part of the encrypted broadcast information is transmitted within a first acquisition signal in the secure cell, and further comprising:

transmitting a second acquisition signal comprising at least one cell-specific security parameter, wherein the at least one cell-specific security parameter comprises cell identifying information and further comprises at least one of a key identifier of the broadcast root key from which the cell-specific broadcast key is derived, an identifier of the RAN node, or the freshness parameter.

25. The method of claim 21, further comprising:

transmitting provisioning information to a wireless communication device, wherein at least part of the provisioning information originating at a provisioning server, wherein the provisioning information further comprises additional provisioning information that enables provisioning of the broadcast root key from which the cell-specific broadcast key is derived on the wireless communication device, wherein the additional provisioning information further comprises at least one of the broadcast root key, a long term key, a current time, or a key identifier of the broadcast root key, or a system frame number (SFN).

26. The method of claim 21, further comprising:

transmitting unencrypted broadcast information related to cell access in a pinhole access cell served by the RAN node;

receiving a registration request from a wireless communication device via the pinhole access cell based on the unencrypted broadcast information to register the wireless communication device with a core network; and transmitting a registration accept message from a core network node within the core network to the wireless communication device via the pinhole access cell.

27. The method of claim 21, further comprising:

establishing an access stratum security context with a wireless communication device upon the wireless communication device registering with a core network, the access stratum security context comprising a RAN node key;

deriving a cell-specific unicast key based on the RAN node key and at least one parameter;

encrypting downlink control information comprising unicast information for the wireless communication device using the cell-specific unicast key to produce encrypted downlink control information; and transmitting the encrypted downlink control information to the wireless communication device.

28. A radio access network (RAN) node, comprising:

one or more memories; and one or more processors coupled to the one or more memories, wherein the one or more processors are configured to:

obtain a cell-specific broadcast key for a secure cell served by the RAN node within a RAN, the cell-specific broadcast key being derived based on a broadcast root key of a plurality of broadcast root keys, each associated with a different respective set of wireless communication devices, wherein the cell-specific broadcast key is unique to the secure cell and derivable by each of a plurality of wireless communication devices within the secure cell, wherein the cell-specific broadcast key is common to all of the plurality of wireless communication devices within the secure cell;

transmit provisioning information comprising a system frame number (SFN) of the RAN and a hyper frame number (HFN) of the RAN to a wireless communication device;

encrypt broadcast information related to cell access for broadcast to the plurality of wireless communication devices in the secure cell based on the cell-specific broadcast key and a freshness parameter to produce encrypted broadcast information, wherein the freshness parameter comprises a concatenation of the HFN and the SFN; and provide the encrypted broadcast information in the secure cell.

\*  \*  \*  \*  \*